US00RE44365E

(19) United States
(12) Reissued Patent
Vorbach et al.

(10) Patent Number: US RE44,365 E
(45) Date of Reissued Patent: Jul. 9, 2013

(54) METHOD OF SELF-SYNCHRONIZATION OF CONFIGURABLE ELEMENTS OF A PROGRAMMABLE MODULE

(76) Inventors: Martin Vorbach, Lingenfield (DE); Robert M. Münch, Zug (DE)

(21) Appl. No.: 12/909,061

(22) Filed: Oct. 21, 2010

Related U.S. Patent Documents

Reissue of:
(64) Patent No.: 7,036,036
Issued: Apr. 25, 2006
Appl. No.: 10/379,403
Filed: Mar. 4, 2003

U.S. Applications:
(60) Division of application No. 12/109,280, filed on Apr. 24, 2008, which is a continuation of application No. 09/369,653, filed on Aug. 6, 1999, now Pat. No. 6,542,998, which is a continuation-in-part of application No. PCT/DE98/00334, filed on Feb. 7, 1998, and a continuation-in-part of application No. 08/946,812, filed on Oct. 8, 1997, now Pat. No. 6,081,903.

(30) Foreign Application Priority Data

Feb. 8, 1997 (DE) ..... 19704728

(51) Int. Cl.
*G06F 15/16* (2006.01)

(52) U.S. Cl.
USPC ..... 713/375; 713/400; 713/401

(58) Field of Classification Search
USPC ..... 713/100, 375, 400, 401; 326/37, 326/38, 39
See application file for complete search history.

(56) References Cited

U.S. PATENT DOCUMENTS

| | | | |
|---|---|---|---|
| 2,067,477 | A | 1/1937 | Cooper |
| 3,242,998 | A | 3/1966 | Gubbins |
| 3,564,506 | A | 2/1971 | Bee et al. |
| 3,681,578 | A | 8/1972 | Stevens |

(Continued)

FOREIGN PATENT DOCUMENTS

| | | |
|---|---|---|
| DE | 42 21 278 | 1/1994 |
| DE | 44 16 881 | 11/1994 |

(Continued)

OTHER PUBLICATIONS

Li, Zhiyuan, et al., "Configuration prefetching techniques for partial reconfigurable coprocessor with relocation and defragmentation," International Symposium on Field Programmable Gate Arrays, Feb. 1, 2002, pp. 187-195.

(Continued)

*Primary Examiner* — Paul Yanchus, III
(74) *Attorney, Agent, or Firm* — Bechen PLLC

(57) ABSTRACT

A method of synchronizing and reconfiguring configurable elements in a programmable unit is provided. A unit has a two- or multi-dimensional, programmable cell architecture (e.g., DFP, DPGA, etc.), and any configurable element can have access to a configuration register and a status register of the other configurable elements via an interconnection architecture and can thus have an active influence on their function and operation. By making synchronization the responsibility of each element, more synchronization tasks can be performed at the same time because independent elements no longer interfere with each other in accessing a central synchronization instance.

80 Claims, 11 Drawing Sheets

U.S. PATENT DOCUMENTS

| | | | | |
|---|---|---|---|---|
| 3,753,008 | A | | 8/1973 | Guarnaschelli |
| 3,754,211 | A | | 8/1973 | Rocher et al. |
| 3,757,608 | A | | 9/1973 | Willner |
| 3,855,577 | A | | 12/1974 | Vandierendonck |
| 3,956,589 | A | | 5/1976 | Rocher et al. |
| 4,151,611 | A | | 4/1979 | Sugawara et al. |
| 4,233,667 | A | | 11/1980 | Devine et al. |
| 4,414,547 | A | | 11/1983 | Knapp et al. |
| 4,498,134 | A | | 2/1985 | Hansen et al. |
| 4,498,172 | A | | 2/1985 | Bhavsar |
| 4,566,102 | A | | 1/1986 | Hefner |
| 4,571,736 | A | | 2/1986 | Agrawal et al. |
| 4,590,583 | A | | 5/1986 | Miller |
| 4,591,979 | A | | 5/1986 | Iwashita |
| 4,594,682 | A | | 6/1986 | Drimak |
| 4,623,997 | A | | 11/1986 | Tulpule |
| 4,646,300 | A | | 2/1987 | Goodman et al. |
| 4,663,706 | A | | 5/1987 | Allen et al. |
| 4,667,190 | A | | 5/1987 | Fant |
| 4,682,284 | A | | 7/1987 | Schrofer |
| 4,686,386 | A | | 8/1987 | Tadao |
| 4,706,216 | A | | 11/1987 | Carter |
| 4,720,778 | A | | 1/1988 | Hall et al. |
| 4,720,780 | A | | 1/1988 | Dolecek |
| 4,739,474 | A | | 4/1988 | Holsztynski |
| 4,748,580 | A | | 5/1988 | Ashton et al. |
| 4,760,525 | A | * | 7/1988 | Webb ..... 712/2 |
| 4,761,755 | A | | 8/1988 | Ardini et al. |
| 4,791,603 | A | | 12/1988 | Henry |
| 4,811,214 | A | | 3/1989 | Nosenchuck et al. |
| 4,852,043 | A | | 7/1989 | Guest |
| 4,852,048 | A | | 7/1989 | Morton |
| 4,860,201 | A | | 8/1989 | Stolfo et al. |
| 4,870,302 | A | | 9/1989 | Freeman |
| 4,873,666 | A | | 10/1989 | Lefebvre et al. |
| 4,882,687 | A | | 11/1989 | Gordon |
| 4,884,231 | A | | 11/1989 | Mor et al. |
| 4,891,810 | A | | 1/1990 | de Corlieu et al. |
| 4,901,268 | A | | 2/1990 | Judd |
| 4,910,665 | A | | 3/1990 | Mattheyses et al. |
| 4,918,440 | A | | 4/1990 | Furtek |
| 4,939,641 | A | | 7/1990 | Schwartz et al. |
| 4,959,781 | A | | 9/1990 | Rubinstein et al. |
| 4,967,340 | A | | 10/1990 | Dawes |
| 4,972,314 | A | | 11/1990 | Getzinger et al. |
| 4,992,933 | A | | 2/1991 | Taylor |
| 5,010,401 | A | | 4/1991 | Murakami et al. |
| 5,014,193 | A | | 5/1991 | Garner et al. |
| 5,015,884 | A | | 5/1991 | Agrawal et al. |
| 5,021,947 | A | | 6/1991 | Campbell et al. |
| 5,023,775 | A | | 6/1991 | Poret |
| 5,031,179 | A | | 7/1991 | Yoshida et al. |
| 5,034,914 | A | | 7/1991 | Osterlund |
| 5,036,473 | A | | 7/1991 | Butts et al. |
| 5,036,493 | A | | 7/1991 | Nielsen |
| 5,041,924 | A | | 8/1991 | Blackborow et al. |
| 5,043,978 | A | | 8/1991 | Nagler et al. |
| 5,047,924 | A | | 9/1991 | Fujioka et al. |
| 5,055,997 | A | | 10/1991 | Sluijter et al. |
| 5,065,308 | A | | 11/1991 | Evans |
| 5,070,475 | A | | 12/1991 | Normoyle et al. |
| 5,072,178 | A | | 12/1991 | Matsumoto |
| 5,076,482 | A | | 12/1991 | Kozyrski et al. |
| 5,081,375 | A | | 1/1992 | Pickett et al. |
| 5,081,575 | A | | 1/1992 | Hiller et al. |
| 5,099,447 | A | | 3/1992 | Myszewski |
| 5,103,311 | A | | 4/1992 | Sluijter et al. |
| 5,109,503 | A | | 4/1992 | Cruickshank et al. |
| 5,113,498 | A | | 5/1992 | Evan et al. |
| 5,115,510 | A | | 5/1992 | Okamoto et al. |
| 5,119,290 | A | | 6/1992 | Loo et al. |
| 5,123,109 | A | | 6/1992 | Hillis |
| 5,125,801 | A | | 6/1992 | Nabity et al. |
| 5,128,559 | A | | 7/1992 | Steele |
| 5,142,469 | A | | 8/1992 | Weisenborn |
| 5,144,166 | A | | 9/1992 | Camarota et al. |
| 5,193,202 | A | | 3/1993 | Jackson et al. |
| 5,203,005 | A | | 4/1993 | Horst |
| 5,204,935 | A | | 4/1993 | Mihara et al. |
| 5,208,491 | A | | 5/1993 | Ebeling et al. |
| 5,212,716 | A | | 5/1993 | Ferraiolo et al. |
| 5,212,777 | A | | 5/1993 | Gove et al. |
| 5,218,302 | A | | 6/1993 | Loewe et al. |
| 5,226,122 | A | | 7/1993 | Thayer et al. |
| RE34,363 | E | | 8/1993 | Freeman |
| 5,233,539 | A | | 8/1993 | Agrawal et al. |
| 5,237,686 | A | | 8/1993 | Asano et al. |
| 5,243,238 | A | | 9/1993 | Kean |
| 5,245,616 | A | | 9/1993 | Olson |
| 5,247,689 | A | | 9/1993 | Ewert |
| RE34,444 | E | | 11/1993 | Kaplinsky |
| 5,274,593 | A | | 12/1993 | Proebsting |
| 5,276,836 | A | | 1/1994 | Fukumaru et al. |
| 5,287,472 | A | | 2/1994 | Horst |
| 5,287,511 | A | | 2/1994 | Robinson et al. |
| 5,287,532 | A | | 2/1994 | Hunt |
| 5,294,119 | A | | 3/1994 | Vincent et al. |
| 5,301,284 | A | | 4/1994 | Estes et al. |
| 5,301,344 | A | | 4/1994 | Kolchinsky |
| 5,303,172 | A | | 4/1994 | Magar et al. |
| 5,311,079 | A | | 5/1994 | Ditlow et al. |
| 5,327,125 | A | | 7/1994 | Iwase et al. |
| 5,336,950 | A | | 8/1994 | Popli et al. |
| 5,343,406 | A | | 8/1994 | Freeman et al. |
| 5,347,639 | A | | 9/1994 | Rechtschaffen et al. |
| 5,349,193 | A | | 9/1994 | Mott et al. |
| 5,353,432 | A | | 10/1994 | Richek et al. |
| 5,355,508 | A | | 10/1994 | Kan |
| 5,361,373 | A | | 11/1994 | Gilson |
| 5,365,125 | A | | 11/1994 | Goetting et al. |
| 5,379,444 | A | | 1/1995 | Mumme |
| 5,386,154 | A | | 1/1995 | Goetting et al. |
| 5,386,518 | A | | 1/1995 | Reagle et al. |
| 5,392,437 | A | | 2/1995 | Matter et al. |
| 5,408,643 | A | | 4/1995 | Katayose |
| 5,410,723 | A | | 4/1995 | Schmidt et al. |
| 5,412,795 | A | | 5/1995 | Larson |
| 5,418,952 | A | | 5/1995 | Morley et al. |
| 5,418,953 | A | | 5/1995 | Hunt et al. |
| 5,421,019 | A | | 5/1995 | Holsztynski et al. |
| 5,422,823 | A | | 6/1995 | Agrawal et al. |
| 5,425,036 | A | | 6/1995 | Liu et al. |
| 5,426,378 | A | | 6/1995 | Ong |
| 5,428,526 | A | | 6/1995 | Flood et al. |
| 5,430,687 | A | | 7/1995 | Hung et al. |
| 5,435,000 | A | | 7/1995 | Boothroyd et al. |
| 5,440,245 | A | | 8/1995 | Galbraith et al. |
| 5,440,538 | A | | 8/1995 | Olsen |
| 5,442,790 | A | | 8/1995 | Nosenchuck |
| 5,444,394 | A | | 8/1995 | Watson et al. |
| 5,448,186 | A | | 9/1995 | Kawata |
| 5,450,022 | A | | 9/1995 | New |
| 5,455,525 | A | | 10/1995 | Ho et al. |
| 5,457,644 | A | | 10/1995 | McCollum |
| 5,465,375 | A | | 11/1995 | Thepaut et al. |
| 5,469,003 | A | | 11/1995 | Kean |
| 5,473,266 | A | | 12/1995 | Ahanin et al. |
| 5,473,267 | A | | 12/1995 | Stansfield |
| 5,475,583 | A | | 12/1995 | Bock et al. |
| 5,475,803 | A | | 12/1995 | Stearns et al. |
| 5,475,856 | A | | 12/1995 | Kogge |
| 5,477,525 | A | | 12/1995 | Okabe |
| 5,483,620 | A | | 1/1996 | Pechanek et al. |
| 5,485,103 | A | | 1/1996 | Pedersen et al. |
| 5,485,104 | A | | 1/1996 | Agrawal et al. |
| 5,489,857 | A | | 2/1996 | Agrawal et al. |
| 5,491,353 | A | | 2/1996 | Kean |
| 5,493,239 | A | | 2/1996 | Zlotnick |
| 5,493,663 | A | | 2/1996 | Parikh |
| 5,497,498 | A | | 3/1996 | Taylor |
| 5,502,838 | A | | 3/1996 | Kikinis |
| 5,504,439 | A | | 4/1996 | Tavana |
| 5,506,998 | A | | 4/1996 | Kato et al. |
| 5,510,730 | A | | 4/1996 | El Gamal et al. |
| 5,511,173 | A | | 4/1996 | Yamaura et al. |
| 5,513,366 | A | | 4/1996 | Agarwal et al. |
| 5,521,837 | A | | 5/1996 | Frankle et al. |

5,522,083 A 5/1996 Gove et al.
5,525,971 A 6/1996 Flynn
5,530,873 A 6/1996 Takano
5,530,946 A 6/1996 Bouvier et al.
5,532,693 A 7/1996 Winters et al.
5,532,957 A 7/1996 Malhi
5,535,406 A 7/1996 Kolchinsky
5,537,057 A 7/1996 Leong et al.
5,537,580 A 7/1996 Giomi et al.
5,537,601 A 7/1996 Kimura et al.
5,541,530 A 7/1996 Cliff et al.
5,544,336 A 8/1996 Kato et al.
5,548,773 A 8/1996 Kemeny et al.
5,550,782 A 8/1996 Cliff et al.
5,555,434 A 9/1996 Carlstedt
5,559,450 A 9/1996 Ngai et al.
5,561,738 A 10/1996 Kinerk et al.
5,568,624 A 10/1996 Sites et al.
5,570,040 A 10/1996 Lytle et al.
5,572,710 A 11/1996 Asano et al.
5,574,927 A 11/1996 Scantlin
5,574,930 A 11/1996 Halverson, Jr. et al.
5,581,731 A 12/1996 King et al.
5,581,734 A 12/1996 DiBrino et al.
5,583,450 A 12/1996 Trimberger et al.
5,584,013 A 12/1996 Cheong et al.
5,586,044 A 12/1996 Agrawal et al.
5,587,921 A 12/1996 Agrawal et al.
5,588,152 A 12/1996 Dapp et al.
5,590,345 A 12/1996 Barker et al.
5,590,348 A 12/1996 Phillips et al.
5,596,742 A 1/1997 Agarwal et al.
5,600,265 A 2/1997 El Gamal et al.
5,600,597 A 2/1997 Kean et al.
5,600,845 A 2/1997 Gilson
5,602,999 A 2/1997 Hyatt
5,603,005 A 2/1997 Bauman et al.
5,606,698 A 2/1997 Powell
5,608,342 A 3/1997 Trimberger
5,611,049 A 3/1997 Pitts
5,617,547 A 4/1997 Feeney et al.
5,617,577 A 4/1997 Barker et al.
5,619,720 A 4/1997 Garde et al.
5,625,806 A 4/1997 Kromer
5,625,836 A 4/1997 Barker et al.
5,627,992 A 5/1997 Baror
5,634,131 A 5/1997 Matter et al.
5,635,851 A 6/1997 Tavana
5,642,058 A 6/1997 Trimberger et al.
5,646,544 A 7/1997 Iadanza
5,646,545 A 7/1997 Trimberger et al.
5,649,176 A 7/1997 Selvidge et al.
5,649,179 A 7/1997 Steenstra et al.
5,652,529 A 7/1997 Gould et al.
5,652,894 A 7/1997 Hu et al.
5,655,069 A 8/1997 Ogawara et al.
5,655,124 A 8/1997 Lin
5,656,950 A 8/1997 Duong et al.
5,657,330 A 8/1997 Matsumoto
5,659,785 A 8/1997 Pechanek et al.
5,659,797 A 8/1997 Zandveld et al.
5,675,262 A 10/1997 Duong et al.
5,675,743 A 10/1997 Mavity
5,675,757 A 10/1997 Davidson et al.
5,675,777 A 10/1997 Glickman
5,677,909 A 10/1997 Heide
5,680,583 A 10/1997 Kuijsten
5,682,491 A 10/1997 Pechanek et al.
5,682,544 A 10/1997 Pechanek et al.
5,687,325 A 11/1997 Chang
5,694,602 A 12/1997 Smith
5,696,791 A 12/1997 Yeung
5,696,976 A 12/1997 Nizar et al.
5,701,091 A 12/1997 Kean
5,705,938 A 1/1998 Kean
5,706,482 A 1/1998 Matsushima et al.
5,713,037 A 1/1998 Wilkinson et al.
5,717,890 A 2/1998 Ichida et al.
5,717,943 A 2/1998 Barker et al.
5,727,229 A 3/1998 Kan et al.
5,732,209 A 3/1998 Vigil et al.
5,734,869 A 3/1998 Chen
5,734,921 A 3/1998 Dapp et al.
5,737,516 A 4/1998 Circello et al.
5,737,565 A 4/1998 Mayfield
5,742,180 A * 4/1998 DeHon et al. ..... 326/40
5,745,734 A 4/1998 Craft et al.
5,748,872 A 5/1998 Norman
5,748,979 A 5/1998 Trimberger
5,752,035 A 5/1998 Trimberger
5,754,459 A 5/1998 Telikepalli
5,754,820 A 5/1998 Yamagami
5,754,827 A 5/1998 Barbier et al.
5,754,871 A 5/1998 Wilkinson et al.
5,754,876 A 5/1998 Tamaki et al.
5,760,602 A 6/1998 Tan
5,761,484 A 6/1998 Agarwal et al.
5,768,629 A 6/1998 Wise et al.
5,773,994 A 6/1998 Jones
5,778,237 A 7/1998 Yamamoto et al.
5,778,439 A 7/1998 Trimberger et al.
5,781,756 A 7/1998 Hung
5,784,313 A 7/1998 Trimberger et al.
5,784,630 A 7/1998 Saito et al.
5,784,636 A 7/1998 Rupp
5,794,059 A 8/1998 Barker et al.
5,794,062 A 8/1998 Baxter
5,801,547 A 9/1998 Kean
5,801,715 A 9/1998 Norman
5,801,958 A 9/1998 Dangelo et al.
5,802,290 A 9/1998 Casselman
5,804,986 A 9/1998 Jones
5,815,004 A 9/1998 Trimberger et al.
5,815,715 A 9/1998 Kayhan
5,815,726 A 9/1998 Cliff
5,821,774 A 10/1998 Veytsman et al.
5,828,229 A 10/1998 Cliff et al.
5,828,858 A 10/1998 Athanas et al.
5,831,448 A 11/1998 Kean
5,832,288 A 11/1998 Wong
5,838,165 A 11/1998 Chatter
5,838,988 A 11/1998 Panwar et al.
5,841,973 A 11/1998 Kessler et al.
5,844,422 A 12/1998 Trimberger et al.
5,844,888 A 12/1998 Markkula, Jr. et al.
5,848,238 A 12/1998 Shimomura et al.
5,854,918 A 12/1998 Baxter
5,857,097 A 1/1999 Henzinger et al.
5,857,109 A 1/1999 Taylor
5,859,544 A 1/1999 Norman
5,860,119 A 1/1999 Dockser
5,862,403 A 1/1999 Kanai et al.
5,865,239 A 2/1999 Carr
5,867,691 A 2/1999 Shiraishi
5,867,723 A 2/1999 Chin et al.
5,870,620 A 2/1999 Kadosumi et al.
5,884,075 A 3/1999 Hester et al.
5,887,162 A 3/1999 Williams et al.
5,887,165 A 3/1999 Martel et al.
5,889,533 A 3/1999 Lee
5,889,982 A 3/1999 Rodgers et al.
5,892,370 A 4/1999 Eaton et al.
5,892,961 A 4/1999 Trimberger
5,892,962 A 4/1999 Cloutier
5,894,565 A 4/1999 Furtek et al.
5,895,487 A 4/1999 Boyd et al.
5,898,602 A 4/1999 Rothman et al.
5,901,279 A 5/1999 Davis, III
5,913,925 A 6/1999 Kahle et al.
5,915,099 A 6/1999 Takata et al.
5,915,123 A 6/1999 Mirsky et al.
5,924,119 A 7/1999 Sindhu et al.
5,926,638 A 7/1999 Inoue
5,927,423 A 7/1999 Wada et al.
5,933,023 A 8/1999 Young
5,933,642 A 8/1999 Greenbaum et al.
5,936,424 A 8/1999 Young et al.
5,943,242 A 8/1999 Vorbach et al.

| | | | |
|---|---|---|---|
| 5,956,518 | A | 9/1999 | DeHon et al. |
| 5,960,193 | A | 9/1999 | Guttag et al. |
| 5,960,200 | A | 9/1999 | Eager et al. |
| 5,966,143 | A | 10/1999 | Breternitz, Jr. |
| 5,966,534 | A | 10/1999 | Cooke et al. |
| 5,970,254 | A | 10/1999 | Cooke et al. |
| 5,978,260 | A | 11/1999 | Trimberger et al. |
| 5,978,583 | A | 11/1999 | Ekanadham et al. |
| 5,996,048 | A | 11/1999 | Cherabuddi et al. |
| 5,996,083 | A | 11/1999 | Gupta et al. |
| 5,999,990 | A | 12/1999 | Sharrit et al. |
| 6,003,143 | A | 12/1999 | Kim et al. |
| 6,011,407 | A | 1/2000 | New |
| 6,014,509 | A | 1/2000 | Furtek et al. |
| 6,020,758 | A | 2/2000 | Patel et al. |
| 6,020,760 | A | 2/2000 | Sample et al. |
| 6,021,490 | A | 2/2000 | Vorbach et al. |
| 6,023,564 | A | 2/2000 | Trimberger |
| 6,023,742 | A | 2/2000 | Ebeling et al. |
| 6,026,478 | A | 2/2000 | Dowling |
| 6,026,481 | A | 2/2000 | New et al. |
| 6,034,538 | A | 3/2000 | Abramovici |
| 6,035,371 | A | 3/2000 | Magloire |
| 6,038,650 | A | 3/2000 | Vorbach et al. |
| 6,038,656 | A | 3/2000 | Martin et al. |
| 6,044,030 | A | 3/2000 | Zheng et al. |
| 6,045,585 | A | 4/2000 | Blainey |
| 6,047,115 | A | 4/2000 | Mohan et al. |
| 6,049,222 | A | 4/2000 | Lawman |
| 6,049,866 | A | 4/2000 | Earl |
| 6,052,524 | A | 4/2000 | Pauna |
| 6,052,773 | A | 4/2000 | DeHon et al. |
| 6,054,873 | A | 4/2000 | Laramie |
| 6,055,619 | A | 4/2000 | North et al. |
| 6,058,266 | A | 5/2000 | Megiddo et al. |
| 6,058,469 | A | 5/2000 | Baxter |
| 6,064,819 | A | 5/2000 | Franssen et al. |
| 6,072,348 | A | 6/2000 | New et al. |
| 6,075,935 | A | 6/2000 | Ussery et al. |
| 6,076,157 | A | 6/2000 | Borkenhagen et al. |
| 6,077,315 | A | 6/2000 | Greenbaum et al. |
| 6,078,736 | A | 6/2000 | Guccione |
| 6,081,903 | A | 6/2000 | Vorbach et al. |
| 6,084,429 | A | 7/2000 | Trimberger |
| 6,085,317 | A | 7/2000 | Smith |
| 6,086,628 | A | 7/2000 | Dave et al. |
| 6,088,795 | A | 7/2000 | Vorbach et al. |
| 6,092,174 | A | 7/2000 | Roussakov |
| RE36,839 | E | 8/2000 | Simmons et al. |
| 6,096,091 | A | 8/2000 | Hartmann |
| 6,105,105 | A | 8/2000 | Trimberger |
| 6,105,106 | A | 8/2000 | Manning |
| 6,108,760 | A | 8/2000 | Mirsky et al. |
| 6,118,724 | A | 9/2000 | Higginbottom |
| 6,119,181 | A | 9/2000 | Vorbach et al. |
| 6,122,719 | A | 9/2000 | Mirsky et al. |
| 6,125,072 | A | 9/2000 | Wu |
| 6,125,408 | A | 9/2000 | McGee et al. |
| 6,127,908 | A | 10/2000 | Bozler et al. |
| 6,128,720 | A | 10/2000 | Pechanek et al. |
| 6,134,166 | A | 10/2000 | Lytle et al. |
| 6,137,307 | A | 10/2000 | Iwanczuk et al. |
| 6,145,072 | A | 11/2000 | Shams et al. |
| 6,150,837 | A | 11/2000 | Beal et al. |
| 6,150,839 | A | 11/2000 | New et al. |
| 6,154,048 | A | 11/2000 | Iwanczuk et al. |
| 6,154,049 | A | 11/2000 | New |
| 6,154,826 | A | 11/2000 | Wulf et al. |
| 6,157,214 | A | 12/2000 | Marshall |
| 6,170,051 | B1 | 1/2001 | Dowling |
| 6,172,520 | B1 | 1/2001 | Lawman et al. |
| 6,173,419 | B1 | 1/2001 | Barnett |
| 6,173,434 | B1 | 1/2001 | Wirthlin et al. |
| 6,178,494 | B1 | 1/2001 | Casselman |
| 6,185,256 | B1 | 2/2001 | Saito et al. |
| 6,185,731 | B1 | 2/2001 | Maeda et al. |
| 6,188,240 | B1 | 2/2001 | Nakaya |
| 6,188,650 | B1 | 2/2001 | Hamada et al. |
| 6,191,614 | B1 | 2/2001 | Schultz et al. |
| 6,198,304 | B1 | 3/2001 | Sasaki |
| 6,201,406 | B1 | 3/2001 | Iwanczuk et al. |
| 6,202,163 | B1 | 3/2001 | Gabzdyl et al. |
| 6,202,182 | B1 | 3/2001 | Abramovici et al. |
| 6,204,687 | B1 | 3/2001 | Schultz et al. |
| 6,211,697 | B1 | 4/2001 | Lien et al. |
| 6,212,544 | B1 | 4/2001 | Borkenhagen et al. |
| 6,212,650 | B1 | 4/2001 | Guccione |
| 6,215,326 | B1 | 4/2001 | Jefferson et al. |
| 6,216,223 | B1 | 4/2001 | Revilla et al. |
| 6,219,833 | B1 | 4/2001 | Solomon et al. |
| RE37,195 | E | 5/2001 | Kean |
| 6,230,307 | B1 | 5/2001 | Davis et al. |
| 6,240,502 | B1 | 5/2001 | Panwar et al. |
| 6,243,808 | B1 | 6/2001 | Wang |
| 6,247,147 | B1 | 6/2001 | Beenstra et al. |
| 6,249,756 | B1 | 6/2001 | Bunton et al. |
| 6,252,792 | B1 | 6/2001 | Marshall et al. |
| 6,256,724 | B1 | 7/2001 | Hocevar et al. |
| 6,260,114 | B1 | 7/2001 | Schug |
| 6,260,179 | B1 | 7/2001 | Ohsawa et al. |
| 6,262,908 | B1 | 7/2001 | Marshall et al. |
| 6,263,430 | B1 | 7/2001 | Trimberger et al. |
| 6,266,760 | B1 | 7/2001 | DeHon et al. |
| 6,279,077 | B1 | 8/2001 | Nasserbakht et al. |
| 6,282,627 | B1 | 8/2001 | Wong et al. |
| 6,282,701 | B1 | 8/2001 | Wygodny et al. |
| 6,285,624 | B1 | 9/2001 | Chen |
| 6,286,134 | B1 | 9/2001 | Click, Jr. et al. |
| 6,288,566 | B1 | 9/2001 | Hanrahan et al. |
| 6,289,369 | B1 | 9/2001 | Sundaresan |
| 6,289,440 | B1 | 9/2001 | Casselman |
| 6,298,043 | B1 | 10/2001 | Mauger et al. |
| 6,298,396 | B1 | 10/2001 | Loyer et al. |
| 6,298,472 | B1 | 10/2001 | Phillips et al. |
| 6,301,706 | B1 | 10/2001 | Maslennikov et al. |
| 6,311,200 | B1 | 10/2001 | Hanrahan et al. |
| 6,311,265 | B1 | 10/2001 | Beckerle et al. |
| 6,321,298 | B1 | 11/2001 | Hubis |
| 6,321,366 | B1 | 11/2001 | Tseng et al. |
| 6,321,373 | B1 | 11/2001 | Ekanadham et al. |
| 6,338,106 | B1 | 1/2002 | Vorbach et al. |
| 6,339,424 | B1 | 1/2002 | Ishikawa et al. |
| 6,339,840 | B1 | 1/2002 | Kothari et al. |
| 6,341,318 | B1 | 1/2002 | Dakhil |
| 6,347,346 | B1 | 2/2002 | Taylor |
| 6,349,346 | B1 | 2/2002 | Hanrahan et al. |
| 6,353,841 | B1 | 3/2002 | Marshall et al. |
| 6,362,650 | B1 | 3/2002 | New et al. |
| 6,370,596 | B1 | 4/2002 | Dakhil |
| 6,373,779 | B1 | 4/2002 | Pang et al. |
| 6,374,286 | B1 | 4/2002 | Gee et al. |
| 6,378,068 | B1 | 4/2002 | Foster et al. |
| 6,381,624 | B1 | 4/2002 | Colon-Bonet et al. |
| 6,389,379 | B1 | 5/2002 | Lin et al. |
| 6,389,579 | B1 | 5/2002 | Phillips et al. |
| 6,392,912 | B1 | 5/2002 | Hanrahan et al. |
| 6,400,601 | B1 | 6/2002 | Sudo et al. |
| 6,404,224 | B1 | 6/2002 | Azegami et al. |
| 6,405,185 | B1 | 6/2002 | Pechanek et al. |
| 6,405,299 | B1 | 6/2002 | Vorbach et al. |
| 6,421,808 | B1 | 7/2002 | McGeer et al. |
| 6,421,809 | B1 | 7/2002 | Wuytack et al. |
| 6,421,817 | B1 | 7/2002 | Mohan et al. |
| 6,425,054 | B1 | 7/2002 | Nguyen |
| 6,425,068 | B1 | 7/2002 | Vorbach et al. |
| 6,426,649 | B1 | 7/2002 | Fu et al. |
| 6,427,156 | B1 | 7/2002 | Chapman et al. |
| 6,430,309 | B1 | 8/2002 | Pressman et al. |
| 6,434,642 | B1 | 8/2002 | Camilleri et al. |
| 6,434,672 | B1 | 8/2002 | Gaither |
| 6,434,695 | B1 | 8/2002 | Esfahani et al. |
| 6,434,699 | B1 | 8/2002 | Jones et al. |
| 6,437,441 | B1 | 8/2002 | Yamamoto |
| 6,438,747 | B1 | 8/2002 | Schreiber et al. |
| 6,449,283 | B1 | 9/2002 | Chao et al. |
| 6,456,628 | B1 | 9/2002 | Greim et al. |
| 6,457,116 | B1 | 9/2002 | Mirsky et al. |
| 6,476,634 | B1 | 11/2002 | Bilski |

6,477,643 B1 11/2002 Vorbach et al.
6,480,937 B1 11/2002 Vorbach et al.
6,480,954 B2 11/2002 Trimberger et al.
6,483,343 B1 11/2002 Faith et al.
6,487,709 B1 11/2002 Keller et al.
6,490,695 B1 12/2002 Zagorski et al.
6,496,740 B1 12/2002 Robertson et al.
6,496,902 B1 12/2002 Faanes et al.
6,496,971 B1 12/2002 Lesea et al.
6,504,398 B1 1/2003 Lien et al.
6,507,898 B1 1/2003 Gibson et al.
6,507,947 B1 1/2003 Schreiber et al.
6,512,804 B1 1/2003 Johnson et al.
6,513,077 B2 1/2003 Vorbach et al.
6,516,382 B2 2/2003 Manning
6,518,787 B1 2/2003 Allegrucci et al.
6,519,674 B1 2/2003 Lam et al.
6,523,107 B1 2/2003 Stansfield et al.
6,525,678 B1 2/2003 Veenstra et al.
6,526,520 B1 2/2003 Vorbach et al.
6,538,468 B1 3/2003 Moore
6,538,470 B1 3/2003 Langhammer et al.
6,539,415 B1 3/2003 Mercs
6,539,438 B1 3/2003 Ledzius et al.
6,539,477 B1 3/2003 Seawright
6,542,394 B2 4/2003 Marshall et al.
6,542,844 B1 4/2003 Hanna
6,542,998 B1 4/2003 Vorbach
6,553,395 B2 4/2003 Marshall et al.
6,553,479 B2 4/2003 Mirsky et al.
6,567,834 B1 5/2003 Marshall et al.
6,571,381 B1 5/2003 Vorbach et al.
6,587,939 B1 7/2003 Takano
6,598,128 B1 7/2003 Yoshioka et al.
6,606,704 B1 8/2003 Adiletta et al.
6,624,819 B1 9/2003 Lewis
6,625,631 B2 9/2003 Ruehle
6,631,487 B1 10/2003 Abramovici et al.
6,633,181 B1 10/2003 Rupp
6,657,457 B1 12/2003 Hanrahan et al.
6,658,564 B1 12/2003 Smith et al.
6,665,758 B1 12/2003 Frazier et al.
6,668,237 B1 12/2003 Guccione et al.
6,681,388 B1 1/2004 Sato et al.
6,687,788 B2 2/2004 Vorbach et al.
6,694,434 B1 2/2004 McGee et al.
6,697,979 B1 2/2004 Vorbach et al.
6,704,816 B1 3/2004 Burke
6,708,223 B1 3/2004 Wang et al.
6,708,325 B2 3/2004 Cooke et al.
6,717,436 B2 4/2004 Kress et al.
6,721,830 B2 4/2004 Vorbach et al.
6,725,334 B2 4/2004 Barroso et al.
6,728,871 B1 4/2004 Vorbach et al.
6,745,317 B1 6/2004 Mirsky et al.
6,748,440 B1 6/2004 Lisitsa et al.
6,751,722 B2 6/2004 Mirsky et al.
6,754,805 B1 6/2004 Juan
6,757,847 B1 6/2004 Farkash et al.
6,757,892 B1 6/2004 Gokhale et al.
6,782,445 B1 8/2004 Olgiati et al.
6,785,826 B1 8/2004 Durham et al.
6,802,026 B1 10/2004 Patterson et al.
6,803,787 B1 10/2004 Wicker, Jr.
6,820,188 B2 11/2004 Stansfield et al.
6,829,697 B1 12/2004 Davis et al.
6,836,842 B1 12/2004 Guccione et al.
6,847,370 B2 1/2005 Baldwin et al.
6,859,869 B1 2/2005 Vorbach
6,868,476 B2 3/2005 Rosenbluth
6,871,341 B1 3/2005 Shyr
6,874,108 B1 3/2005 Abramovici et al.
6,886,092 B1 4/2005 Douglass et al.
6,901,502 B2 5/2005 Yano et al.
6,928,523 B2 8/2005 Yamada
6,957,306 B2 10/2005 So et al.
6,961,924 B2 11/2005 Bates et al.
6,975,138 B2 12/2005 Pani et al.
6,977,649 B1 12/2005 Baldwin et al.
7,000,161 B1 2/2006 Allen et al.
7,007,096 B1 2/2006 Lisitsa et al.
7,010,667 B2 3/2006 Vorbach
7,010,687 B2 3/2006 Ichimura
7,028,107 B2 4/2006 Vorbach et al.
7,036,114 B2 4/2006 McWilliams et al.
7,038,952 B1 5/2006 Zack et al.
7,043,416 B1 5/2006 Lin
7,144,152 B2 12/2006 Rusu et al.
7,155,708 B2 12/2006 Hammes et al.
7,164,422 B1 1/2007 Wholey et al.
7,210,129 B2 4/2007 May et al.
7,216,204 B2 5/2007 Rosenbluth
7,237,087 B2 6/2007 Vorbach et al.
7,249,351 B1 7/2007 Songer et al.
7,254,649 B2 8/2007 Subramanian et al.
7,340,596 B1 3/2008 Crosland et al.
7,346,644 B1 3/2008 Langhammer et al.
7,350,178 B1 3/2008 Crosland et al.
7,382,156 B2 6/2008 Pani et al.
7,455,450 B2 11/2008 Liu et al.
7,595,659 B2 9/2009 Vorbach et al.
7,650,448 B2 1/2010 Vorbach et al.
7,657,877 B2 2/2010 Vorbach et al.
7,759,968 B1 7/2010 Hussein et al.
7,873,811 B1 1/2011 Wolinski et al.
2001/0001860 A1 5/2001 Beiu
2001/0003834 A1 6/2001 Shimonishi
2001/0010074 A1 7/2001 Nishihara et al.
2001/0018733 A1 8/2001 Fujii et al.
2002/0004916 A1 1/2002 Marchand et al.
2002/0010853 A1 1/2002 Trimberger et al.
2002/0013861 A1 1/2002 Adiletta et al.
2002/0032305 A1 3/2002 Barry
2002/0038414 A1 3/2002 Taylor
2002/0045952 A1 4/2002 Blemel
2002/0051482 A1 5/2002 Lomp
2002/0073282 A1 6/2002 Chauvel et al.
2002/0083308 A1 6/2002 Pereira et al.
2002/0099759 A1 7/2002 Gootherts
2002/0103839 A1 8/2002 Ozawa
2002/0124238 A1 9/2002 Metzgen
2002/0138716 A1 9/2002 Master et al.
2002/0143505 A1 10/2002 Drusinsky
2002/0144229 A1 10/2002 Hanrahan
2002/0147932 A1 10/2002 Brock et al.
2002/0152060 A1 10/2002 Tseng
2002/0156962 A1 10/2002 Chopra et al.
2002/0162097 A1 10/2002 Meribout
2002/0165886 A1 11/2002 Lam
2003/0001615 A1 1/2003 Sueyoshi et al.
2003/0014743 A1 1/2003 Cooke et al.
2003/0046607 A1 3/2003 May et al.
2003/0052711 A1 3/2003 Taylor et al.
2003/0055861 A1 3/2003 Lai et al.
2003/0056062 A1 3/2003 Prabhu
2003/0056085 A1 3/2003 Vorbach et al.
2003/0056091 A1 3/2003 Greenberg
2003/0056202 A1 3/2003 May et al.
2003/0061542 A1 3/2003 Bates et al.
2003/0062922 A1 4/2003 Douglass et al.
2003/0070059 A1 4/2003 Dally et al.
2003/0086300 A1 5/2003 Noyes et al.
2003/0093662 A1 5/2003 Vorbach et al.
2003/0097513 A1 5/2003 Vorbach et al.
2003/0123579 A1 7/2003 Safavi et al.
2003/0135686 A1 7/2003 Vorbach et al.
2003/0154349 A1 8/2003 Berg et al.
2003/0192032 A1 10/2003 Andrade et al.
2003/0226056 A1 12/2003 Yip et al.
2004/0015899 A1 1/2004 May et al.
2004/0025005 A1 2/2004 Vorbach et al.
2004/0039880 A1 2/2004 Pentkovski et al.
2004/0078548 A1 4/2004 Claydon et al.
2004/0088689 A1 5/2004 Hammes
2004/0088691 A1 5/2004 Hammes et al.
2004/0168099 A1 8/2004 Vorbach et al.
2004/0199688 A1 10/2004 Vorbach et al.
2005/0066213 A1 3/2005 Vorbach et al.

| | | | |
|---|---|---|---|
| 2005/0091468 | A1 | 4/2005 | Morita et al. |
| 2005/0144210 | A1 | 6/2005 | Simkins et al. |
| 2005/0144212 | A1 | 6/2005 | Simkins et al. |
| 2005/0144215 | A1 | 6/2005 | Simkins et al. |
| 2006/0036988 | A1 | 2/2006 | Allen et al. |
| 2006/0095716 | A1 | 5/2006 | Ramesh |
| 2006/0230094 | A1 | 10/2006 | Simkins et al. |
| 2006/0230096 | A1 | 10/2006 | Thendean et al. |
| 2007/0050603 | A1 | 3/2007 | Vorbach et al. |
| 2007/0083730 | A1 | 4/2007 | Vorbach et al. |
| 2007/0143577 | A1 | 6/2007 | Smith |
| 2008/0313383 | A1 | 12/2008 | Morita et al. |
| 2009/0085603 | A1 | 4/2009 | Paul et al. |
| 2009/0193384 | A1 | 7/2009 | Sima et al. |
| 2010/0306602 | A1 | 12/2010 | Kamiya et al. |

FOREIGN PATENT DOCUMENTS

| | | | |
|---|---|---|---|
| DE | 4416881.0 | | 11/1994 |
| DE | 38 55 673 | | 11/1996 |
| DE | 196 51 075 | | 6/1998 |
| DE | 196 54 593 | | 7/1998 |
| DE | 196 54 595 | | 7/1998 |
| DE | 196 54 846 | | 7/1998 |
| DE | 19654595 | | 7/1998 |
| DE | 19654846 | | 7/1998 |
| DE | 197 04 044 | | 8/1998 |
| DE | 197 04 728 | | 8/1998 |
| DE | 197 04 742 | | 9/1998 |
| DE | 19651075 | | 10/1998 |
| DE | 198 22 776 | | 3/1999 |
| DE | 198 07 872 | | 8/1999 |
| DE | 198 61 088 | | 2/2000 |
| DE | 199 26 538 | | 12/2000 |
| DE | 100 28 397 | | 12/2001 |
| DE | 100 36 627 | | 2/2002 |
| DE | 101 29 237 | | 4/2002 |
| DE | 102 04 044 | | 8/2003 |
| EP | 0 208 457 | | 1/1987 |
| EP | 0 221 350 | | 5/1987 |
| EP | 0 221 360 | | 5/1987 |
| EP | 0 398 552 | | 11/1990 |
| EP | 0 428 327 | | 5/1991 |
| EP | 0428327 | A1 | 5/1991 |
| EP | 748 051 | A2 | 12/1991 |
| EP | 0 463 721 | | 1/1992 |
| EP | 0 477 809 | | 4/1992 |
| EP | 0 485 690 | | 5/1992 |
| EP | 0 497 029 | | 8/1992 |
| EP | 0 539 595 | | 5/1993 |
| EP | 0539595 | A1 | 5/1993 |
| EP | 0 638 867 | A2 | 8/1994 |
| EP | 0 628 917 | | 12/1994 |
| EP | 0 678 985 | | 10/1995 |
| EP | 0 686 915 | | 12/1995 |
| EP | 0 696 001 | | 2/1996 |
| EP | 0 707 269 | | 4/1996 |
| EP | 0 726 532 | | 8/1996 |
| EP | 0 735 685 | | 10/1996 |
| EP | 0835685 | | 10/1996 |
| EP | 0 746 106 | | 12/1996 |
| EP | 0 748 051 | | 12/1996 |
| EP | 0 926 594 | | 6/1999 |
| EP | 1 102 674 | | 7/1999 |
| EP | 726532 | | 8/2000 |
| EP | 1 061 439 | | 12/2000 |
| EP | 1 115 204 | | 7/2001 |
| EP | 1 146 432 | | 10/2001 |
| EP | 1 669 885 | | 6/2006 |
| FR | 2 752 466 | | 2/1998 |
| GB | 2 304 438 | | 3/1997 |
| JP | 58-058672 | | 4/1983 |
| JP | 1044571 | | 2/1989 |
| JP | 1-229378 | | 9/1989 |
| JP | 2-130023 | | 5/1990 |
| JP | 2-226423 | | 9/1990 |
| JP | 5-265705 | | 10/1993 |
| JP | 5-276007 | | 10/1993 |
| JP | 5-509184 | | 12/1993 |
| JP | 6-266605 | | 9/1994 |
| JP | 7-086921 | | 3/1995 |
| JP | 7-154242 | | 6/1995 |
| JP | 8-148989 | | 6/1995 |
| JP | 7-182160 | | 7/1995 |
| JP | 7-182167 | | 7/1995 |
| JP | 8-044581 | | 2/1996 |
| JP | 8-069447 | | 3/1996 |
| JP | 8-101761 | | 4/1996 |
| JP | 8-102492 | | 4/1996 |
| JP | 8-106443 | | 4/1996 |
| JP | 8-221164 | | 8/1996 |
| JP | 8-250685 | | 9/1996 |
| JP | 9-027745 | | 1/1997 |
| JP | 9-237284 | | 9/1997 |
| JP | 9-294069 | | 11/1997 |
| JP | 11-046187 | | 2/1999 |
| JP | 11-184718 | | 7/1999 |
| JP | 11-307725 | | 11/1999 |
| JP | 2000-076066 | | 3/2000 |
| JP | 2000-181566 | | 6/2000 |
| JP | 2000-201066 | | 7/2000 |
| JP | 2000-311156 | | 11/2000 |
| JP | 2001-500682 | | 1/2001 |
| JP | 2001-167066 | | 6/2001 |
| JP | 2001-510650 | | 7/2001 |
| JP | 2001-236221 | | 8/2001 |
| JP | 2002-0033457 | | 1/2002 |
| JP | 3-961028 | | 8/2007 |
| WO | A9004835 | | 5/1990 |
| WO | WO90/04835 | | 5/1990 |
| WO | WO90/11648 | | 10/1990 |
| WO | WO92/01987 | | 2/1992 |
| WO | A9311503 | | 6/1993 |
| WO | WO93/11503 | | 6/1993 |
| WO | WO99/00731 | | 1/1994 |
| WO | WO94/06077 | | 3/1994 |
| WO | WO94/08399 | | 4/1994 |
| WO | 95/00161 | | 1/1995 |
| WO | WO95/26001 | | 9/1995 |
| WO | 0707269 | A | 4/1996 |
| WO | WO98/10517 | | 3/1998 |
| WO | WO98/26356 | | 6/1998 |
| WO | WO98/28697 | | 7/1998 |
| WO | WO98/29952 | | 7/1998 |
| WO | WO98/31102 | | 7/1998 |
| WO | WO98/35294 | | 8/1998 |
| WO | WO98/35299 | | 8/1998 |
| WO | WO99/00731 | | 1/1999 |
| WO | WO99/00739 | | 1/1999 |
| WO | WO99/12111 | | 3/1999 |
| WO | WO99/32975 | | 7/1999 |
| WO | WO99/40522 | | 8/1999 |
| WO | WO99/44120 | | 9/1999 |
| WO | WO99/44147 | | 9/1999 |
| WO | WO00/17771 | | 3/2000 |
| WO | WO00/38087 | | 6/2000 |
| WO | WO00/45282 | | 8/2000 |
| WO | WO00/49496 | | 8/2000 |
| WO | WO00/77652 | | 12/2000 |
| WO | WO01/55917 | | 8/2001 |
| WO | WO02/13000 | | 2/2002 |
| WO | WO02/21010 | | 3/2002 |
| WO | WO02/29600 | | 4/2002 |
| WO | WO02/50665 | | 6/2002 |
| WO | WO02/071196 | | 9/2002 |
| WO | WO02/071248 | | 9/2002 |
| WO | WO02/071249 | | 9/2002 |
| WO | WO02/103532 | | 12/2002 |
| WO | WO03/017095 | | 2/2003 |
| WO | WO03/023616 | | 3/2003 |
| WO | WO03/025781 | | 3/2003 |
| WO | WO03/032975 | | 4/2003 |
| WO | WO03/036507 | | 5/2003 |
| WO | WO 03/091875 | | 11/2003 |
| WO | WO2004/053718 | | 6/2004 |
| WO | WO2004/114128 | | 12/2004 |
| WO | WO2005/045692 | | 5/2005 |
| WO | WO 2007/030395 | | 3/2007 |

OTHER PUBLICATIONS

Arm Limited, "ARM Architecture Reference Manual," Dec. 6, 2000, pp. A10-6-A10-7.
Bondalapati et al., "Reconfigurable Meshes: Theory and Practice," Dept. of Electrical Engineering-Systems, Univ. of Southern California, Apr. 1997, Reconfigurable Architectures Workshop, International Parallel Processing Symposium, 15 pages.
Cherbaka, Mark F., "Verification and Configuration of a Run-time Reconfigurable Custom Computing Integrated Circuit for DSP Applications," Thesis: Virginia Polytechnic Institute and State University, Jul. 8, 1996, 106 pages.
Cong at al., "Structural Gate Decomposition for Depth-Optimal Technology Mapping in LUT-Based FPGA Designs," Univ. of California, ACM Transactions on Design Automation of Electronic Systems, vol. 5, No. 2, Apr. 2000, pp. 193-225.
Foldoc, The Free On-Line Dictionary of Computing, "handshaking," online Jan. 13, 1995, retrieved from Internet Jan. 23, 2011 at http://foldoc.oru/handshake.
Li et al., "Hardware-Software Co-Design of Embedded Reconfigurable Architectures," Los Angeles, CA, 2000, ACM, pp. 507-512.
Marshall et al., "A Reconfigurable Arithmetic Array for Multimedia Applications," FPGA '99 Proceedings of the 1999 ACM/SIGDA Seventh International Symposium on Field Programmable Gate Arrays, 10 pages.
Melvin, Stephen et al., "Hardware Support for Large Atomic Units in Dynamically Scheduled Machines," Computer Science Division, University of California, Berkeley, IEEE (1988), pp. 60-63.
Pistorius et al., "Generation of Very Large Circuits to Benchmark the Partitioning of FPGAs," Monterey, CA, 1999, ACM, pp. 67-73.
Roterberg, Eric., et al., "Trace Cache: a Low Latency Approach to High Bandwidth Instruction Fetching," Proceedings of the 29th Annual International Symposium on Michoarchitecture, Paris, France, IEEE (1996), 12 pages.
Translation of DE 101 39 170 by examiner using Google Translate, 10 pages.
Altera, "Implementing High-Speed Search Applications with Altera CAM," Jul. 2001, Ver. 2.1, Application Note 119, 50 pages.
Bolsens, Ivo (CTO Xilinx), "FPGA, a history of interconnect," Xilinx slide presentation, posted on the internet Oct. 30, 2008 at http://www.doestoc.com/docs/2198008/FPGA-a-historv-of-interconnect, 32 pages.
Agarwal, A., et al., "April: A Processor Architecture for Multiprocessing," Laboratory for Computer Science, MIT, Cambridge, MA, IEEE 1990, pp. 104-114.
Almasi and Gottlieb, *Highly Parallel Computing,* The Benjamin/Cummings Publishing Company, Inc., Redwood City, CA, 1989, 3 pages (Fig. 4.1).
Advanced RISC Machines Ltd (ARM), "AMBA—Advanced Microcontroller Bus Architecture Specification," (Document No. ARM IHI 0001C), Sep. 1995, 72 pages.
Alfke, Peter; New, Bernie, *Xilinx Application Note*, "Additional XC3000 Data," XAPP 024.000, 1994, pp. 8-11 through 8-20.
Alfke, Peter; New, Bernie, *Xilinx Application Note*, "Adders, Subtracters and Accumulators in XC3000," XAPP 022.000, 1994, pp. 8-98 through 8-104.
Alfke, Peter, *Xilinx Application Note*, "Megabit FIFO in Two Chips: One LCA Device and One DRAM," XAPP 030.000, 1994, pp. 8-148 through 8-150.
Alfke, Peter, *Xilinx Application Note*, "Dynamic Reconfiguration," XAPP 093, Nov. 10, 1997, pp. 13-45 through 13-46.
Alfke, Peter; New, Bernie, *Xilinx Application Note*, "Implementing State Machines in LCA Devices," XAPP 027.001, 1994, pp. 8-169 through 8-172.
Algotronix, Ltd., CAL64K Preliminary Data Sheet, Apr. 1989, pp. 1-24.
Algotronix, Ltd., CAL4096 Datasheet, 1992, pp. 1-53.
Algotronix, Ltd., CHS2×4 User Manual, "CHA2×4 Custom Computer," 1991, pp. 1-38.
Allaire, Bill; Fischer, Bud, *Xilinx Application Note*, "Block Adaptive Filter," XAPP 055, Aug. 15, 1996 (Version 1.0), pp. 1-10.
Altera Application Note (73), "Implementing FIR Filters in FLEX Devices," Altera Corporation, Feb. 1998, ver. 1.01, pp. 1-23.
Athanas, P. (Thesis), "An adaptive machine architecture and compiler for dynamic processor reconfiguration," Brown University 1992, pp. 1-157.
Berkeley Design Technology, Inc., *Buyer's Guide to DSP Processors,* 1995, Fremont, CA., pp. 673-698.
Bittner, R. et al., "Colt: An Experiment in Wormhole Run-Time Reconfiguration," Bradley Department of Electrical and Computer Engineering, Blacksburg, VA, SPIE—International Society for Optical Engineering, vol. 2914/187, Nov. 1996, Boston, MA, pp. 187-194.
Camilleri, Nick; Lockhard, Chris, *Xilinx Application Note*, "Improving XC4000 Design Performance," XAPP 043.000, 1994, pp. 8-21 through 8-35.
Cartier, Lois, *Xilinx Application Note*, "System Design with New XC4000EX I/O Features," Feb. 21, 1996, pp. 1-8.
Chen, D., (Thesis) "Programmable arithmetic devices for high speed digital signal processing," U. California Berkeley 1992, pp. 1-175.
Churcher, S., et al., "The XC6200 FastMap TM Processor Interface," Xilinx, Inc., Aug. 1995, pp. 1-8.
Cowie, Beth, *Xilinx Application Note*, "High Performance, Low Area, Interpolator Design for the XC6200," XAPP 081, May 7, 1997 (Version 1.0), pp. 1-10.
Duncan, Ann, *Xilinx Application Note*, "A32x16 Reconfigurable Correlator for the XC6200," XAPP 084, Jul. 25, 1997 (Version 1.0), pp. 1-14.
Ebeling, C., et al., "RaPiD—Reconfigurable Pipelined Datapath," Dept. of Computer Science and Engineering, U. Washington, 1996, pp. 126-135.
Epstein, D., "IBM Extends DSP Performance with Mfast—Powerful Chip Uses Mesh Architecture to Accelerate Graphics, Video," 1995 MicroDesign Resources, vol. 9, No. 16, Dec. 4, 1995, pp. 231-236.
Fawcett, B., "New SRAM-Based FPGA Architectures Address New Applications," Xilinx, Inc. San Jose, CA, Nov. 1995, pp. 231-236.
Goslin, G; Newgard, B, *Xilinx Application Note*, "16-Tap, 8-Bit FIR Filter Applications Guide," Nov. 21, 1994, pp. 1-5.
Iwanczuk, Roman, *Xilinx Application Note*, "Using the XC4000 RAM Capability," XAPP 031.000, 1994, pp. 8-127 through 8-138.
Knapp, Steven, "Using Programmable Logic to Accelerate DSP Functions," Xilinx, Inc., 1995, pp. 1-8.
New, Bernie, *Xilinx Application Note*, "Accelerating Loadable Counters in SC4000," XAPP 023.001, 1994, pp. 8-82 through 8-85.
New, Bernie, *Xilinx Application Note*, "Boundary Scan Emulator for XC3000," XAPP 007.001, 1994, pp. 8-53 through 8-59.
New, Bernie, *Xilinx Application Note*, "Ultra-Fast Synchronous Counters," XAPP 014.001, 1994, pp. 8-78 through 8-81.
New, Bernie, *Xilinx Application Note*, "Using the Dedicated Carry Logic in XC4000," XAPP 013.001, 1994, pp. 8-105 through 8-115.
New, Bernie, *Xilinx Application Note*, "Complex Digital Waveform Generator," XAPP 008.002, 1994, pp. 8-163 through 8-164.
New, Bernie, *Xilinx Application Note*, "Bus-Structured Serial Input-Output Device," XAPP 010.001, 1994, pp. 8-181 through 8-182.
Ridgeway, David, *Xilinx Application Note*, "Designing Complex 2-Dimensional Convolution Filters," XAPP 037.000, 1994, pp. 8-175 through 8-177.
Rowson, J., et al., "Second-generation compilers optimize semicustom circuits," Electronic Design Feb. 19, 1987, pp. 92-96.
Schewel, J., "A Hardware/Software Co-Design System using Configurable Computing Technology," Virtual Computer Corporation, Reseda, CA, IEEE 1998, pp. 620-625.
Segers, Dennis, Xilinx Memorandum, "Mike—Product Description and MRD," Jun. 8, 1994, pp. 1-29.
Texas Instruments, "TMS320C8x System-Level Synopsis," Sep. 1995, 75 pages.
Texas Instruments, "TMS320C80 Digital Signal Processor," Data Sheet, Digital Signal Processing Solutions 1997, 171 pages.
Texas Instruments, "TMS320C80 (MVP) Parallel Processor," User's Guide, Digital Signal Processing Products 1995, 73 pages.
Trainor, D.W., et al., "Implementation of the 2D DCT Using A Xilinx XC6264 FPGA," 1997, IEEE Workshop of Signal Processing Systems SiPS 97, pp. 541-550.

Trimberger, S, (Ed.) et al., "Field-Programmable Gate Array Technology," 1994, Kluwer Academic Press, pp. 1-258 (and the Title Page, Table of Contents, and Preface) [274 pages total].
Trimberger, S., "A Reprogrammable Gate Array and Applications," IEEE 1993, Proceedings of the IEEE, vol. 81, No. 7, Jul. 1993, pp. 1030-1041.
Trimberger, S., et al., "A Time-Multiplexed FPGA," Xilinx, Inc., 1997 IEEE, pp. 22-28.
Ujvari, Dan, *Xilinx Application Note*, "Digital Mixer in an XC7272," XAPP 035.002, 1994, p. 1.
Veendrick, H., et al., "A 1.5 GIPS video signal processor (VSP)," Philips Research Laboratories, The Netherlands, IEEE 1994 Custom Integrated Circuits Conference, pp. 95-98.
Wilkie, Bill, *Xilinx Application Note*, "Interfacing XC6200 to Microprocessors (TMS320C50 Example)," XAPP 064, Oct. 9, 1996 (Version 1.1), pp. 1-9.
Wilkie, Bill, *Xilinx Application Note*, "Interfacing XC6200 to Microprocessors (MC68020 Example)," XAPP 063, Oct. 9, 1996 (Version 1.1), pp. 1-8.
XCELL, Issue 18, Third Quarter 1995, "Introducing three new FPGA Families!"; "Introducing the XC6200 FPGA Architecture: The First FPGA Architecture Optimized for Coprocessing in Embedded System Applications," 40 pages.
*Xilinx Application Note*, Advanced Product Specification, "XC6200 Field Programmable Gate Arrays," Jun. 1, 1996 (Version 1.0), pp. 4-253-4-286.
*Xilinx Application Note*, "A Fast Constant Coefficient Multiplier for the XC6200," XAPP 082, Aug. 24, 1997 (Version 1.0), pp. 1-5.
*Xilinx Technical Data*, "XC5200 Logic Cell Array Family," Preliminary (v1.0), Apr. 1995, pp. 1-43.
*Xilinx Data Book*, "The Programmable Logic Data Book," 1996, 909 pages.
Xilinx, Series 6000 User's Guide, Jun. 26, 1997, 223 pages.
Yeung, K., (Thesis) "A Data-Driven Multiprocessor Architecture for High Throughput Digital Signal Processing," Electronics Research Laboratory, U. California Berkeley, Jul. 10, 1995, pp. 1-153.
Yeung, L., et al., "A 2.4GOPS Data-Driven Reconfigurable Multiprocessor IC for DSP," Dept. of EECS, U. California Berkeley, 1995 IEEE International Solid State Circuits Conference, pp. 108-110.
Zilog Preliminary Product Specification, "Z86C95 CMOS Z8 Digital Signal Processor," 1992, pp. 1-82.
Zilog Preliminary Product Specification, "Z89120 Z89920 (ROMless) 16-Bit Mixed Signal Processor," 1992, pp. 1-82.
Defendants' Invalidity Contentions in *PACT XPP Technologies, AG* v. *Xilinx, Inc et al.,* (*E.D. Texas Dec. 28, 2007*) (*No. 2:07cv563*)., including Exhibits A through K in separate PDF files.
U.S. Appl. No. 90/010,979, Vorbach et al., filed May 4, 2010.
U.S. Appl. No. 90/011,087, Vorbach et al., filed Jul. 8, 2010.
U.S. Appl. No. 90/010,450, Vorbach et al. filed Mar. 27, 2009.
U.S. Appl. No. 60/109,417, Jefferson et al., filed Nov. 18, 1998.
Abnous et al., "Ultra-Low-Power Domain-Specific Multimedia Processors," U.C. Berkeley, 1996 IEEE, pp. 461-470.
Abnous, A., et al., "The Pleiades Architecture," Chapter 1 of *The Application of Programmable DSPs in Mobile Communications,* A. Gatherer and A. Auslander, Ed., Wiley, 2002, pp. 1-33.
Ade, et al., "Minimum Memory Buffers in DSP Applications," Electronics Letters, vol. 30, No. 6, Mar. 17, 1994, pp. 469-471.
Advanced RISC Machines, "Introduction to AMBA," Oct. 1996, Section 1, pp. 1-7.
ARM, "The Architecture for the Digital World," http://www.arm.com/products/ Mar. 18,.2009, 3 pages.
ARM, "The Architecture for the Digital World; Milestones," http://www.arm.com/aboutarm/milestones.html Mar. 18, 2009, 5 pages.
Albaharna, O.T. et al., "On the Viability of FPGA—Based Integrated Coprocessors," Dept. of Electrical and Electronic Engineering, Imperial College of Science, London, 1999 IEEE, pp. 206-215.
Alippi, et al., "Determining the Optimum Extended Instruction Set Architecture for Application Specific Reconfigurable VLIW CPUs," IEEE, 2001, pp. 50-56.
Altera, "Flex 8000 Programmable Logic Device Family," Altera Corporation Data Sheet, Jan. 2003, pp. 1-62.
Altera, "Flex 10K Embedded Programmable Logic Device Family," Altera Corporation Data Sheet, Jan. 2003, pp. 1-128.
Altera, "APEX 20K Programmable Logic Device Family," Altera Corporation Data Sheet, Mar. 2004, ver. 5.1, pp. 1-117.
Altera, "2. TriMatrix Embedded Memory Blocks in Stratix & Stratix GX Devices," Altera Corporation, Jul. 2005, 28 pages.
Altera, "APEX II Programmable Logic Device Family," Altera Corporation Data Sheet, Aug. 2002, Ver. 3.0, 99 pages.
Arabi, et al., "PLD Integrates Dedicated High-speed Data Buffering, Complex State machine, and Fast Decode Array," conference record on WESCON '93, Sep. 28, 1993, pp. 432-436.
Asari, K. et al., "FeRAM circuit technology for system on a chip," *Proceedings First NASA/DoD Workshop on Evolvable Hardware* (1999), pp. 193-197.
Athanas, "A Functional Reconfigurable Architecture and Compiler for Adoptive Computing," IEEE 1993, pp. 49-55.
Athanas, et al., "An Adaptive Hardware Machine Architecture and Compiler for Dynamic Processor Recongifugation," IEEE, Laboratory for Engineering man/Machine Systems Division of Engineering, Box D, Brown University, Providence, Rhode Island, 1991, pp. 397-400.
Athanas et al., "Processor Reconfiguration Through Instruction-Set Metamorphosis," 1993, IEEE Computers, pp. 11-18.
Atmel, 5-K-50K Gates Coprocessor FPGA with Free Ram, Data Sheet, Jul. 2006, 55 pages.
Atmel, FPGA—based FIR Filter Application Note, Sep. 1999, 10 pages.
Atmel, "An Introduction to DSP Applications using the AT4OK FPGA," FPGA Application Engineering, San Jose, CA, Apr. 2004, 15 pages.
Atmel, Configurable Logic Design & Application Book, Atmel Corporation, 1995, pp. 2-19 through 2-25.
Atmel, Field Programmable Gate Array Configuration Guide, AT6000 Series Configuration Data Sheet, Sep. 1999, pp. 1-20.
Bacon, D. et al., "Compiler Transformations for High-Performance Computing," ACM Computing Surveys, 26(4):325-420 (1994).
Bakkes, P.J., et al., "Mixing Fixed and Reconfigurable Logic for Array Processing," Dept. of Electrical and Electronic Engineering, University of Stellenbosch, South Africa, 1996 IEEE, pp. 118-125.
Ballagh et al., "Java Debug Hardware Models Using JBits," 8$^{th}$ Reconfigurable Architectures Workshop, 2001, 8 pages.
Baumgarte, V. et al., "PACT XPP—A Self-reconfigurable Data Processing Architecture," PACT Info. GmbH, Munchen Germany, 2001, 7 pages.
Beck et al., "From control flow to data flow," TR 89-1050, Oct. 1989, Dept. of Computer Science, Cornell University, Ithaca, NY, pp. 1-25.
Becker, J., "A Partitioning Compiler for Computers with Xputer-based Accelerators," 1997, Kaiserslautern University, 326 pp.
Becker, J. et al., "Architecture, Memory and Interface Technology Integration of an Industrial/Academic Configurable System-on-Chip (CSoC)," IEEE Computer Society Annual Workshop on VLSI (WVLSI 2003) (Feb. 2003), 6 pages.
Becker, J., "Configurable Systems-on-Chip (CSoC)," (Invited Tutorial), Proc. of 9th Proc. of XV Brazilian Symposium on Integrated Circuit, Design (SBCCI 2002), (Sep. 2002), 6 pages.
Becker et al., "Automatic Parallelism Exploitation for FPL—Based Accelerators," 1998, Proc. 31$^{st}$ Annual Hawaii International Conference on System Sciences, pp. 169-178.
Becker, J. et al., "Parallelization in Co-compilation for Configurable Accelerators—a Host/accelerator Partitioning Compilation Method," Proceedings of Asia and South Pacific Design Automation Conference, Yokohama, Japan, Feb. 10-13, 1998, 11 pages.
Bellows et al., "Designing Run-Time Reconfigurable Systems with JHDL," Journal of VLSI Signal Processing 28, Kluwer Academic Publishers, The Netherlands, 2001, pp. 29-45.
Bittner, "Wormhole Run-time Reconfiguration: Conceptualization and VLSI Design of a High Performance Computing System," *Dissertation,* Jan. 23, 1997, pp. I-XX, 1-415.
"BlueGene/L—Hardware Architecture Overview," BlueGene/L design team, IBM Research, Oct. 17, 2003 slide presentation, pp. 1-23.
"BlueGene/L: the next generation of scalable supercomputer," Kissel et al., Lawrence Livermore National Laboratory, Livermore, California, Nov. 18, 2002, 29 pages.

BlueGene Project Update, Jan. 2002, IBM slide presentation, 20 pages.
BlueGene/L, "An Overview of the BlueGene/L Supercomputer," The BlueGene/L Team, IBM and Lawrence Livermore National Laboratory, 2002 IEEE. pp. 1-22.
Bratt, A, "Motorola field programmable analogue arrays, present hardware and future trends," Motorola Programmable Technology Centre, Gadbrook Business Centre, Northwich, Cheshire, 1998, The Institute of Electrical Engineers, IEE. Savoy Place, London, pp. 1-5.
Cadambi, et al., "Managing Pipeline-reconfigurable FPGAs," ACM, 1998, pp. 55-64.
Callahan, et al., "The Garp Architecture and C Compiler," Computer, Apr. 2000, pp. 62-69.
Cardoso, J.M.P., et al., "A novel algorithm combining temporal partitioning and sharing of functional units," University of Algarve, Faro, Portugal, 2001 IEEE, pp. 1-10.
Cardoso, Joao M.P., and Markus Weinhardt, "XPP-VC: A C Compiler with Temporal Partitioning for the PACT-XPP Architecture," Field-Programmable Logic and Applications. Reconfigurable Computing is Going Mainstream, 12th International Conference FPL 2002, Proceedings (Lecture Notes in Computer Science, vol. 2438) Springer-Verlag Berlin, Germany, 2002, pp. 864-874.
Cardoso, J.M.P., "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000.
Cardoso, J.M.P., et al., "Compilation and Temporal Partitioning for a Coarse-Grain Reconfigurable Architecture," New Algorithms, Architectures and Applications for Reconfigurable Computing, Lysacht, P. & Rosentiel, W. eds., (2005) pp. 105-115.
Cardoso, J.M.P., et al., "Macro-Based Hardware Compilation of Java™0 Bytecodes into a Dynamic Reconfigurable Computing System," IEEE, Apr. 21, 1999, pp. 2-11.
Chaudhry, G.M. et al., "Separated caches and buses for multiprocessor system," Circuits and Systems, 1993; Proceedings of the 36th Midwest Symposium on Detroit, MI, USA, Aug. 16-18, 1993, New York, NY IEEE, Aug. 16, 1993, pp. 1113-1116, XP010119918 ISBN: 0-7803-1760-2.
Chen et al., "A reconfigurable multiprocessor IC for rapid prototyping of algorithmic-specific high-speed DSP data paths," IEEE Journal of Solid-State Circuits, vol. 27, No. 12, Dec. 1992, pp. 1895-1904.
Clearspeed, CSX Processor Architecture, Whitepaper, PN-1110-0702, 2007, pp. 1-15, www.clearspeed.com.
Clearspeed, CSX Processor Architecture, Whitepaper, PN-1110-0306, 2006, pp. 1-14, www.clearspeed.com.
Compton, K., et al., "Configurable Computing: A Survey of Systems and Software," Northwestern University, Dept. of ECE, Technical Report, 1999, (XP-002315148), 39 pages.
Cook, Jeffrey J., "The Amalgam Compiler Infrastructure," Thesis at the University of Illinois at Urbana-Champaign (2004) Chapter 7 & Appendix G.
Cronquist, D., et al., "Architecture Design of Reconfigurable Pipelined Datapaths," Department of Computer Science and Engineering, University of Washington, Seattle, WA, Proceedings of the 20th Anniversary Conference on Advanced Research in VSLI, 1999, pp. 1-15.
Culler, D.E; Singh, J.P., "Parallel Computer Architecture," pp. 434-437, 1999, Morgan Kaufmann, San Francisco, CA USA, XP002477559.
Culler, D.E; Singh, J.P., "Parallel Computer Architecture," p. 17, 1999, Morgan Kaufmann, San Francisco, CA USA, XP002477559.
DeHon, A., "DPGA Utilization and Application," MIT Artificial Intelligence Laboratory, Proceedings of the Fourth International ACM Symposium on Field-Programmable Gate Arrays (FPGA 1996), IEEE Computer Society, pp. 1-7.
DeHon, Andre, "Reconfigurable Architectures for General-Purpose Computing," Massachusetts Institute of Technology, Technical Report AITR-1586, Oct. 1996 (1996-10), XP002445054, Cambridge, MA, pp. 1-353.
Del Corso at al., "Microcomputer Buses and Links," Academic Press Inc. Ltd., 1986, pp. 138-143, 277-285.
Diniz, P., et al., "Automatic Synthesis of Data Storage and Control Structures for FPGA—based Computing Engines," 2000, IEEE, pp. 91-100.
Diniz, P., et al., "A behavioral synthesis estimation interface for configurable computing," University of Southern California, Marina Del Rey, CA, 2001 IEEE, pp. 1-2.
Donandt, "Improving Response Time of Programmable Logic Controllers by use of a Boolean Coprocessor," AEG Research Institute Berlin, IEEE, 1989, pp. 4-167-4-169.
Dutt, et al., "If Software is King for Systems-in-Silicon, What's New in Compilers?" IEEE, 1997, pp. 322-325.
Ebeling, C., et al., "Mapping Applications to the RaPiD Configurable Architecture," Department of Computer Science and Engineering, University of Washington, Seattle, WA, *FPGAs for Custom Computing Machines, 1997. Proceedings., The 5th Annual IEEE Symposium,* Publication Date: Apr. 16-18, 1997, 10 pages.
Equator, Pixels to Packets, Enabling Multi-Format High Definition Video, Equator Technologies BSP-15 Product Brief, www.equator.com, 2001, 4 pages.
Fawcett, B.K., "Map, Place and Route: The Key to High-Density PLD Implementation," Wescon Conference, IEEE Center (Nov. 7, 1995) pp. 292-297.
Ferrante, J., et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Library.
Fineberg, S, et al., "Experimental Analysis of a Mixed-Mode Parallel Architecture Using Bitonic Sequence Sorting," Journal of Parallel and Distributed Computing, vol. 11, No. 3, Mar. 1991, pp. 239-251.
Fornaciari, et al., System-level power evaluation metrics, 1997 Proceedings of the 2nd Annual IEEE International Conference on Innovative Systems in Silicon, New York, NY, Oct. 1997, pp. 323-330.
Forstner, "Wer Zuerst Kommt, Mahlt Zuerst!: Teil 3: Einsatzgebiete and Anwendungbeispiele von FIFO-Speichern," Elektronik, Aug. 2000, pp. 104-109.
Franklin, Manoj, et al., "A Fill-Unit Approach to Multiple Instruction Issue," Proceedings of the Annual International Symposium on Microarchitecture, Nov. 1994, pp. 162-171.
Freescale Slide Presentation, An Introduction to Motorola's RCF (Reconfigurable Compute Fabric) Technology, Presented by Frank David, Launched by Freescale Semiconductor, Inc., 2004, 39 pages.
Galanis, M.D. et al., "Accelerating Applications by Mapping Critical Kernels on Coarse-Grain Reconfigurable Hardware in Hybrid Systems," Proceedings of the 13th Annual IEEE Symposium on Field-Programmable Custom Computing Machines, 2005, 2 pages.
Genius, D., et al., "A Case for Array Merging in Memory Hierarchies," Proceedings of the 9th International Workshop on Compilers for Parallel Computers, CPC'01 (Jun. 2001), 10 pages.
Gokhale, M.B., et al., "Automatic Allocation of Arrays to Memories in FPGA processors with Multiple Memory Banks," Field-Programmable Custom Computing Machines, 1999, IEEE, pp. 63-69.
Guccione et al., "JBits: Java based interface for reconfigurable computing," Xilinx, Inc., San Jose, CA, 1999, 9 pages.
Guo, Z. et al., "A Compiler Intermediate Representation for Reconfigurable Fabrics," University of California, Riverside, Dept. of Electrical Engineering, IEEE 2006, 4 pages.
Gwennap, Linley, "P6 Underscores Intel's Lead," Microprocessor Report, vol. 9., No. 2, Feb. 16 1995 (MicroDesign Resources), p. 1 and pp. 6-15.
Gwennap, Linley, "Intel's P6 Bus Designed for Multiprocessing," Microprocessor Report, vol. 9, No. 7 (MicroDesign Resources), May 30, 1995, p. 1 and pp. 6-10.
Hammes, Jeff, et al., "Cameron: High Level Language Compilation for Reconfigurable Systems," Department of Computer Science, Colorado State University, Conference on Parallel Architectures and Compilation Techniques, Oct. 12-16, 1999, 9 pages.
Hartenstein, R. et al., "A new FPGA architecture for word-oriented datapaths," Proc. FPL'94, Springer LNCS, Sep. 1994, pp. 144-155.
Hartenstein, R., "Coarse grain reconfigurable architectures," Design Automation Conference, 2001, Proceedings of the ASP-DAC 2001 Asia and South Pacific, Jan. 30-Feb. 2, 2001, IEEE Jan. 30, 2001, pp. 564-569.

Hartenstein et al., "Parallelizing Compilation for a Novel Data-Parallel Architecture," 1995, PCAT-94, Parallel Computing: Technology and Practice, 13 pp.
Hartenstein et al., "A Two-Level Co-Design Framework for Xputer-based Data-driven Reconfigurable Accelerators," 1997, Proceedings of the Thirtieth Annual Hawaii International Conference on System Sciences, 10 pp.
Hastie et al., "The implementation of hardware subroutines on field programmable gate arrays," Custom Integrated Circuits Conference, 1990, Proceedings of the IEEE 1990, May 16, 1990, pp. 31.3.1-31.4.3 (3 pages).
Hauck, "The Roles of FPGAs in Reprogrammable Systems," IEEE, Apr. 1998, pp. 615-638.
Hauser, J.R., et al., "Garp: A MIPS Processor with a Reconfigurable Coprocessor," University of California, Berkeley, IEEE, Apr. 1997, pp. 12-23.
Hauser, John Reid, (Dissertation) "Augmenting a Microprocessor with Reconfigurable Hardware," University of California, Berkeley, Fall 2000, 255 pages. (submitted in 3 PDFs, Parts 1-3).
Hauser, John R., "The Garp Architecture," University of California at Berkeley, Computer Science Division, Oct. 1997, pp. 1-55.
Hedge, S.J., "3D WASP Devices for On-line Signal and Data Processing," 1994, International Conference on Wafer Scale Integration, pp. 11-21.
Hendrich, N., et al., "Silicon Compilation and Rapid Prototyping of Microprogrammed VLSI—Circuits with MIMOLA and SOLO 1400," Microprocessing & Microprogramming (Sep. 1992) vol. 35(1-5), pp. 287-294.
Huang, Libo et al., "A New Architecture for Multiple-Precision Floating-Point Multiply-Add Fused Unit Design," School of Computer National University of Defense Technology, China, IEEE 2007, 8 pages.
Hwang, K., "Advanced Computer Architecture—Parallelism, Scalability, Programmability," 1993, McGraw-Hill, Inc., pp. 348-355.
Hwang, K., "Computer Architecture and Parallel Processing," Data Flow Computers and VLSI Computations, XP-002418655, 1985 McGraw-Hill, Chapter 10, pp. 732-807.
Hwang, L., et al., "Min-cut Replication in Partitioned Networks," IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.
IBM Technical Disclosure Bulletin, IBM Corp., New York, XP000424878, Bd. 36, Nr. 11, Nov. 1, 1993, pp. 335-336.
"IEEE Standard Test Access Port and Boundary-Scan Architecture," IEEE Std. 1149.1-1990,1993, pp. 1-127.
IMEC, "ADRES multimedia processor & 3MF multimedia platform," Transferable IP, IMEC Technology Description, (Applicants believe the date to be Oct. 2005), 3 pages.
Intel, "Pentium Pro Family Developer's Manual, vol. 3: Operating System Writer's Guide," Intel Corporation, Dec. 1995, [submitted in 4 PDF files: Part I, Part II, Part III and Part IV], 458 pages.
Intel, Intel MXP5800/MXP5400 Digital Media Processors, Architecture Overview, Jun. 2004, Revision 2.4, pp. 1-24.
Inside DSP, "Ambric Discloses Massively Parallel Architecture," Aug. 23, 2006, http://www.insidedsp.com/Articles/tabid/64/articleType/ArticleView/articleId/155/Default.aspx, 2 pages.
Iseli, C., et al. "A C++ Compiler for FPGA Custom Execution Units Synthesis," IEEE, 1995, pp. 173-179.
Isshiki, Tsuyoshi, et al., "Bit-Serial Pipeline Synthesis for Multi-FPGA Systems with C++ Design Capture," 1996 IEEE, pp. 38-47.
Jacob, J., et al., "Memory Interfacing and Instruction Specification for Reconfigurable Processors," ACM Feb. 1999, pp. 145-154.
Jantsch, Axel et al., "A Case Study on Hardware/Software Partitioning," Royal Institute of Technology, Kista, Sweden, Apr. 10, 1994, IEEE, pp. 111-118.
Jantsch, Axel et al., "Hardware/Software Partitioning and Minimizing Memory Interface Traffic," Electronic System Design Laboratory, Royal Institute of Technology, ESDLab, Electrum 229, S-16440 Kista, Sweden (Apr. 1994), pp. 226-231.
Jo, Manhwee et al., "Implementation of Floating-Point Operations for 3D Graphics on a Coarse-Grained Reconfigurable Architecture," Design Automation Laboratory, School of EE/CS, Seoul National University, Korea, IEEE 2007, pp. 127-130.
John, L., et al., "A Dynamically Reconfigurable Interconnect for Array Processors," vol. 6, No. 1, Mar. 1998, IEEE, pp. 150-157.
Kanter, David, "NVIDIA's GT200: Inside a Parallel Processor," http://www.realworldtech.com/page.cfm?ArticleID=RWT090989195242&p=1, Sep. 8, 2008, 27 pages.
Kastrup, B., "Automatic Hardware Synthesis for a Hybrid Reconfigurable CPU Featuring Philips CPLDs," Proceedings of the PACT Workshop on Reconfigurable Computing, 1998, pp. 5-10.
Kaul, M., et al., "An automated temporal partitioning and loop fission approach of FPGA based reconfigurable synthesis of DSP applications," University of Cincinnati, Cincinnati, OH, ACM 1999, pp. 616-622.
Kean, T.A., "Configurable Logic: A Dynamically Programmable Cellular Architecture and its VLSI Implementation," University of Edinburgh (Dissertation) 1988, pp. 1-286. [in two PDFs, Pt. 1 and Pt.2.].
Kean, T., et al., "A Fast Constant Coefficient Multiplier for the XC6200," Xilinx, Inc., Lecture Notes in Computer Science, vol. 1142, Proceedings of the 6th International Workshop of Field-Programmable Logic, 1996, 7 pages.
Kim et al., "A Reconfigurable Multifunction Computing Cache Architecture," IEEE Transactions on Very Large Scale Integration (VLSI) Systems vol. 9, Issue 4, Aug. 2001 pp. 509-523.
Knittel, Gunter, "A PCI—compatible FPGA—Coprocessor for 2D/3D Image Processing," University of Turgingen, Germany, 1996 IEEE, pp. 136-145.
Koch, A., et al., "Practical Experiences with the SPARXIL Co-Processor," 1998, IEEE, pp. 394-398.
Koch, Andreas et al., "High-Level-Language Compilation for Reconfigurable Computers," Proceedings of European Workshop on Reconfigurable Communication-Centric SOCS (Jun. 2005) 8 pages.
Koren et al., "A data-driven VLSI array for arbitrary algorithms," IEEE Computer Society, Long Beach, CA vol. 21, No. 10, Oct. 1, 1988, pp. 30-34.
Kung, "Deadlock Avoidance for Systolic Communication," 1988 Conference Proceedings of the 15th Annual International Symposium on Computer Architecture, May 30, 1998, pp. 252-260.
Lange, H. et al., "Memory access schemes for configurable processors," Field-Programmable Logic and Applications, International Workshop, FPL, Aug. 27, 2000, pp. 615-625, XP02283963.
Larsen, S., et al., "Increasing and Detecting Memory Address Congruence," Proceedings of the 2002 IEEE International Conference on Parallel Architectures and Compilation Techniques (PACT'02), pp. 1-12 (Sep. 2002).
Lee et al., "A new distribution network based on controlled switching elements and its applications," IEEE/ACT Trans. of Networking, vol. 3, No. 1, pp. 70-81, Feb. 1995.
Lee, Jong-eun, et al., "Reconfigurable ALU Array Architecture with Conditional Execution," International Soc. Design Conference (ISOOC) [online] Oct. 25, 2004, Seoul, Korea, 5 pages.
Lee, R. B., et al., "Multimedia extensions for general-purpose processors," *IEEE Workshop on Signal Processing Systems, SIPS 97—Design and Implementation* (1997), pp. 9-23.
Lee, Ming-Hau et al., "Design and Implementation of the MorphoSys Reconfigurable Computing Processors," The Journal of VLSI Signal Processing, Kluwer Academic Publishers, BO, vol. 24, No. 2-3, Mar. 2, 2000, pp. 1-29.
Ling, X., "WASMII: An MPLD with Data-Driven Control on a Virtual Hardware," Journal of Supercomputing, Kluwer Acdemic Publishers, Dordrecht, Netherlands, 1995, pp. 253-276.
Ling et al., "WASMII: A Multifunction Programmable Logic Device (MPLD) with Data Driven Control," The Transactions of the Institute of Electronics, Information and Communication Engineers, Apr. 25, 1994, vol. J77-D-1, Nr. 4, pp. 309-317. [This reference is in Chinese, but should be comparable in content to the Ling et al. reference above.]
Mano, M.M., "Digital Design," by Prentice Hall, Inc., Englewood Cliffs, New Jersey 07632, 1984, pp. 119-125, 154-161.
Margolus, N., "An FPGA architecture for DRAM-based systolic computations," Boston University Center for Computational Science and MIT Artificial Intelligence Laboratory, IEEE 1997, pp. 2-11.

Maxfield,C., "Logic that Mutates While-U-Wait," EDN (Bur. Ed) (USA), EDN (European Edition), Nov. 7, 1996, Cahners Publishing, USA, pp. 137-140, 142.
Mei, Bingfeng, "A Coarse-Grained Reconfigurable Architecture Template and Its Compilation Techniques," Katholeike Universiteit Leuven, PhD Thesis, Jan. 2005, IMEC vzw, Universitair Micro-Electronica Centrum, Belgium, pp. 1-195 (and Table of Contents).
Mei, Bingfeng et al., "Design and Optimization of Dynamically Reconfigurable Embedded Systems," IMEC vzw, 2003, Belgium, 7 pages, http://www.imec.be/reconfigurable/pdf/ICERSA_01_design.pdf.
Mei, Bingfeng et al., "Adres: An Architecture with Tightly Coupled VLIW Processor and Coarse-Grained Reconfigurable Matrix," Proc. *Field-Programmable Logic and Applications* (FPL 03), Springer, 2003, pp. 61-70.
Miller, M.J., et al., "High-Speed FIFOs Contend with Widely Differing Data Rates: Dual-port RAM Buffer and Dual-pointer System Provide Rapid, High-density Data Storage and Reduce Overhead," Computer Design, Sep. 1, 1985, pp. 83-86.
Mirsky, E. DeHon, "Matrix: A Reconfigurable Computing Architecture with Configurable Instruction Distribution and Deployable Resources," Proceedings of the IEEE Symposium on FPGAs for Custom Computing Machines, 1996, pp. 157-166.
Miyamori, T., et al., "REMARC: Reconfigurable Multimedia Array Coprocessor," Computer Systems Laboratory, Stanford University, IEICE Transactions on Information and Systems E Series D, 1999; (abstract): Proceedings of the 1998 ACM/SIGDA sixth international symposium on Field programmable gate arrays, p. 261, Feb. 22-25, 1998, Monterey, California, United States, pp. 1-12.
Moraes, F., et al., "A Physical Synthesis Design Flow Based on Virtual Components," XV Conference on Design of Circuits and Integrated Systems (Nov. 2000) 6 pages.
Muchnick, S., "Advanced Compiler Design and Implementation," (Morgan Kaufmann 1997), Table of Contents, 11 pages.
Murphy, C., "Virtual Hardware Using Dynamic Reconfigurable Field Programmable Gate Arrays," Engineering Development Centre, Liverpool John Moores University, UK, GERI Annual Research Symposium 2005, 8 pages.
Myers, G. "Advances in Computer Architecture," Wiley-Interscience Publication, 2nd ed., John Wiley & Sons, Inc., 1978, pp. 463-494.
Nageldinger, U., "Design-Space Exploration for Coarse Grained Reconfigurable Architectures," (Dissertation) Universitaet Kaiserslautern, 2000, Chapter 2, pp. 19-45.
Neumann, T., et al., "A Generic Library for Adaptive Computing Environments," Field Programmable Logic and Applications, 11$^{th}$ International Conference, FPL 2001, Proceedings (Lecture Notes in Computer Science, vol. 2147) (2001) pp. 503-512.
Nilsson, et al., "The Scalable Tree Protocol—A Cache Coherence Approaches for Large-Scale Multiprocessors," IEEE, pp. 498-506, Dec. 1992.
Norman, R.S., "Hyperchip Business Summary, The Opportunity," Jan. 31, 2000, pp. 1-3.
Ohmsha, "Information Processing Handbook," edited by the Information Processing Society of Japan, pp. 376, Dec. 21, 1998.
Olukotun, K., "The Case for a Single-Chip Microprocessor," ACM Sigplan Notices, ACM, Association for Computing Machinery, New York, vol. 31, No. 9, Sep. 1996 pp. 2-11.
Ozawa, Motokazu et al., "A Cascade ALU Architecture for Asynchronous Super-Scalar Processors," IEICE Transactions on Electronics, Electronics Society, Tokyo, Japan, vol. E84-C, No. 2, Feb. 2001, pp. 229-237.
PACT Corporation, "The XPP Communication System," Technical Report 15 (2000), pp. 1-16.
Parhami, B., "Parallel Counters for Signed Binary Signals," Signals, Systems and Computers, 1989, Twenty-Third Asilomar Conference, vol. 1, pp. 513-516.
PCI Local Bus Specification, Production Version, Revision 2.1, Portland, OR, Jun. 1, 1995, pp. 1-281.
Piotrowski, A., "IEC-BUS, Die Funktionsweise des IEC-Bus unde seine Anwendung in Geräten und Systemen," 1987, Franzis-Verlag GmbH, München, pp. 20-25. [English Abstract Provided].
Pirsch, P. et al., "VLSI implementations of image and video multimedia processing systems," *IEEE Transactions on Circuits and Systems for Video Technology,* vol. 8, No. 7, Nov. 1998, pp. 878-891.
Price et al., "Debug of Reconfigurable Systems," Xilinx, Inc., San Jose, CA, Proceedings of SPIE, 2000, pp. 181-187.
Quenot, G.M., et al., "A Reconfigurable Compute Engine for Real-Time Vision Automata Prototyping," Laboratoire Systeme de Perception, DGA/Etablissement Technique Central de l'Armement, France, 1994 IEEE, pp. 91-100.
Razdan et al., A High-Performance Microarchitecture with Hardware-Programmable Functional Units, Micro-27, Proceedings of the 27$^{th}$ Annual International Symposium on Microarchitecture, IEEE Computer Society and Association for Computing Machinery, Nov. 30-Dec. 2, 1994, pp. 172-180.
Ryo, A., "Auszug aus Handbuch der Informationsverarbeitung," ed. Information Processing Society of Japan, *Information Processing Handbook, New Edition,* Software Information Center, Ohmsha, Dec. 1998, 4 pages. [Translation provided].
Saleeba, Z.M.G., "A Self-Reconfiguring Computer System," Department of Computer Science, Monash University (Dissertation) 1998, pp. 1-306.
Saleeba, M. "A Self-Contained Dynamically Reconfigurable Processor Architecture," Sixteenth Australian Computer Science Conference, ASCS-16, QLD, Australia, Feb. 1993, pp. 59-70.
Salefski, B. et al., "Re-configurable computing in wireless," *Annual ACM IEEE Design Automation Conference: Proceedings of the 38$^{th}$ conference on Design automation* (2001) pp. 178-183.
Schmidt, H. et al., "Behavioral synthesis for FGPA—based computing," Carnegie Mellon University, Pittsburgh, PA, 1994 IEEE, pp. 125-132.
Schmidt, U. et al., "Datawave: A Single-Chip Multiprocessor for Video Applications," *IEEE Micro*, vol. 11, No. 3, May/Jun. 1991, pp. 22-25, 88-94.
Schmit, et al., "Hidden Markov Modeling and Fuzzy Controllers in FPGAs, FPGAs for Custom Computing Machines," 1995; Proceedings, IEEE Symposium in Napa Valley, CA, Apr. 1995, pp. 214-221.
Schöonfeld, M., et al., "The LISA Design Environment for the Synthesis of Array Processors Including Memories for the Data Transfer and Fault Tolerance by Reconfiguration and Coding Techniques," J. VLSI Signal Processing Systems for Signal, Image, and Video Technology, (Oct. 1, 1995) vol. 11(1/2), pp. 51-74.
Shin, D., et al., "C-based Interactive RTL Design Methodology," Technical Report CECS-03-42 (Dec. 2003) pp. 1-16.
Shirazi, et al., "Quantitative analysis. of floating point arithmetic on FPGA based custom computing machines," IEEE Symposium on FPGAs for Custom Computing Machines, *IEEE Computer Society Press,* Apr. 19-21, 1995, pp. 155-162.
Short, Kenneth L., *Microprocessors and Programmed Logic,* Prentice Hall, Inc., New Jersey 1981, p. 34.
Siemers, C., "Rechenfabrik Ansaetze Fuer Extrem Parallele Prozessoren," Verlag Heinze Heise GmbH., Hannover, DE No. 15, Jul. 16, 2001, pp. 170-179.
Siemers et al., "The .>S<puter: A Novel Micoarchitecture Model for Execution inside Superscalar and VLIW Processors Using Reconfigurable Hardware," Australian Computer Science Communications, vol. 20, No. 4, Computer Architecture, Proceedings of the 3$^{rd}$ Australian Computer Architecture Conference, Perth, John Morris, Ed., Feb. 2-3, 1998, pp. 169-178.
Simunic, et al., Source Code Optimization and Profiling of Energy Consumation in Embedded Systems, Proceedings of the 13$^{th}$ International Symposium on System Synthesis, Sep. 2000, pp. 193-198.
Singh, H. et al., "MorphoSys: An Integrated Reconfigurable System for Data-Parallel Computation-Intensive Applications," University of California, Irvine, CA. and Federal University of Rio de Janeiro, Brazil, 2000, IEEE Transactions on Computers, pp. 1-35.
Skokan, Z.E., "Programmable logic machine (A programmable cell array)," IEEE Journal of Solid-State Circuits, vol. 18, Issue 5, Oct. 1983, pp. 572-578.
Sondervan, J., "Retiming and logic synthesis," Electronic Engineering (Jan. 1993) vol. 65(793), pp. 33, 35-36.
Soni, M., "VLSI Implementation of a Wormhole Run-time Reconfigurable Processor," Jun. 2001, (Masters Thesis)Virginia Polytechnic Institute and State University, 88 pages.

Sueyoshi, T, "Present Status and Problems of the Reconfigurable Computing Systems Toward the Computer Evolution," Department of Artificial Intelligence, Kyushi Institute of Technology, Fukuoka, Japan; Institute of Electronics, Information and Communication Engineers, vol. 96, No. 426, IEICE Technical Report (1996), pp. 111-119 [English Abstract Only].
Sundararajan et al., "Testing FPGA Devices Using JBits," Proc. MAPLD 2001, Maryland, USA, Katz (ed.), NASA, CA, 8 pages.
Sutton et al., "A Multiprocessor DSP System Using PADDI-2," U.C. Berkeley, 1998 ACM, pp. 62-65.
Tau, E., et al., "A First Generation DPGA Implementation," *FPD'95,* pp. 138-143.
Tenca, A.F., et al., "A Variable Long-Precision Arithmetic Unit Design for Reconfigurable Coprocessor Architectures," University of California, Los Angeles, 1998, pp. 216-225.
The XPP White Paper, Release 2.1, PACT—A Technical Perspective, Mar. 27, 2002, pp. 1-27.
TMS320C54X DSP: CPU and Peripherals, Texas Instruments, 1996, 25 pages.
TMS320C54x DSP: Mnemonic Instruction Set, Texas Instruments, 1996, 342 pages.
Tsutsui, A., et al., "YARDS: FPGA/MPU Hybrid Architecture for Telecommunication Data Processing," NTT Optical Network Systems Laboratories, Japan, 1997 ACM, pp. 93-99.
Vasell et al., "The Function Processor: A Data-Driven Processor Array for Irregular Computations," Chalmers University of Technology, Sweden, 1992, pp. 1-21.
Venkatachalam et al., "A highly flexible, distributed multiprocessor architecture for network processing," Computer Networks, The International Journal of Computer and Telecommunications Networking, vol. 41, No. 5, Apr. 5, 2003, pp. 563-568.
Villasenor, et al., "Express Letters Video Communications Using Rapidly Reconfigurable Hardware," IEEE Transactions on Circuits and Systems for Video Technology, IEEE, Inc., NY, Dec. 1995, pp. 565-567.
Wada, et al., "A Performance Evaluation of Tree-based Coherent Distributed Shared Memory," Proceedings of the Pacific RIM Conference on Communications, Comput and Signal Processing, Victoria, May 19-21, 1993, pp. 390-393.
Waingold, E., et al., "Baring it all to software: Raw machines," IEEE Computer, Sep. 1997, at 86-93.
Webster's Ninth New Collegiate Dictionary, Merriam-Webster, Inc., 1990, p. 332 (definition of "dedicated").
Weinhardt, M., "Compilation Methods for Structure-programmable Computers," dissertation, ISBN 3-89722-011-3, 1997. [Table of Contents and English Abstract Provided].
Weinhardt, Markus et al., "Pipeline Vectorization for Reconfigurable Systems," 1999, IEEE, pp. 52-62.
Weinhardt, Markus et al., "Pipeline Vectorization," IEEE Transactions on Computer-Aided Design of Integrated Circuits and Systems, vol. 20, No. 2, Feb. 2001, pp. 234-248.
Weinhardt, Markus et al., "Memory Access Optimization for Reconfigurable Systems," IEEE Proceedings Computers and Digital Techniques, 48(3)(May 2001) pp. 1-16.
Wittig, et al., "OneChip: An FPGA Processor with Reconfigurable Logic," IEEE, 1996, pp. 126-135.
Wolfe, M. et al., "High Performance Compilers for Parallel Computing," (Addison-Wesley 1996) Table of Contents, 11 pages.
Wu, et al., "A New Cache Directory Scheme," IEEE, pp. 466-472, Jun. 1996.
Xilinx, "Logic Cell Array Families: XC4000, XC4000A and XC4000H," 1994, product description, pp. 2-7, 2-9, 2-14, 2-15, 8-16, and 9-14.
Xilinx, "The Programmable Logic Data Book," 1994, Section 2, pp. 1-231, Section 8, pp. 1, 23-25, 29, 45-52, 169-172.
Xilinx, "Spartan and SpartanXL Families Field Programmable Gate Arrays," Jan. 1999, Xilinx, pp. 4-3 through 4-70.
Xilinx, "XC6200 Field Programmable Gate Arrays," Apr. 24, 1997, Xilinx product description, pp. 1-73.
Xilinx, "XC3000 Series Field Programmable Gate Arrays," Nov. 6, 1998, Xilinx product description, pp. 1-76.
Xilinx, "XC4000E and XC4000X Series Field Programmable Gate Arrays," May 14, 1999, Xilinx product description, pp. 1-68.
Xilinx, "Virtex-E 1.8 V Extended Memory Field Programmable Gate Arrays," (v1.5) Jul. 17, 2002, Xilinx Production Product Specification, pp. 1-118.
Xilinx, "Virtex-E 1.8 V Extended Memory Field Programmable Gate Arrays," (v2.2) Sep. 10, 2002, Xilinx Production Product Specification, pp. 1-52.
Xilinx, "Virtex-II and Virtex-II Pro X FPGA User Guide," Mar. 28, 2007, Xilinx user • aide, pp. 1-559.
Xilinx, "Virtex-II and Virtex-II Pro X FPGA Platform FPGAs: Complete Data Sheet," (v4.6) Mar. 5, 2007, pp. 1-302.
Xilinx, "Virtex-II Platform FPGAs: Complete Data Sheet," (v3.5) Nov. 5, 2007, pp. 1-226.
Xilinx, White Paper 370: (Virtex-6 and Spartan-6 FPGA Families) "Reducing Switching Power with Intelligent Clock Gating," Frederic Rivoallon, May 3, 2010, pp. 1-5.
Xilinx, White Paper 298: (Spartan-6 and Virtex-6 Devices) "Power Consumption at 40 and 50 nm," Matt Klein, Apr. 13, 2009, pp. 1-21.
Xu, H. et al., "Parallel QR Factorization on a Block Data Flow Architecture," Conference Proceeding Article, Mar. 1, 1992, pp. 332-336.
Ye, Z.A. et al., "A C-Compiler for a Processor With a Reconfigurable Functional Unit," FPGA 2000 ACM/SIGNA International Symposium on Field Programmable Gate Arrays, Monterey, CA Feb 9-11, 2000, pp. 95-100.
Yeung, A. et al., "A data-driven architecture for rapid prototyping of high throughput DSP algorithms," Dept. of Electrical Engineering and Computer Sciences, Univ. of California, Berkeley, USA, *Proceedings VLSI Signal Processing Workshop, IEEE Press,* pp. 225-234, Napa, Oct. 1992.
Yeung, A. et al., "A reconfigurable data-driven multiprocessor architecture for rapid prototyping of high throughput DSP algorithms," Dept. of Electrical Engineering and Computer Sciences, Univ. of California, Berkeley, USA, pp. 169-178, IEEE 1993.
Zhang, et al., "Architectural Evaluation of Flexible Digital Signal Processing for Wireless Receivers, Signals, Systems and Computers," 2000; Conference Record of the Thirty-Fourth Asilomar Conference, Bd. 1, Oct. 29, 2000, pp. 78-83.
Zhang, et al., "A 1-V Heterogeneous Reconfigurable DSP IC for Wireless Baseband Digital Signal Processing," IEEE Journal of Solid-State Circuits, vol. 35, No. 11, Nov. 2000, pp. 1697-1704.
Zhang et al., "Abstract: Low-Power Heterogeneous Reconfigurable Digital Signal Processors with Energy-Efficient Interconnect Network," U.C. Berkeley (2004), pp. 1-120.
Zima, H. et al., "Supercompilers for parallel and vector computers," (Addison-Wesley 1991) Table of Contents, 5 pages.
Xilinx, Inc.'s and Avnet, Inc.'s Disclosure Pursuant to P.R. 4-2; *PACT XPP Technologies, AG.* V. *Xilinx, Inc. and Avnet, Inc.,* Case No. 2:07-cv-00563-TJW-CE, U.S. District Court for the Eastern District of Texas, Dec. 28, 2007, 4 pages.
Xilinx, Inc.'s and Avnet, Inc.'s Disclosure Pursuant to P.R. 4-1; *PACT XPP Technologies, AG.* V *Xilinx, Inc. and Avnet, Inc.,* Case No. 2:07-cv-00563-TJW-CE, U.S. District Court for the Eastern District of Texas, Dec. 28, 2007, 9 pages.
Defendant's Claim Construction Chart for P.R. 4-2 Constructions and Extrinsic Evidence for Terms Proposed by Defendants, *PACT XPP Technologies, AG.* V. *Xilinx, Inc. and AVNET, Inc.,* Case No. 2:07-cv-00563-TJW-CE, U.S. District Court for the Eastern District of Texas, Dec. 28, 2007, pp. 1-19.
PACT's P.R. 4-1 List of Claim Terms for Construction, *PACT XPP Technologies, AG.* V. *Xilinx, Inc. and AVNET, Inc.,* Case No. 2:07-cv-00563-TJW-CE, U.S. District Court for the Eastern District of Texas, Dec. 28, 2007, pp. 1-7.
PACT's P.R. 4-2 Preliminary Claim Constructions and Extrinsic Evidence, *PACT XPP Technologies, AG.* V *Xilinx, Inc. and AVNET, Inc.,* Case No. 2:07-cv-00563-TJW-CE, U.S. District Court for the Eastern District of Texas, Dec. 28, 2007, pp. 1-16, and Exhibits re Extrinsic Evidence Parts in seven (7) separate additional PDF files (Parts 1-7).
Ramanathan et al., "Reconfigurable Filter Coprocessor Architecture for DSP Applications," Journal of VLSI Signal Processing, 2000, vol. 26, pp. 333-359.

Shanley, Tom, *Pentium Pro and Pentium II System Architecture,* MindShare, Inc., Addition Wesley, 1998, Second Edition, pp. 11-17; Chapter 7; Chapter 10; pp. 209-211, and p. 394.
Shoup, Richard, "Programmable Cellular Logic Arrays," Dissertation, Computer Science Department, Carnegie-Mellon University, Mar. 1970, 193 pages.
Zucker, Daniel F., "A Comparison of Hardware Prefetching Techniques for Multimedia Benchmarks," Technical Report: CSL-TR-95-683, Dec. 1995, 26 pages.
Microsoft Press Computer Dictionary, Third Edition, Redmond, WA, 1997, 3 pages.
Microsoft Press Computer Dictionary, Second Edition, Redmond, WA, 1994, 3 pages.
A Dictionary of Computing, Fourth Edition, Oxford University Press, 1997, 4 pages.
Communications Standard Dictionary, Third Edition, Martin Weik (Ed.), Chapman & Hall, 1996, 3 pages.
Dictionary of Communications Technology, Terms Definitions and Abbreviations, Second Edition, Gilbert Held (Ed.), John Wiley & Sons, England, 1995, 5 pages.
The Random House College Dictionary, Revised Edition, Random House, Inc., 1984, 14 pages.
The Random House College Dictionary, Revised Edition, Random House, Inc., 1984, 7 pages.
Random House Webster's College Dictionary with CD-ROM, Random House, 2001, 7 pages.
Random House Webster's College Dictionary with CD-ROM, Random House, 2001, 4 pages.
Random House Personal Computer Dictionary, Second Edition, Philip E. Margolis (Ed.), Random House, New York, 1996, 5 pages.
The IEEE Standard Dictionary of Electrical and Electronics Terms, Sixth Edition, 1996, 36 pages.
The IEEE Standard Dictionary of Electrical and Electronics Terms, Sixth Edition, 1996, 8 pages.
McGraw-Hill Electronics Dictionary, Sixth Edition, Neil Sclater et al. (Ed.), McGraw-Hill, 1997, 3 pages.
Modern Dictionary of Electronics, Sixth Edition, Rudolf Graf (Ed.), Newnes (Butterwoth-Heinemann), 1997, 5 pages.
The American Heritage Dictibnary, Fourth Edition, Dell (Houghton-Mifflin), 2001, 5 pages.
The American Heritage Dictionary, Second College Edition, Houghton Mifflin, 1982, 23 pages.
The American Heritage Dictionary, Second College Edition, Houghton Mifflin, 1982, 8 pages.
The American Heritage Dictionary, Third Edition, Dell Publishing (Bantam Doubleday Dell Publishing Group, Inc.), 1994, 4 pages.
The American Heritage Dictionary, Fourth Edition, Dell/Houghton Mifflin 2001, 5 pages.
Webster's New Collegiate Dictionary, Merriam Co., 1981, 5 pages.
Webster's New Collegiate Dictionary, Merriam Co., 1981, 4 pages.
The Oxford American Dictionary and Language Guide, Oxford University Press, 1999, 5 pages.
The Oxford Duden German Dictionary, Edited by the Dudenredaktion and the German Section of the Oxford University Press, W. Scholze-Stubenrecht et al. (Eds), Clarendon Press, Oxford, 1990, 7 pages.
Oxford Dictionary of Computing, Oxford University Press, 2008, 4 pages.
Modern Dictionary of Electronics, Sixth Edition Revised and Updated, Rudolf F. Graf (Ed.), Butterworth-Heinemann, 1997, 7 pages.
Modern Dictionary of Electronics, Sixth Edition Revised and Updated, Rudolf F. Graf (Ed.), Butterworth-Heinemann, 1997, 5 pages.
Garner's Modern American Usage, Bryan A. Garner (Ed.), Oxford University Press, 2003, 3 pages.
The New Fowler's Modern English Usage, R.W. Burchfield (Ed.), Oxford University Press, 2000, 3 pages.
Wikipedia, the free encyclopedia, "Granularity," at http://en.wikipedia.org/wiki/Granularity, Jun. 18, 2010, 4 pages.
Wordsmyth, The Premier Educational Dictionary—Thesaurus, at http://www.wordsmyth.net, "communication," Jun. 18, 2010, 1 page.
Yahoo! Education, "affect," at http://education.yahoo.com/reference/dictionary/entry/affect, Jun. 18, 2010, 2 pages.
mPulse Living Language, "high-level," at http://www.macmillandictionary.com/dictionary/american/high-level, Jun. 18, 2010, 1 page.
MSN Encarta, "regroup," at http://encarta.msn.com/encnet/features/dictionary/DictionaryResults.aspx?lextype=3&search=regroup, Jun. 17, 2010, 2 pages.
MSN Encarta, "synchronize," at http://encarta.msn.com/encnet/features/dictionary/DictionaryResults.aspx?lextype=3&search=synchronize, Jun. 17, 2010, 2 pages.
MSN Encarta, "pattern," at http://encarta.msn.com/encnet/features/dictionary/DictionaryResults.aspx?lextype=3&search=pattern, Jun. 17, 2010, 2 pages.
MSN Encarta, "dimension," at http://encarta.msn.com/encnet/features/dictionary/DictionaryResults.aspx?lextype=3&search=dimension, Jun. 17, 2010, 2 pages.
MSN Encarta, "communication," at http://encarta.msn.com/encnet/features/dictionary/DictionaryResults.aspx?lextype=3&search=communication, Jun. 17, 2010, 2 pages.
MSN Encarta, "arrangement," at http://encarta.msn.com/encnet/features/dictionary/DictionaryResults.aspx?lextype=3&search=arrangement , Jun. 17, 2010, 2 pages.
MSN Encarta, "vector," at http://encarta.msn.com/encnet/features/dictionary/DictionaryResults.aspx?lextype=3&search=vector, Jul. 30, 2010, 2 pages.
Dictionary.com, "address," at http://dictionary.reference.com/browse/address, Jun. 18, 2010, 4 pages.
P.R . 4-3 Joint Claim Constructions Statement, *PACT XPP Technologies, AG* v. *Xilinx, Inc. and Avnet, Inc at al., E.D. Texas, 2:07-cv00563-CE*, Jul. 19, 2010, pp. 1-50.
Order Granting Joint Motion for Leave to File An Amended Joint Claim Construction and Prehearing Statement and Joint Motion to File an Amended Joint Claim Construction and Prehearing Statement Pursuant to Local Patent Rule 4-3, and Exhibit A: P.R. 4-3 Amended Joint Claim Constructions Statement, *PACT XPP Technologies, AG* v. *Xilinx, Inc. and Avnet, Inc. et al., E.D. Texas, 2:07-cv-00563-CE*, Aug. 2, 2010, 72 pages.
P.R. 4-3 Amended Joint Claim Constructions Statement, *PACT XPP Technologies, AG* v. *Xilinx, Inc. and Avnet, Inc. et al., E.D. Texas, 2:07-cv-00563-CE*, Aug. 3, 2010, pp. 1-65.
Exhibit A—P.R. 4-3 Amended Joint Claim Constructions Statement, *PACT XPP Technologies, AG* v. *Xilinx, Inc. and Avnet, Inc. et al., E.D. Texas, 2:07-cv-00563-CE*, Aug. 2, 2010, pp. 1-66.
PACT's Opening Claim Construction Brief, *PACT XPP Technologies, AG* v. *Xilinx, Inc. and Avnet, Inc., E.D. Texas, 2:07-cv-00563-CE*, Nov. 1, 2010, pp. 1-55.
Declaration of Harry L. (Nick) Tredennick in Support of Pact's Claim Constructions, *PACT XPP Technologies, AG* v. *Xilinx, Inc. and Avnet, Inc. et al., E.D. Texas, 2:07-cv-00563-CE*, Nov. 1, 2010, pp. 1-87.
Transcript of Harry (Nick) L. Tredennick III, Ph.D., Oct. 11, 2010, vol. 1, Exhibit 16 of PACT's Opening Claim Construction Brief, *PACT XPP Technologies, AG* v. *Xilinx, Inc. and Avnet, Inc. et al., E.D. Texas, 2:07-cv-00563-CE*, Nov. 1, 2010, pp. 1-3.
Agreed and Disputed Terms, Exhibit 17 of PACT's Opening Claim Construction Brief, *PACT XPP Technologies, AG* v. *Xilinx, Inc. and Avnet, Inc. et al., E.D. Texas, 2:07-cv-00563-CE*, Nov. 1, 2010, pp. 1-16.
Oral Videotaped Deposition—Joseph McAlexander dated Oct. 12, 2010, vol. 1, Exhibit 18 of PACT's Opening Claim Construction Brief, *PACT XPP Technologies, AG* v. *Xilinx, Inc. and Avnet, Inc. et al., E.D. Texas, 2:07-cv-00563-CE*, Nov. 1, 2010, pp. 1-17.
Expert Report of Joe McAlexander Re Claim Construction dated Sep. 27, 2010, Exhibit 19 of PACT's Opening Claim Construction Brief, *PACT XPP Technologies, AG* v. *Xilinx, Inc. and Avnet, Inc. et al., E.D. Texas, 2:07-cv-00563-CE*, Nov. 1, 2010, pp. 1-112.
Documents from File History of U.S. Appl. No. 09/290,342, filed Apr. 12, 1999, Exhibit 20 of PACT's Opening Claim Construction Brief, *PACT XPP Technologies, AG* v. *Xilinx, Inc. and Avnet, Inc. et al., E.D. Texas, 2:07-cv-00563-CE*, Nov. 1, 2010, pp. 1- 37.

Amendment from File History of U.S. Appl. No. 10/156,397, filed May 28, 2002, Exhibit 25 of PACT's Opening Claim Construction Brief, *PACT XPP Technologies, AG* v. *Xilinx, Inc. and Avnet, Inc. et al., E.D. Texas, 2:07-cv-00563-CE*, Nov. 1, 2010, pp. 1-12.
Documents from File History U.S. Appl. No. 09/329,132, filed Jun. 9, 1999, Exhibit 27 of PACT's Opening Claim Construction Brief, *PACT XPP Technologies, AG* v. *Xilinx, Inc. and Avnet, Inc. et al., E.D. Texas, 2:07-cv-00563-CE*, Nov. 1, 2010, pp. 1- 36.
Amendment from File History of U.S. Appl. No. 10/791,501, filed Mar. 1, 2004, Exhibit 39 of PACT's Opening Claim Construction Brief, *PACT XPP Technologies, AG* v. *Xilinx, Inc. and Avnet, Inc. et al., E.D. Texas, 2:07-cv-00563-CE*, Nov. 1, 2010, pp. 1-9.
Amendment from File History of U.S. Appl. No. 10/265,846, filed Oct. 7, 2002, Exhibit 40 of PACT's Opening Claim Construction Brief, *PACT XPP Technologies, AG* v. *Xilinx, Inc. and Avnet, Inc. et al., E.D. Texas,'2:07-cv-00563-CE*, Nov. 1, 2010, pp. 1-12.
Defendants Xilinx, Inc. and Avnet, Inc.'s Responsive Claim Construction Brief, *PACT XPP Technologies, AG* v. *Xilinx, Inc. and Avnet, Inc. et al., E.D. Texas, 2:07-cv-00563-CE*, Dec. 6, 2010, pp. 1-55.
Declaration of Aaron Taggart in Support of Defendants Xilinx, Inc. and Avnet, Inc.'s Responsive Claim Construction Brief, Defendants Xilinx, Inc. and Avnet, Inc.'s Responsive Claim Construction Brief (Exhibit A), *PACT XPP Technologies, AG* v. *Xilinx, Inc. and Avnet, Inc. et al., E.D. Texas, 2:07-cv-00563-CE*, Dec. 6, 2010, pp. 1-5.
Oral Videotaped Deposition Joseph McAlexander (Oct. 12, 2010), Exhibit 1 of Defendants Xilinx, Inc. and Avnet, Inc.'s Responsive Claim Construction Brief, *PACT XPP Technologies, AG* v. *Xilinx, Inc. and Avnet, Inc. et al., E.D. Texas, 2:07-cv-00563-CE*, Dec. 6, 2010, pp. 1-9.
Expert Report of Joe McAlexander re Claim Construction, Exhibit 2 of Defendants Xilinx, Inc. and Avnet, Inc.'s Responsive Claim Construction Brief, *PACT XPP Technologies, AG* v. *Xilinx, Inc. and Avnet, Inc. et al., E.D. Texas, 2:07-cv-00563-CE*, Dec. 6, 2010, pp. 1-137.
Various Documents from File History of U.S. Appl. No. 09/290,342, filed Apr. 12, 1999, Exhibit 6 of Defendants Xilinx, Inc. and Avnet, Inc.'s Responsive Claim Construction Brief, *PACT XPP Technologies, AG* v. *Xilinx, Inc. and Avnet, Inc. et al., E.D. Texas, 2:07-cv-00563-CE*, Dec. 6, 2010, pp. 1-181.
Transcript of Harry (Nick) L. Tredennick III, Ph.D., Oct. 11, 2010, vol. 1, Exhibit 7 of Defendants Xilinx, Inc. and Avnet, Inc.'s Responsive Claim Construction Brief, *PACT XPP Technologies, AG* v. *Xilinx, Inc. And Avnet, Inc. et al., E.D. Texas, 2:07-cv-00563-CE*, Dec. 6, 2010, pp. 1-28.
Amendment, Response from File History of U. S. Patent Application U.S. Appl. No. 10/156,397, filed May 28, 2002, Exhibit 15 of Defendants Xilinx, Inc. and Avnet, Inc.'s Responsive Claim Construction Brief, *PACT XPP Technologies, AG* v. *Xilinx, Inc. and Avnet, Inc. et al., E.D. Texas, 2:07-cv-00563-CE*, Dec. 6, 2010, pp. 1-137.
Application from File History of U.S. Appl. No. 08/544,435, filed Nov. 17, 1995, Exhibit 20 of Defendants Xilinx, Inc. and Avnet, Inc.'s Responsive Claim Construction Brief, *PACT XPP Technologies, AG* v. *Xilinx, Inc. and Avnet, Inc. et al., E.D. Texas, 2:07-cv-00563-CE*, Dec. 6, 2010, pp. 1-102.
Documents from File History of U.S. Appl. No. 09/329,132, filed Jun. 9, 1999, Exhibit 24 of Defendants Xilinx, Inc. and Avnet, Inc.'s Responsive Claim Construction Brief, *PACT XPP Technologies, AG* v. *Xilinx, Inc. and Avnet, Inc. et al, E.D. Texas, 2:07-cv-00563-CE*, Dec. 6, 2010, pp. 1-13.
Documents from File History of U.S. Appl. No. 10/791,501, filed Mar. 1, 2004, Exhibit 25 of Defendants Xilinx, Inc. and Avnet, Inc.'s Responsive Claim Construction Brief, *PACT XPP Technologies, AG* v. *Xilinx, Inc. and Avnet, Inc. et al., E.D. Texas, 2:07-cv-00563-CE*, Dec. 6, 2010, pp. 1-14.
Amendment from File History of U.S. Appl. No. 11/246,617, filed Oct. 7, 2005, Exhibit 26 of Defendants Xilinx, Inc. and Avnet, Inc.'s Responsive Claim Construction Brief, *PACT XPP Technologies, AG* v. *Xilinx, Inc. and Avnet, Inc. et al., E.D. Texas, 2:07-cv-00563-CE*, Dec. 6, 2010, pp. 1-9.
Documents from File History of U.S. Appl. No. 08/947,254, filed Oct. 8, 1997, Exhibit 27 of Defendants Xilinx, Inc. and Avnet, Inc.'s Responsive Claim Construction Brief, *PACT XPP Technologies, AG* v. *Xilinx, Inc. and Avnet, Inc. et al., E.D. Texas, 2:07-cv-00563-CE*, Dec. 6, 2010, pp. 1-38.
Documents from File History of U.S. Appl. No. 08/947,254, filed Oct. 8, 1997, specifically, German priority application specification [English translation provided], Exhibit 33 of Defendants Xilinx, Inc. and Avnet, Inc.'s Responsive Claim Construction Brief, *PACT XPP Technologies, AG* v. *Xilinx, Inc. and Avnet, Inc. et al., E.D. Texas, 2:07-cv-00563-CE*, Dec. 6, 2010, 54 pages [including English translation].
Documents from File History of U.S. Appl. No. 09/335,974, filed Jun. 18, 1999, Exhibit 28 of Defendants Xilinx, Inc. and Avnet, Inc.'s Responsive Claim Construction Brief, *PACT XPP Technologies, AG* v. *Xilinx, Inc. and Avnet, Inc. et al., E.D. Texas, 2:07-cv-00563-CE*, Dec. 6, 2010, pp. 1-32.
Documents from File History of U.S. Patent Reexamination Control No. 90/010,450, filed Mar. 27, 2009, Exhibit 30 of Defendants Xilinx, Inc. and Avnet, Inc.'s Responsive Claim Construction Brief, *PACT XPP Technologies, AG* v. *Xilinx, Inc. and Avnet, Inc. et al., E.D. Texas, 2:07-cv-00563-CE*, Dec. 6, 2010, pp. 1-71.
Documents from File History of U.S. Appl. No. 10/265,846, filed Oct. 7, 2002, Exhibit 32 of Defendants Xilinx, Inc. and Avnet, Inc.'s Responsive Claim Construction Brief, *PACT XPP Technologies, AG* v. *Xilinx, Inc. and Avnet, Inc. et al., E.D. Texas, 2:07-cv-00563-CE*, Dec. 6, 2010, pp. 1-23.
PACT's Claim Construction Reply Brief, *PACT XPP Technologies, AG* v. *Xilinx, Inc. and Avnet, Inc. et al., E.D. Texas, 2:07-cv-00563-CE*, Jan. 7, 2011, pp. 1-20.
Defendants Xilinx, Inc. and Avnet, Inc.'s Claim Construction Surreply Brief, *PACT XPP Technologies, AG* v. *Xilinx, Inc. and Avnet, Inc. et al., E.D. Texas, 2:07-cv-00563-CE*, Jan. 18, 2011, 142 pages.
Markman Hearing Minutes and Attorney Sign-In Sheet, *PACT XPP Technologies, AG* v. *Xilinx, Inc. and Avnet, Inc. et al., E.D. Texas, 2:07-cv-00563-CE*, Feb. 22, 2011, 3 pages; and court transcript, 245 pages.
Memorandum Opinion and Order, *PACT XPP Technologies, AG* v. *Xilinx, Inc. and Avnet, Inc. et al., E.D. Texas, 2:07-cv-00563-CE*, Jun. 17, 2011, pp. 1-71.
Atmel Corporation, Atmel 5-K- 50K Gates Coprocessor FPGA and FreeRAM, (www.atmel.com), Apr. 2002 , pp. 1-68.
Glaskowsky, Peter N., "PACT Debuts Extreme Processor; Reconfigurable ALU Array Is Very Powerful—and Very Complex," Microprocessor, The Insider's Guide to Microprocessor Hardware, MicroDesign Resources —Microprocessor Report, Oct. 9, 2000 (www.MPRonline.com), 6 pages.
Glaskowsky, Peter N., "Analysis' Choice Nominees Named; Our Picks for 2002's Most Important Products and Technologies," Microprocessor, The Insider's Guide to Microprocessor Hardware, MicroDesign Resources—Microprocessor Report, Dec. 9, 2002 (www.MPRonline.com), 4 pages.
Lattice Semiconductor Corporation, "ispLSI 2000E, 2000VE and 2000 VL Family Architectural Description," Oct. 2001, pp. 1-88.
Olukotun, K. et al., "Rationale, Design and Performance of the Hydra Multiprocessor," Computer Systems Laboratory, Stanford University, CA, Nov. 1994, pp. 1-19.
PACT Corporate Backgrounder, PACT company release, Oct. 2008, 4 pages.
Page, Ian., "Reconfigurable processor architectures," Oxford University Computing Laboratory, Oxford UK, Elsevier Science B.V., Microprocessors an Microsystems 20 (1996) pp. 185-196.
Singh, Hartej et al., "Morpho-Sys: A Reconfigurable Architecture for Multimedia Applications," Univ. of California, Irvine, CA and Federal University of Rio de Janiero, Brazil, at http://www.ena.uci.edu/morphosys/docs/sbcci98.html, Jun. 18, 2010, 10 pages.
Theodoridis, G. et al., "Chapter 2—A Survey of Coarse-Grain Reconfigurable Architectures and Cad Tools, Basic Definitions, Critical Design Issues and Existing Coarse-grain Reconfigurable Systems," from S. Vassiliadis, and D. Soudris (eds.) *Fine- and Coarse-Grained Reconfigurable Computing*, Springer 2007, pp. 89-149.
Weinhardt, Markus et al., "Using Function Folding to Improve Silicon Efficiency of Reconfigurable Arithmetic Arrays," PACT XPP Technologies AG, Munich, Germany, IEEE 2004, pp. 239-245.
Xilinx, XC6200 Field Programmable Gate Arrays, Advance Product Specification, Jun. 1, 1996 (Version 1.0), pp. 4-255 through 4-286.

Xilinx, Virtex-II Platform FPGA User Guide, UG002 (V2.1) Mar. 28, 2007, pp. 1-502 [Parts 1-3].
Xilinx, XC4000E and SC4000X Serial Field Programmable Gate Arrays, Product Specification (Version 1.6), May 14, 1999, pp. 1-107.
Coelho, F., "Compiling dynamic mappings with array copies," Jul. 1997, 12 pages, http://delivery.acm.org/10.1145/270000/263786/p168-coelho.pdf.
Janssen et al., "A Specification Invariant Technique for Regularity Improvement between Flow-Graph Clusters," Mar. 1996, 6 pages, http://delivery.acm.org/10.1145/790000/787534/74230138.pdf.
Microsoft Press Computer Dictionary, Second Edition, 1994, Microsoft Press, ISBN 1-55615-597-2, p. 10.
Newton, Harry, "Newton's Telecom Dictionary," Ninteenth Edition, 2003, CMP Books, p. 40.
Rehmouni et al., "Formulation and evaluation of scheduling techniques for control flow graphs," Dec. 1995, 6 pages, http://delivery.acm.org/10.1145/230000/224352/p386-rahmouni.pdf.
Sinha et al., "System-dependence-graph-based slicing of programs with arbitrary interprocedural control flow," May 1999, 10 pages, http://delivery.ac.org/10.1145/310000/203675/032-sinha.pdf.
Stallings, William, "Data & Computer Communications," Sixth Edition, Jun. 2000, Prentice-Hall, Inc., ISBN 0-084370-9, pp. 195-196.
Villasenor, John, et al., "Configurable Computing." *Scientific American*, vol. 276, No. 6, Jun. 1997, pp. 66-71.
Tau, Edward, et al., "A First Generation DPGA Implementation," *FPD'95,* pp. 138-143.
Athanas, Peter, et al., "IEEE Symposium on FPGAs For Custom Computing Machines," *IEEE Computer Society Press,* Apr. 19-21, 1995, pp. i-vii, 1-222.
Bittner, Ray, A., Jr., "Wormhole Run-Time Reconfiguration: Conceptualization and VLSI Design of a High Performance Computing system," *Disseratation,* Jan. 23, 1997, pp. i-xx, 1-415.
Myers, G., Advances in Computer Architecture, Wiley-Interscience Publication, 2nd ed., John Wiley & Sons, Inc. pp. 463-494, 1978.
M. Saleeba, "A Self-Contained Dynamically Reconfigurable Processor Architecture", Sixteenth Australian Computer Science Conference, ASCS-16, QLD, Australia, Feb. 1993.
M. Morris Mano, "Digital Design," by Prentice Hall, Inc., Englewood Cliffs, New Jersey 07632, 1984, pp. 119-125, 154-161.
Norman, Richard S., Hyperchip Business Summary, The Opportunity, Jan. 31, 2000, pp. 1-3.
Maxfield, C. "Logic that Mutates While-U-Wait" EDN (Bur. Ed) (USA), EDN (European Edition), Nov. 7, 1996, Cahners Publishing, USA.
Alippi, C., et al., Determining the Optimum Extended Institution Set Architecture for Application Specific Reconfigurable VLIW CPUs, IEEE., 2001, pp. 50-56.
Arabi et al., "PLD Integrates Dedicated High-speed Data Buffering, Complex State Machine, and Fast Decode Array," conference record on WESCON '93, Sep, 28, 1993, pp. 432-436.
Athanas P. "A Functional Reconfigurable Architecture and Compiler for Adoptive Computing,", IEEE, pp. 49-55.
Athanas, P. et al., "An Adaptive Hardware Machine Architecture and Compiler for Dynamic Processor Reconfiguration", IEEE, Laboratory for Engineering Man/Machine Systems Division of Engineering, Box D, Brown University Providence, Rhode Island, 1991, pp. 397-400.
Baumgarte, et al., PACT XPP "A Self-reconfigurable Data Processing Architecture," PACT Info. GmbH, Munchen Germany 2001.
Becker, et al., "Parallelization in Co-compilation for Configurable Accelerators—a Host/accelerator Partitioning Compilation Method," proceedings of Asia and South Pacific Desing Automation Conference, Yokohama, Japan, Feb. 10-13, 1998.
Cadambi, et al., "Management Pipeline-reconfigurable FPGAs," ACM, 1998, pp. 55-64.
Callahan, T. et al. "The Garp Architecture and C Copiler," Computer, Apr. 2000, pp. 62-69.
Cardoso, "Compilation Systems of Java™ Algorithms onto Reconfigurable Computing Systems with Exploitation of Operation-Level Parallelism," Ph.D. Thesis, Universidade Technica de Lisboa (UTL), Lisbon, Portugal Oct. 2000 (English Abstract included).
Diniz et al., "Automatic Synthesis of Data Storage and Control Structures for FPGA—based Computing Engines", 2000, IEEE, pp. 91-100.
Donandt, "Improving Response Time of Programmable Logic Controllers by Use of a Boolean Coprocessor", AEG Research Institute Berlin, IEEE, 1989, pp. 4-167-4-169.
Dutt, et al., "If Software is King for Systems-on-Silicon, What's New in Compiler," IEEE, 1997, pp. 322-325.
Ferrante, et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Library.
Fineberg, et al., "Experimental Analysis of a Mixed-Mode Parallel Architecture Using Bitonic Sequence Sorting", vol. 11. No. 3, Mar. 1991, pp. 239-251.
Fornaciari, et al., System-level power evaluation metrics, 1997 Proceedings of the 2nd Annual IEEE International Conference on Innovative Systems in Silicon, New York, NY, Oct. 1997, pp. 323-330.
Forstner, "Wer Zuerst Kommt, Mahlt Zuerst!: Teil 3: Einsatzgebiete und Anwendungsbeispiele von FIFO-Speichern", Electronik, Aug. 2000, pp. 104-109.
Gokhale, et al., "Automatic Allocation of Arrays to Memories in FPGA processors with Multiple Memory Banks", Field-Programmable Custom Computing Machines, 1999, IEEE, pp. 63-67.
Hammes, et al., "Cameron: High Level Language Compilation for Reconfigurable Systems," Department of Computer Science, Colorado State University, Conference on Parallel Architectures and Compilation Techniques, Oct. 12-16, 1999.
Hauck, "The Roles of FPGA's in Reconfigurable Systems," IEEE, Apr. 1998, pp. 615-638.
Hauser, et al., "Garp: A MIPS Processor with a Reconfigurable Coprocessor", University of California, Berkeley, IEEE, 1997, pp. 12-21.
Hedge, 3D WASP Devices for On-line Signal and Data Processing, 1994, International Conference on Wafer Sale Integration, pp. 11-21.
Hwang,_et al., "Min-cut Replication in Partitioned Networks" IEEE Transactions on Computer-Aided Design of Integrated Circuits and Systems, [online] Bd. 14, Nr. 1, Jan. 1995, pp. 96-106, XP00053228 USA ISSN: 0278-00700 IEEE Xplore.
Iseli, et al. "A C++ Compiler for FPGA Custom Execution Units Synthesis," IEEE. 1995, pp. 173-179.
Isshiki, et al., "Bit-Serial Pipeline Synthesis for Multi-FPGA Systems with C++ Design Capture," 1996 IEEE, pp. 38-47.
Jacob, et al., "Memory Interfacing and Instruction Specification for Reconfigurable Processors", ACM 1999, pp. 145-154.
Jantsch, et al., "A Case Study on Hardware/software Partitioning," Royal Institute of Technology, Kista, Sweden, Apr. 10, 1994 IEEE, pp. 111-118.
John, et al., "A Dynamically Reconfigurable Interconnect for Array Processors", vol. 6, No. 1, Mar. 1998, IEEE, pp. 150-157.
Koch, et al, "Practical Experiences with the SPARXIL Co-Processor", 1998, IEEE, pp. 394-398.
Kung, "Deadlock Avoidance for Systolic Communication", 1988 Conference Proceeding of 15$^{th}$ Annual International Symposium on Computer Architecture, May 30, 1988, pp. 252-260.
Ling, "WASMII: An MPLD with Data-Driven Control on a Virtual Hardware," Journal of Supercomputing, Kluwer Acdemic Publishers, Dordrecht, Netherlands, 1995, pp. 253-276.
Miller, et al., "High-Speed FIFOs Contend with Widely Differing Data Rates: Dual-port RAM Buffer and Dual-pointer System Provide Rapid, High-density Data Storage and Reduce Overhead", Computer Design, Sep. 1, 1985, pp. 83-86.
Mirsky, "MATRIX: A Reconfigurable Computing Architecture with Configurable Instruction Distribution and Deployable Resources," Proceedings of the IEEE Symposium on FPGAs for Custom Computing Machines, 1996, pp. 157-1666.
Nilsson, et al., "The Scalable Tree Protocol—A Cache Coherence Approaches for Large-Scale Multiprocessors" IEEE, pp. 495-506 Dec. 1992.
Piotrowski, "IEC-BUS, Die Funktionsweise des IEC-Bus und seine Anwendung in Geräten und Systemen", 1987, Franzis-Verlag GmbH, München, pp. 20-25.

Schmit, et al., Hidden Markov Modeling and Fuzzy Controllers in FPGAs, FPGAs for Custom Computing Machined, 1995; Proceedings, IEEE Symposium on Napa Valley, CA, Apr. 1995, pp. 214-221.
Siemers, "Rechenfabrik Ansaetze Fuer Extrem Parallele Prozessoren", Verlag Heinze Heise GmbH., Hannover, DE No. 15, Jul. 16, 2001, pp. 170-179.
Simunic, et al., Source Code Optimization and Profiling of Energy Consumation in Embedded Systems, Proceedings of the 13th International Symposium on System Synthesis, Sep. 2000, pp. 193-198.
Tenca, et al., "A Variable Long-Precision Arithmetic Unit Design for Reconfigurable Coprocessor Architectures", University of California, Los Angeles, 1998, pp. 216-225.
TMS320C54X DSP: CPU and Peripherals, Texas Instruments, 1996, pp. 6-26 to 6-46.
TMS320C54x DSP: Mnemonic Instruction Set, Texas Instruments, 1996, p. 4-64.
Villasensor, et al., "Express Letters Video Communications Using Rapidly Reconfigurable Hardware," IEEE Transactions on Circuits and Systems for Video Technology, IEEE, Inc. NY, Dec. 1995, pp. 565-567.
Wada, et al., "A Performance Evaluation of Tree-based Coherent Distributed Shared Memory" Proceedings of the Pacific RIM Conference on Communications, Comput and Signal Processing, Victoria, May 19-21, 1993.
Weinhardt, "Compilation Methods for Structure-programmable Computers", dissertation, ISBN 3-89722-011-3, 1997.
Weinhardt, "Ubersetzingsmethoden fur strukturprogrammierbare rechner," Dissertation for Doktors der Ingenieurwissenchaffen der Universitat Karlsruhe: Jul. 1, 1997.
Weinhardt, et al., "Pipeline Vectorization for Reconfigurable Systems", 1999, IEEE, pp. 52-60.
Witig,et al., "OneChip: An FPGA Processor with Reconfigurable Logic" IEEE, 1996 pp. 126-135.
Wu, et al., "A New Cache Directory Scheme", IEEE, pp. 466-472, Jun. 1996.
XLINX, "Logic Cell Array Families: XC4000, XC4000A and XC4000H", product description, pp. 2-7 to 2-15, Additional XC3000, XC31000 and XC3100A Data, pp. 8-16 and 9-14.
Xu, et al., "Parallel QR Factorization on a Block Data Flow Architecture" Conference Proceeding Article, Mar. 1, 1992, pp. 332-336 XPO10255276, p. 333, Abstract 2.2, 2.3, 2.4-p.334.
Ye, et al., "A Compiler for a Processor With A Reconfigurable Functional Unit," FPGA 2000 ACM/SIGNA International Symposium on Field Programmable Gate Arrays, Monterey, CA Feb. 9-11, 2000, pp. 95-100.
Zhang, et al., Architectural Evaluation of Flexible Digital Signal Processing for Wireless Receivers, Signals, Systems and Computers, 2000; Conference Record of the Thirty-Fourth Asilomar Conference, Bd. 1, Oct. 29, 2000, pp. 78-83.

* cited by examiner

METHOD OF SELF-SYNCHRONIZATION OF CONFIGURABLE ELEMENTS OF A PROGRAMMABLE MODULE

Matter enclosed in heavy brackets [ ] appears in the original patent but forms no part of this reissue specification; matter printed in italics indicates the additions made by reissue.

CROSS-REFERENCE TO RELATED APPLICATION

This application is a *divisional reissue of U.S. Reissue patent application Ser. No. 12/109,280, filed on Apr. 24, 2008, which is a reissue application of U.S. patent application Ser. No. 10/379,403, filed on Mar. 4, 2003, now U.S. Pat. No. 7,036,036, which is a* continuation of U.S. patent application Ser. No. 09/369,653, filed Aug. 6, 1999, now U.S. Pat. No. 6,542,998, which is a continuation-in-part of PCT/DE98/00334, filed on Feb. 7, 1998 and *is a continuation-in-part* of U.S. patent application Ser. No. 08/946,812, filed on Oct. 8, 1997, now U.S. Pat. No. 6,081,903, and claims the benefit of the priority [date] *dates* of these cases under 35 U.S.C. §120, each of which is expressly incorporated herein by reference in its entirety. This application also claims the benefit, *under 35 U.S.C. §119,* of the priority date of *German Application No.* DE 19704728.9, filed on Feb. 8, 1997, [under 35 U.S.C. §119,] which is expressly incorporated herein by reference in its entirety. *Further, more than one reissue application of U.S. Pat. No. 7,036,036 has been filed. Specifically, the reissue applications are application Ser. No. 12/109,280, application Ser. No. 12/909,061, application Ser. No. 12/909,150, and application Ser. No. 12/909,203, the latter three of which were all filed on Oct. 21, 2010 as divisional reissue applications of application Ser. No. 12/109,280.*

BACKGROUND INFORMATION

Synchronization of configurable elements of today's modules, e.g., field programmable gate arrays ("FPGAs"), dynamically progammable gate arrays ("DPGAs"), etc., is usually accomplished using the clock of the module. This type of time-controlled synchronization poses many problems because it is often not known in advance how much time is needed for a task until a final result is available. Another problem with time-controlled synchronization is that the event on which the synchronization is based is not triggered by the element to be synchronized itself but rather by an independent element. In this case, two different elements are involved in the synchronization. This leads to a considerably higher administrative complexity.

European Patent No. 0 726 532 describes a method of controlling data flow in SIMD machines composed of several processors arranged as an array. An instruction is sent to all processors which dynamically, selects the target processor of a data transfer. The instruction is sent by a higher-level instance to all processors (broadcast instruction) and includes a destination field and a target field. The destination field controls a unit in the processor element to dynamically determine the neighboring processor element to which the result is to be sent. The operand register of another processor element in which another result is to be stored is dynamically selected with the target field.

SUMMARY

The present invention relates to a method which permits self-synchronization of elements to be synchronized. Synchronization is neither implemented nor managed by a central entity. By shifting synchronization into each element, more synchronization tasks can also be performed simultaneously, because independent elements no longer interfere with one another when accessing the central synchronization entity.

In accordance with an example embodiment of the present invention, in a module, e.g., a data flow processor ("DFP") or a DPGA, with a two- or multi-dimensionally arranged programmable cell structure, each configurable element can access the configuration and status register of other configurable elements over an interconnecting structure and thus can have an active influence on their function and operation. A matrix of such cells is referred to below as a processing array (PA). The configuration can thus be accomplished by a load logic from the PA in addition to the usual method.

DETAILED DESCRIPTION

Figure 1:
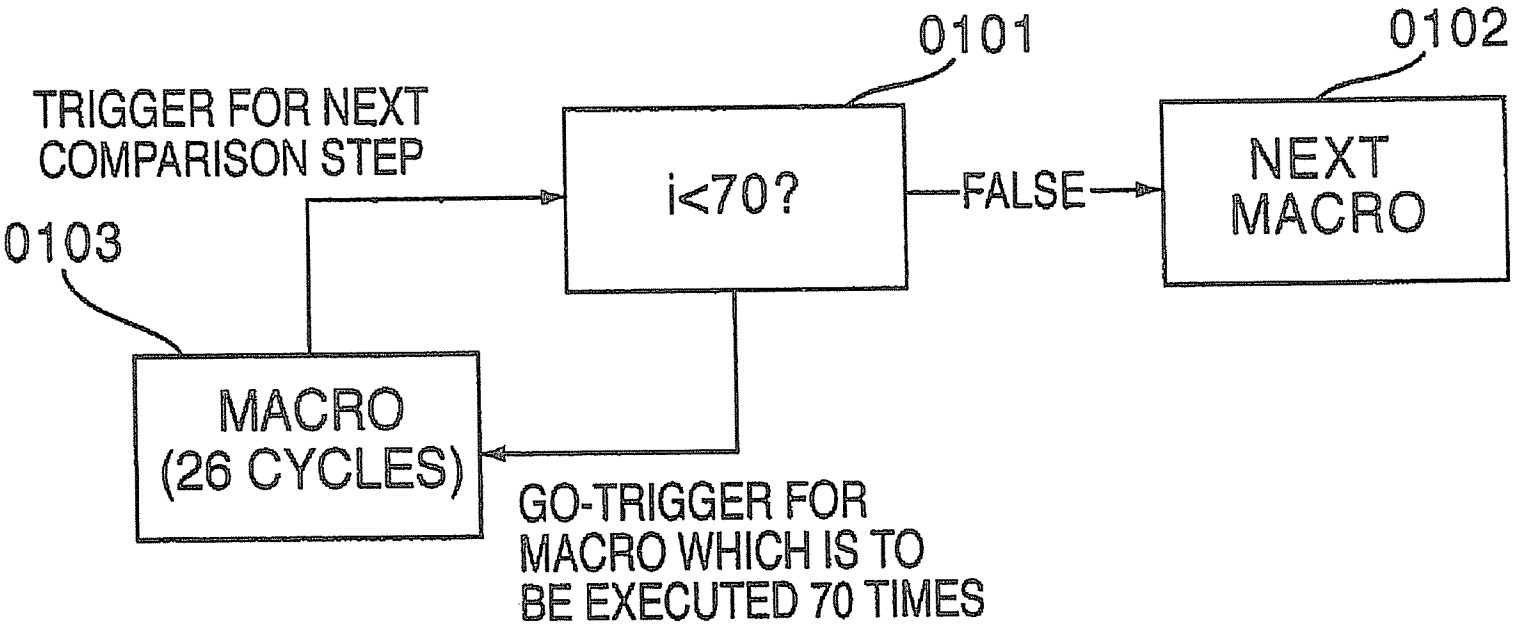
FIG. 1 shows how a loop construct can be implemented by using triggers, in accordance with an example embodiment of the present invention.

The present invention provides a module which is freely programmable during the running time and can also be reconfigured during the running time. Configurable elements on the chip have one or more configuration registers for different functions. Both read and write access to these configuration registers is permitted. In the method described here, it is assumed that a configuration can be set in an element to be configured for the following information.

- Interconnection register. In this register, the type of connection to other cells is set.
- Command register. The function of the configurable element to be executed is entered in this register.
- Status register. The cell stores its instantaneous status in this register. This status provides other elements of the module with information regarding which processing cycle the cell is in.

A cell is configured by a command which determines the function of the cell to be executed. In addition, configuration data is entered to set the interconnection with other cells and the contents of the status register. After this operation, the cell is ready for operation.

To permit flexible and dynamic cooperation of many cells, each cell can have read or write access to all the configuration registers of another cell. Which of the many configuration registers is accessed by reading or writing is specified by the type of command with which the cell has been configured. Each command that can be executed by the cell exists in as many different types of addressing as there are different independent configuration registers in an element to be configured.

Example: A cell has the configuration register described above (interconnection, command and status) and is to execute the command ADD which performs an addition. It is then possible to select through the various types of ADD command where the result of this function is to be transferred.

ADD-A. The result is transferred to operand register A of the target cell.

ADD-B. The result is transferred to operand register B of the target cell.

ADD-V. The result is transferred to the interconnecting register of the target cell.

ADD-S. The result is transferred to the status register of the target cell.

ADD-C. The result is transferred to the command register of the target cell.

Control and Synchronization Trigger: In addition to the result, each cell can generate a quantity of trigger signals. The trigger signals need not necessarily be transferred to the same target cell as the result of processing the configured command. One trigger signal or a combination of multiple trigger signals triggers a certain action in the target cell or puts the cell in a certain state. A description of the states is also to be found in the text below. The following are examples of trigger signals:

GO trigger. The GO trigger puts the target cell in the READY state.

RECONFIG trigger. The RECONFIG trigger puts the target cell in the RECONFIG state, so the cell can be reprogrammed. This trigger is very useful, especially in conjunction with switching tables. If it is assumed that the data to be processed is loaded into the operand register at the rising edge of the clock pulse, processed in the period of the H level and written to the output register at the trailing edge, then the cell can be reconfigured at the trailing edge. The new configuration data is written to the command register at the trailing edge. The period of the L level is sufficient to conclude the reconfiguration successfully.

STEP trigger. The STEP trigger initiates unique execution of the configured command in the target cell in the WAIT state.

STOP trigger. The STOP trigger stops the target cell by putting the cell in the STOP state.

Due to the possibility of indicating in the processing cell into which register of the target cell the result is to be entered and which type of trigger signal is to be generated, a quantity of management data can be generated from a data stream. This management data is not a result of the actual task to be processed by the chip, but instead it serves only the functions of management, synchronization, optimization, etc. of the internal state.

Each cell can assume the following states which are represented by suitable coding in the status register, for example:

READY. The cell is configured with a valid command and can process data. Processing takes place with each clock cycle. The data is entered into the register of the target cell on the basis of the type of addressing of the cell sending the data.

WAIT. The cell has been configured with a valid command and can process data. Processing takes place on the basis of a trigger signal which can be generated by other elements of the module. The data is entered into the register of the target cell on the basis of the type of addressing of the cell sending the data.

CONFIG. This cell is not configured with a valid command. The data package sent to the cell with the next clock cycle is entered into the command register. The data package is entered into the command register in any case, regardless of which type of addressing was used by the cell sending the data.

CONFIG-WAIT. This cell is not configured with a valid command. A data package is entered with the next trigger signal which can be generated by other elements of the module and is written to the command register. The data package is entered into the command register in any case, regardless of which type of addressing was used by the cell sending the data.

RECONFIG. The cell is configured with a valid command, but it does not process any additional data, nor does it accept data. The cell can be reconfigured by another element of the module.

STOP. The cell is configured with a valid command, but it is not processing any data at the moment. The data is accepted by the cell (transferred to the input register) but is not processed further.

Due to these various states and the possibility of read and write access to the various registers of a cell, each cell can assume an active administrative role. In contrast with that, all existing modules of this type have a central management entity which must always know and handle the entire state of the module.

To achieve greater flexibility, there is another class of commands which change types after the first execution. Based on the example of the ADD command, a command is then as follows:

ADD-C-A. The result of the ADD function is written to the command register of the target cell with the first execution of the command. With each additional execution, the result is written to operand register A.

This possibility can be expanded as desired, so that even commands of the type ADD-C-V-A-C- . . . -B are conceivable. Each command can assume all permutated combinations of the various types of addressing and triggers.

Reconfiguration Control by RECONFIG Trigger: In the previous method, each element to be configured received a RECONFIG trigger from an external entity to enter the "reconfigurable" state. This had the disadvantage that distribution of the RECONFIG trigger necessitated a considerable interconnection and configuration expense: Due to the structure of the interconnection, this disadvantage can be eliminated. All configurable elements which are related by the interconnecting information represent a directional graph. Such a graph may have multiple roots (sources) and multiple leaves (targets). The configurable elements are expanded so that they propagate an incoming RECONFIG trigger in the direction of either their outgoing registers, their ingoing registers or a combination thereof. Due to this propagation, all the configurable elements that are directly connected to the configurable element also receive the RECONFIG trigger.

A configuration (graph) can be brought completely into the "reconfigurable" state by sending a RECONFIG trigger to all the roots and propagating the RECONFIG trigger in the direction of the output registers. The quantity of roots in a graph to which a RECONFIG trigger must be sent is considerably smaller than the total quantity of nodes in the graph. This greatly minimizes the complexity. Of course, a RECON- FIG trigger may also be sent to all leaves. In this case, the RECONFIG trigger is propagated in the direction of the input registers.

Due to the use of both options or a combination of both methods, a minimum quantity of configurable elements to which a RECONFIG trigger must be sent can be calculated.

The configurable elements can receive an addition record to their status register, indicating whether or not an incoming RECONFIG trigger is to be propagated. This information is needed when two or more different graphs are connected at one or more points (i.e., they have a transition) and it is not desirable for one of the other graphs to enter the "reconfigurable" state. One or more configurable elements thus behave like a lock.

In addition, the status register can be expanded so that an additional entry indicates the direction in which an incoming RECONFIG trigger is to be relayed.

The method described here can be applied to all types of triggers and/or data. In this way, it is possible to establish an automatic distribution hierarchy needing very few access opportunities from the outside to set it in operation.

Implementation of Multiple Functions Simultaneously in the Same Configurable Elements Basic Function and Required Triggers: An especially complex variant of calling up various macros by a condition is presented below: In execution of a condition (IF COMP THEN A ELSE B; where COMP is a comparison, and A and B are operations to be executed), no GO and STOP triggers are generated. Instead, a trigger vector (TRIGV) is generated, indicating to which result the comparison COMP has led. The trigger vector can therefore assume the states "equal," "greater" or "less."

The vector is sent to a following cell which selects exactly a certain configuration register (corresponding to A or B) from a plurality of configuration registers on the basis of the state of the vector. What this achieves is that, depending on the result of the preceding comparison, another function is performed over the data. States such as "greater-equal," "less-equal" and "equal-not equal" are triggered by writing the same configuration data to two configuration registers. For example, with "greater-equal" the configuration register "greater" and the configuration register "equal" are written with the same configuration word, while the configuration register "less" contains another configuration word.

In implementating trigger vectors TRIGV, no restriction to the states "greater," "less" and "equal" is necessary. To analyze large "CASE . . . OF" constructs, any number n representing the state of the CASE may be relayed as trigger vectors TRIGV-m to the downstream cell(s). In other words, n indicates the comparison within the CASE which was correct in analysis of the applied data. For implementation of the function assigned to the comparison within the CASE, n is relayed to the executing cells to select the corresponding function. Although the cells need at least three configuration registers in the "greater/less/equal" case, the number of configuration registers must correspond exactly to at least the maximum value of n (max (n)) when using TRIGV-m.

Propagation of the Required Function by Triggers: TRIGV/TRIGV-m are sent to the first cell processing the data. In this cell, TRIGV/TRIGV-M are analyzed and the data is processed accordingly. TRIGV/TRIGV-m are relayed (propagated) together with the data to the downstream cells. They are propagated to all cells executing a certain function on the basis of the analysis (IF or CASE). Propagation is linked directly to propagation of data packages, i.e., propagation is synchronous with the data. TRIGV/TRIGV-m generated at time t are linked to data present at time t at first processing cells CELLS1 (see FIG. 5: 0502, 0505, 0507). TRIG/TRIG-V are propagated so that the vectors are applied to the second processing cells with the data at time t+1, and at time t+2 they are applied to the third processing cells, etc., until TRIG/TRIG-V and the data are present at time t+m to the $(m-1)^{th}$ cells and at the same time to the last cells which depend on the comparison IF/CASE triggered by TRIG/TRIG-V.

A link is by no means such that the TRIG/TRIG-V generated at time t are linked to data applied to CELLS1 at time $t_{old}<t$.

Reacting to the Presence or Absence of Triggers: In special cases, it is necessary to react to the absence of a trigger, i.e., a trigger state occurs, but no change in trigger vector is initiated. Appropriate and important information can also be transferred to the downstream cells in this case. For example, in a comparison of "greater," "less," "equal," the trigger signal "equal" is not present and does not change when switching from the state "less" to the state "greater." Nevertheless, the absence of "equal" does contain information, namely "not equal."

To be able to react to both states "present" and "not present," an entry in the configuration register of the cell is added, indicating which of the states is to be reacted to.

Furthermore, a signal TRIGRDY indicating the presence of a trigger is added to trigger vector TRIGV representing states "equal," "greater" and "less." This is necessary because the state "not present" on one of the vectors does not provide any more information regarding the presence of a trigger per se.

TRIGRDY can be used as a handshake protocol between the transmitting cell and the receiving cell by having the receiving cell generate a TRIGACK as soon as it has analyzed the trigger vectors. Only after arrival of TRIGACK does the transmitting cell cancel the trigger state.

On the basis of an entry into the configuration register, a determination is made as to whether to wait for receipt of a TRIGACK or whether the trigger channel is to proceed unsynchronized when a trigger vector is sent out.

Use in Microprocessors

In microprocessors of the most recent architecture, conditional jumps are no longer executed by the known method of branch prediction, i.e., prediction of a jump. Speculative prediction of jumps introduced to increase processor performance calculated jumps in advance on the basis of speculative algorithms and had to reload the entire processor pipeline if the calculations were faulty, which led to a considerable loss of power.

To eliminate these losses, the new predicate/NOP method was introduced. A status flag one bit wide is assigned to each command, indicating whether the command is to be executed—or not. There may be any desired quantity of status flags. Commands are assigned to status flags by a compiler during the translation of the code. The status flags are managed by comparison operations assigned to them at the time of execution and indicate the result of the respective comparison.

Depending on the state of a status flag assigned to a command, the command is then executed by the processor (if the status flag indicates "execute") or the command is not executed and is replaced by an NOP (if the status flag indicates "not execute"). NOP stands for "No OPERATION," which means that the processor does not execute any operation in this cycle. Therefore, the cycle is lost for meaningful operations.

Two options are proposed for optimizing the cycle loss:

Multiple Command Registers per Computer Unit: A modern microprocessor has several relatively independent processors.

According to the trigger principle presented here, the individual processors are each equipped with several command registers, with a command register of a processor of a microprocessor being synonymous with a configuration register according to conventional FPGA, DFP, etc. modules. The respective active command register is selected a) on the basis of trigger vectors generated by other processors on the basis of comparisons, b) on the basis of multibit status flags (hereinafter referred to as status vectors) allocated to compare commands according to today's related art method.

Revised VLIW Command Set: One special embodiment is possible through VLIW command sets. Thus, several possible commands depending on one comparison can be combined to give one command within one command word. A VLIW word of any width is subdivided into any desired quantity of commands (codes). Each individual one of these codes is referenced by a trigger vector or a status vector. This means that one of the existing codes is selected from the VLIW word and processed during the running time.

The table illustrates a possible VLIW word with four codes referenced by a 2-bit trigger vector or a 2-bit status flag:

VLIW Command Word:

| Code 0 | Code 1 | Code 2 | Code 3 |
|---|---|---|---|

Assignment:

Trigger Vector/Status Flag:

| 00 | 01 | 10 | 11 |
|---|---|---|---|

Expansion of Hardware in Comparison with Conventional FPGAs and DFPs.

Additional Registers: A status register and a configuration register are added to the configuration registers conventionally used in DFPs. Both registers are controlled by the PLU bus and have a connection to the state machine of the sequence control system of the respective cell.

Change in PLU Bus: The configurable registers M-/F-PLUREG in FPGAs and DFPs are managed exclusively over the PLU bus, which represents the connection to the load logic. To guarantee the function according to the present invention, an additional access option must be possible through the normal system bus between the cells. The same thing is true for the new status register and configuration register.

The only part of the system bus relevant for the registers is the part that is interconnected to the PAE over the BM UNIT, i.e., the interface between the system buses and the PAE. Therefore, the bus is relayed from the BM UNIT to the registers where upstream multiplexers or upstream gates are responsible for switching between the PLU bus and the system bus relevant for the PAE. The multiplexers or gates are switched so that they always switch the system bus relevant for the PAE through, except after resetting the module (RESET) or when the RECONFIG trigger is active.

Expansions of Configurable Elements (PAEs) with Respect to Conventional FPGAs and DFPs: Trigger Sources: A configurable element can receive triggers from several sources at the same time. Due to this possibility, flexible semantics of the triggers can be achieved with the help of masking registers.

Multiple Configuration Registers: Instead of one configuration register, a PAE has multiple (max(n)) configuration registers.

Configuration State Machine and Multiplexer: Downstream from the configuration registers is a multiplexer which selects one of the possible configurations.

The multiplexer is controlled by a separate state machine or a state machine integrated into the PAE state machine, controlling the multiplexer on the basis of incoming trigger vectors.

Trigger Analysis and Configuration: A configurable element may contain a masking register in which it is possible to set the trigger inputs to which a trigger signal must be applied, so that the conditions for an action of the configurable element are met. A configurable element reacts not only to a trigger, but also to a set combination of triggers. In addition, a configurable element can perform prioritization of simultaneously incoming triggers.

Incoming triggers are recognized on the basis of the TRIGRDY signal. The trigger vectors are analyzed here according to configuration data also present in the configuration registers.

Trigger Handshake: As soon as the trigger vectors have been analyzed, a TRIGACK is generated for confirmation of the trigger vector.

BM UNIT: The BM UNIT is expanded so that it relays triggers coming from the bus to the sync unit and SM unit according to the configuration in M-PLUREG. Triggers generated by the EALU (e.g., comparator values "greater," "less," "equal," 0 detectors, plus and minus signs, carry-overs, error states (division by 0, etc.), etc.) are relayed from the BM UNIT to the bus according to the wiring information in M-PLUREG.

Expansions of System Bus: The system bus, i.e., the bus system between the cells (PAEs), is expanded so that information is transferred together with the data over the target register. This means that an address which selects the desired register on receipt of the data is also sent. Likewise, the system bus is expanded by the independent transfer of trigger vectors and trigger handshakes.

DETAILED DESCRIPTION OF DIAGRAMS AND EMBODIMENTS

FIG. 1 shows how a loop construct can be implemented by using triggers. In this example, a macro 0103 is to be executed 70 times. One execution of the macro takes 26 clock cycles. This means that counter 0101 may be decremented by one increment only once in every 26 clock cycles. One problem with freely programmable modules is that it is not always possible to guarantee that processing of macro 0103 will actually be concluded after 26 clock cycles. For example, a delay may occur due to the fact that a macro which is to supply the input data for macro 0103 may suddenly require 10 more clock cycles. For this reason, the cell in macro 0103 sends a trigger signal to counter 0101, causing the result of the calculation to be sent to another macro. At the same time, processing of macro 0103 by the same cell is stopped. This cell "knows" exactly that the condition for termination of a calculation has been reached.

In this case the trigger signal sent is a STEP trigger, causing counter 0101 to execute its configured function once. The counter decrements its count by one and compares whether it has reached a value of 0. If this is not the case, a GO trigger is sent to macro 0103. This GO trigger signal causes macro 0103 to resume its function.

This process is repeated until counter 0101 has reached a value of 0. In this case, a trigger signal is sent to macro 0102, where it triggers a function.

A very fine synchronization can be achieved due to this interaction of triggers.

Figure 2:
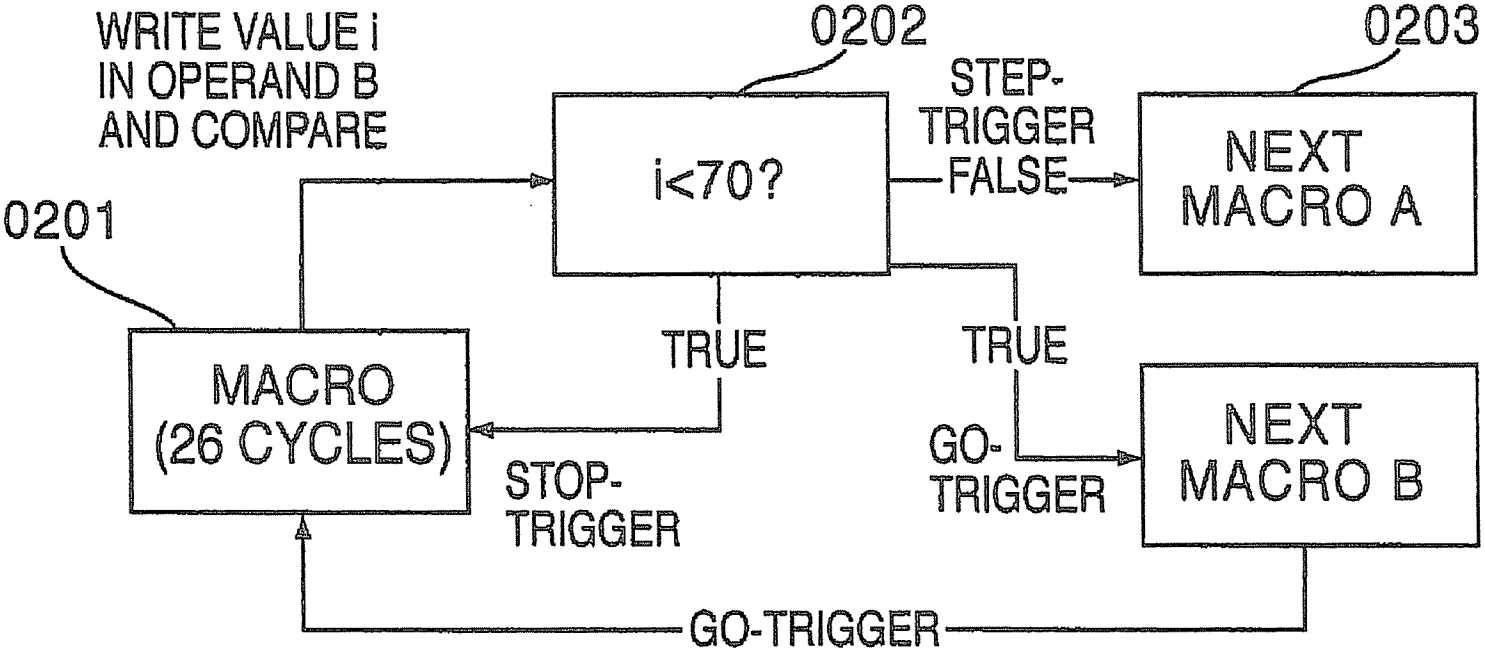
FIG. 2 shows how a comparison construct can be implemented by using multiple triggers, according to an example embodiment of the present invention.

FIG. 2 shows how a comparison construct can be implemented by using multiple triggers. FIG. 2 corresponds to the basic idea of FIG. 1. However, in this case the function in element 0202 is not a counter but a comparator. Macro 0201 also sends a comparison value to comparator 0202 after each processing run. Depending on the output of the comparison, different triggers are again driven to prompt an action in macros 0203, for example. The construct implemented in FIG. 2 corresponds to that of an IF query in a programming language.

Figure 3:
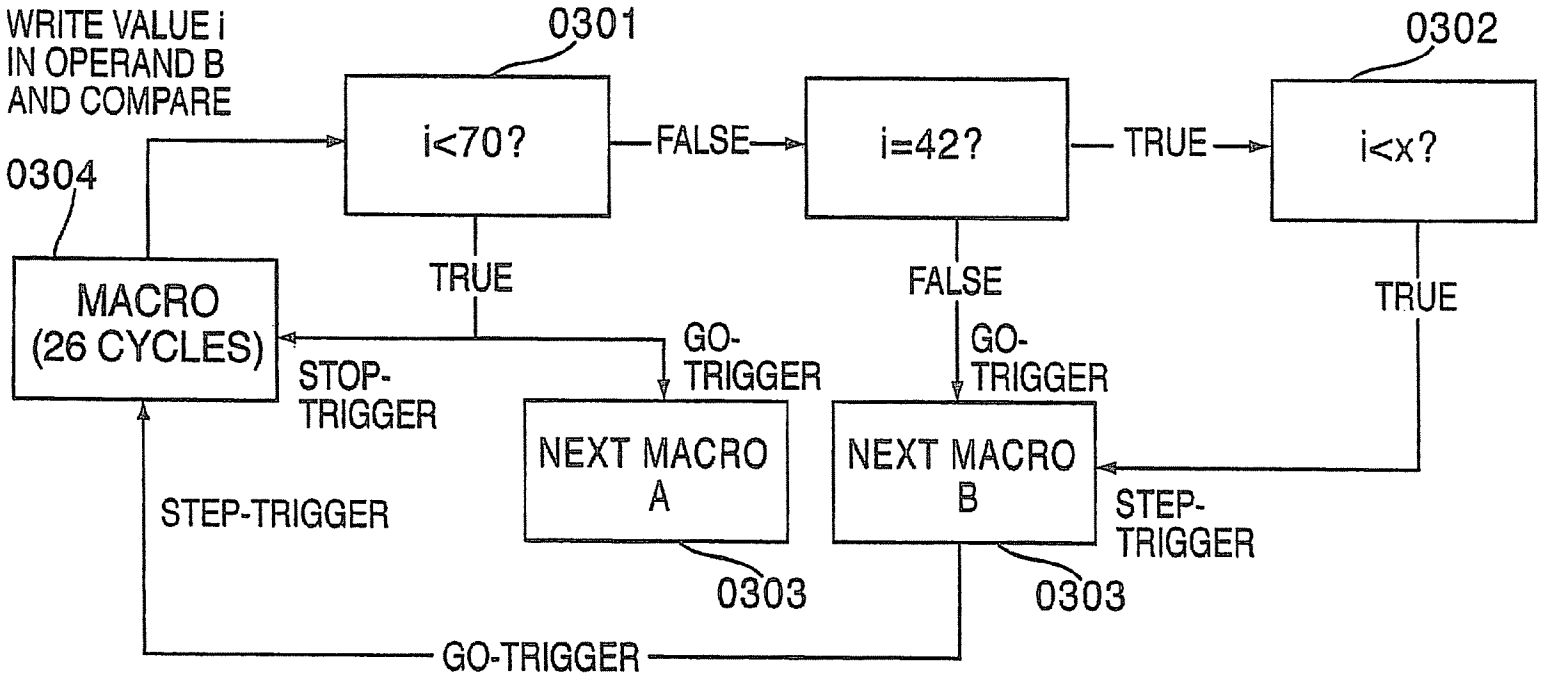
FIG. 3 shows how a comparison construct with multiple outputs can be implemented by using multiple triggers and interleaving them, according to an example embodiment of the present invention.

FIG. 3 shows how a comparison construct with multiple outputs can be implemented by using multiple triggers and interleaving them. Here, as in FIG. 2, several comparators 0301, 0302 are used here to implement construction of an IF-ELSE-ELSE construct (or multiple choice). Due to the use of a wide variety of types of triggers and connections of these triggers to macros 0303, 0304, very complex sequences can be implemented easily.

Figure 4:
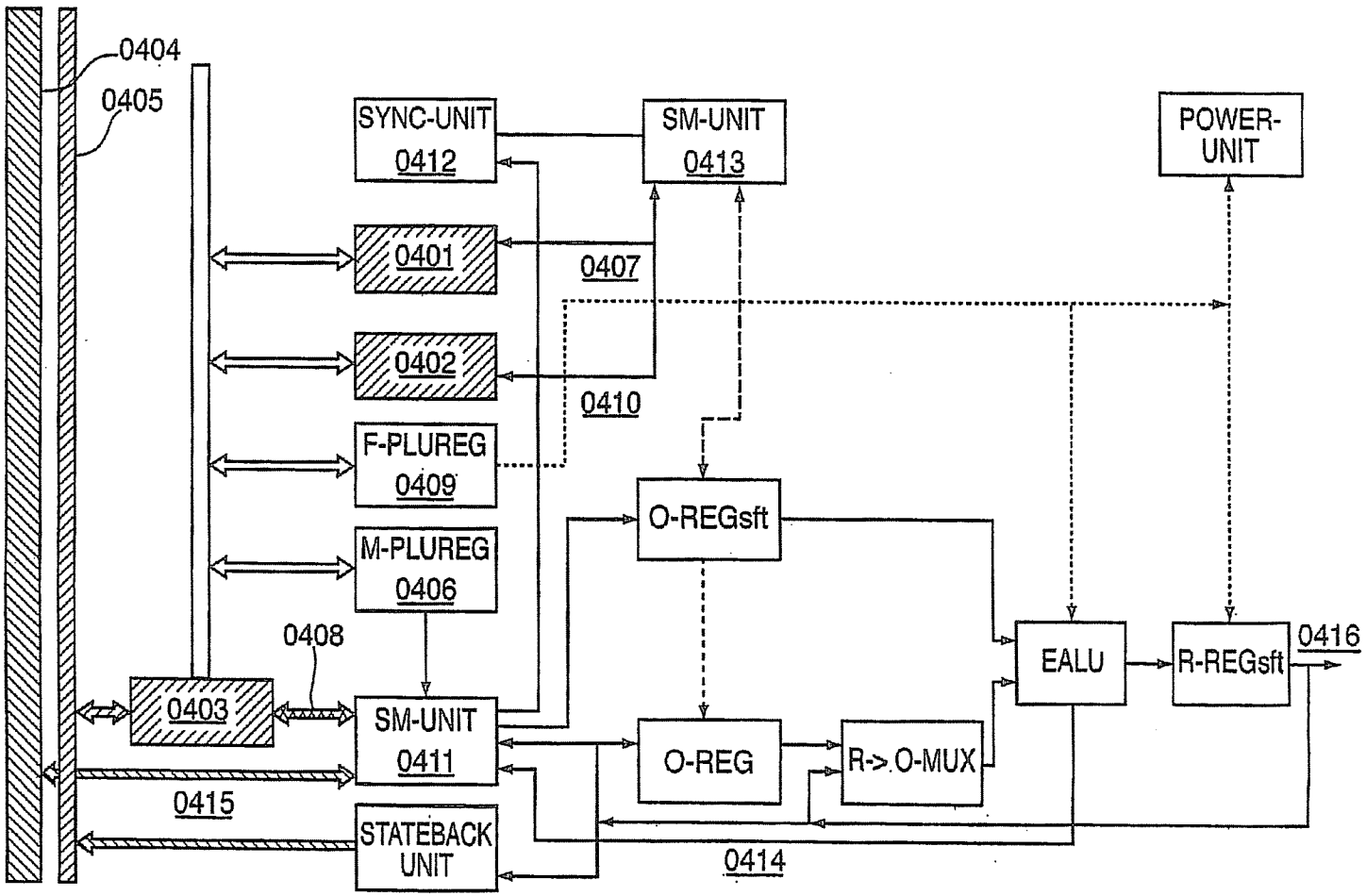
FIG. 4 shows the required expansions, according to an example embodiment of the present invention, in comparison with conventional FPGAs and DFPs.
Figure 5A:
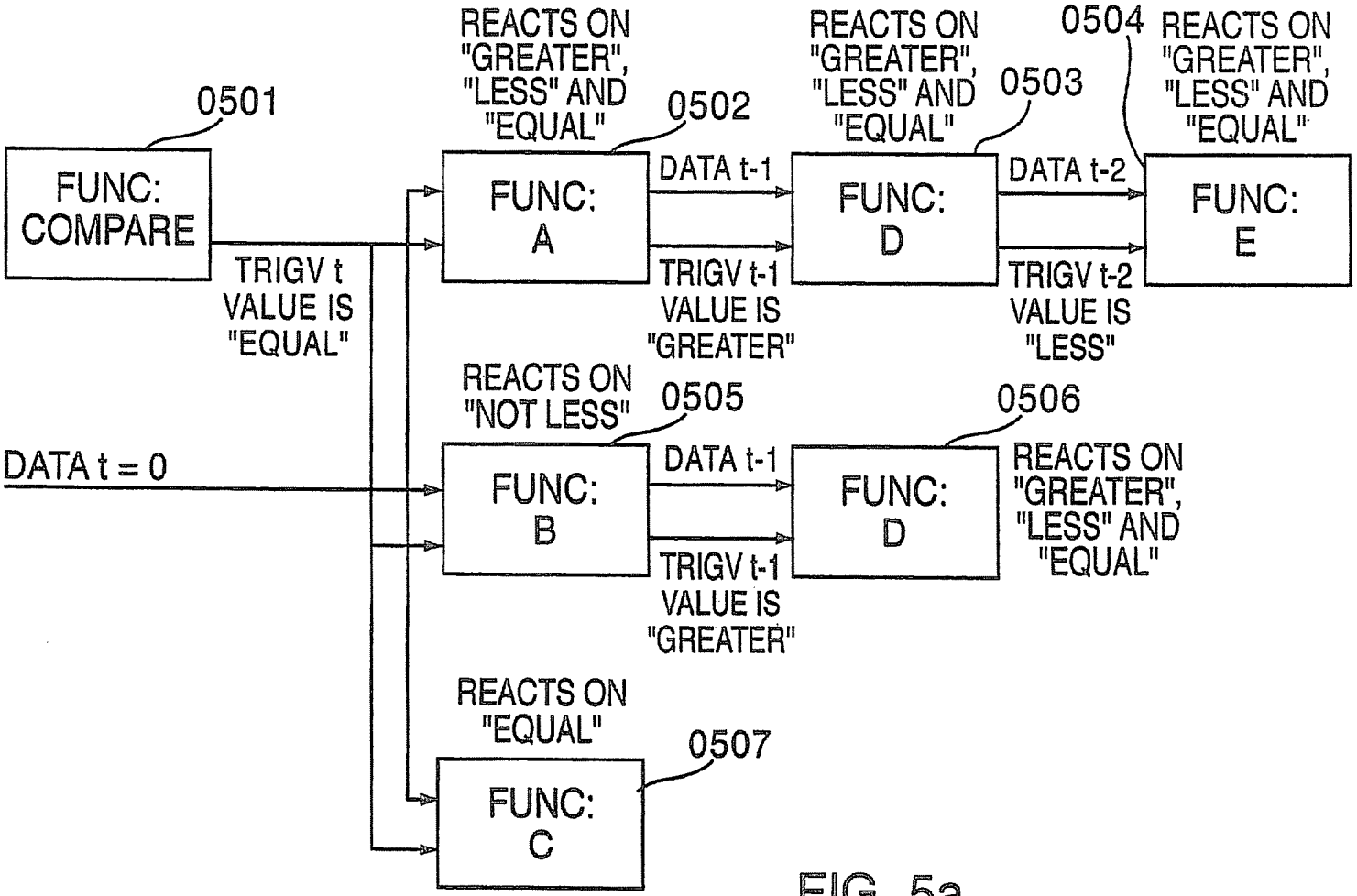
FIGS. 5a-5d show an example of the selection of different functions of the configurable elements by, triggers, according to the present invention.
Figure 5B:
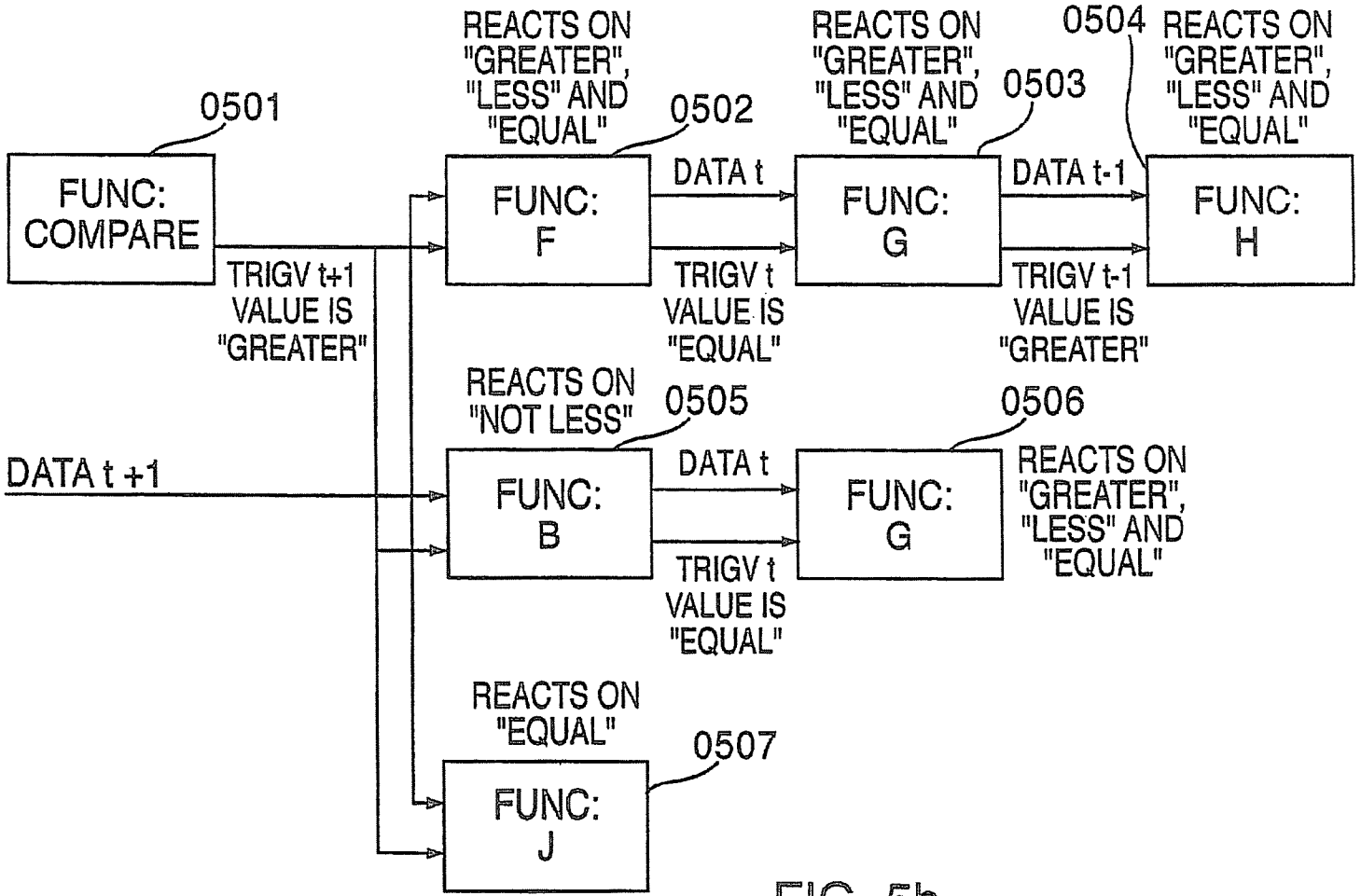
Figure 5C:
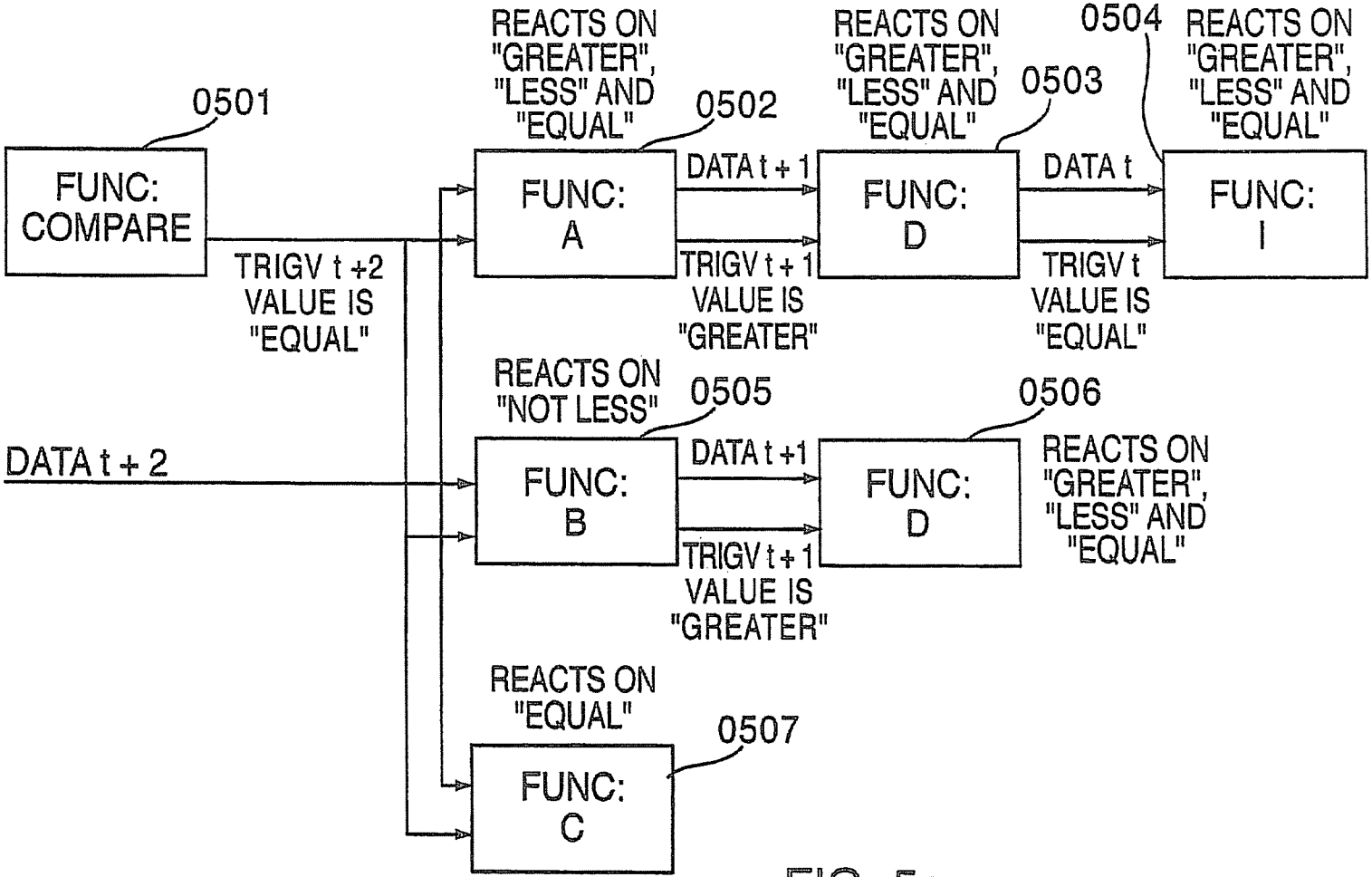
Figure 5D:
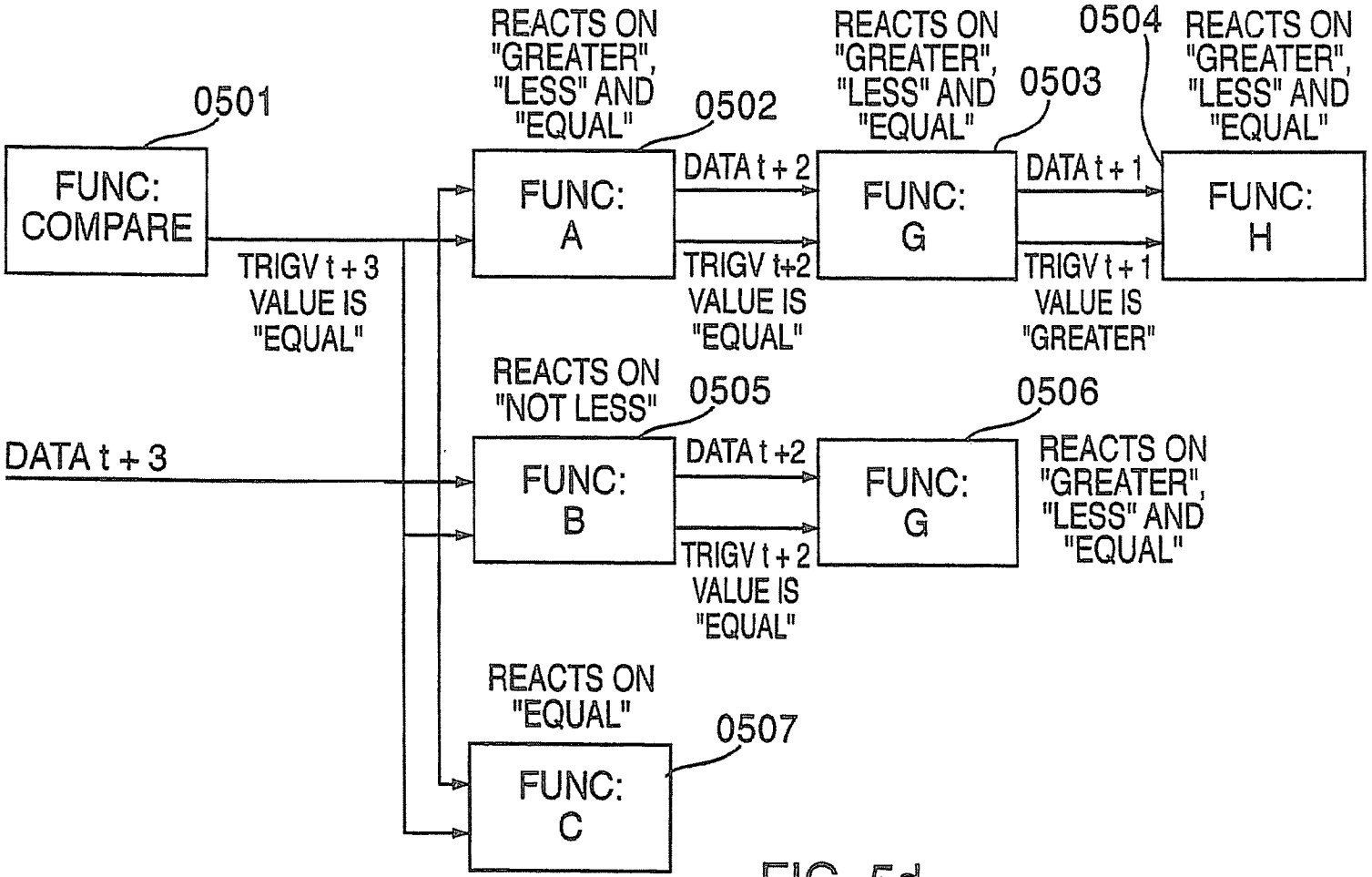

FIG. 4 shows an example of some of the differences between the present invention and, for example, conventional FPGAs and DFPs. Additional configuration register 0401 and additional status register 0402 are connected to the SM UNIT over bus 0407. Registers 0401, 0402, F-PLUREG and M-PLUREG are connected to a gate 0403 by an internal bus 0206. Depending on position, this gate connects internal bus 0406 to PLU bus 0405 to permit configuration by the PLU or to the BM UNIT by a bus 0408. Depending on the address on data bus 0404, the BM UNIT relays the data to the O-REG or to addressed register 0401, 0402, F-PLUREG or M-PLUREG.

BM UNIT 0411 sends trigger signals over 0415 to SYNC UNIT 0412. 0411 receives results from the EALU over 0414 ("equal," "greater," "less," "result=0," "result positive," "result negative," carry-over (positive and negative), etc.) to convert the results into trigger vectors. As an alternative, states generated by the SYNC UNIT or the STATE MACHINE can be relayed to the BM UNIT over 0415.

The trigger signals transmitted by the BM UNIT to bus 0404 can be used there as STEP/STOP/GO triggers, RECONFIG triggers or for selecting a configuration register, depending on the configuration of the configurable elements to be analyzed. Which function a generated trigger will execute in the configurable elements to be analyzed is determined by interconnection 0404 and the configuration of the respective configurable element. One and the same trigger may have different functions with different configurable elements. 0416 is the result output of R-REGsft to bus system 0404 and the following configurable elements.

FIG. 5 shows the time response between generated triggers and the configuration registers selected by the triggers as an example. 0501 generates by comparison a trigger vector TRIGV, which can assume values "equal," "greater," or "less." Configurable elements 0502-0504 process data independently of comparison 0501. Processing depends on comparison values "equal," "greater" and "less." Processing is pipelined, i.e., a data word is modified first by 0502, then by 0503 and finally by 0504. 0505 also processes data as a function of 0501. However, this is limited to the dependence on the comparison values "less"; "greater" and "equal" cause the same function to be carried out. Thus, a distinction is made between the values "less" and "greater than or equal to." 0506 is connected downstream in pipeline 0505. 0506 reacts differently to "equal," "greater" and "less" (see 0503). 0507 also depends on 0501, but a distinction is made between the values "equal" and "not equal (less or greater)." This embodiment begins at time t (FIG. 5a) and ends at time t+3. If the data passes through one of pipelines 0502, 0503, 0504 or 0505, 0506, it is delayed by one clock cycle in each execution in one of macros 0502-0506. Longer and especially different delays may also occur. Since there is a handshake mechanism between the data and trigger signals for automatic synchronization (according to the related art or this application (TRIGACK/TRIGRDY)), this case need not be discussed separately.

Due to the delays, data and trigger signals of the earlier time t−2 are available at time t between the second and third pipeline steps, for example.

FIGS. 5a through 5d show the sequence of three clock cycles t through t+2.

The trigger vectors (i.e., the results of the comparison) generated by 0501 look as follows over t:

| Time t | Result of comparison |
|---|---|
| t − 2 | less |
| t − 1 | greater |
| t | equal |
| t + 1 | greater |
| t + 2 | equal |

Figure 6:
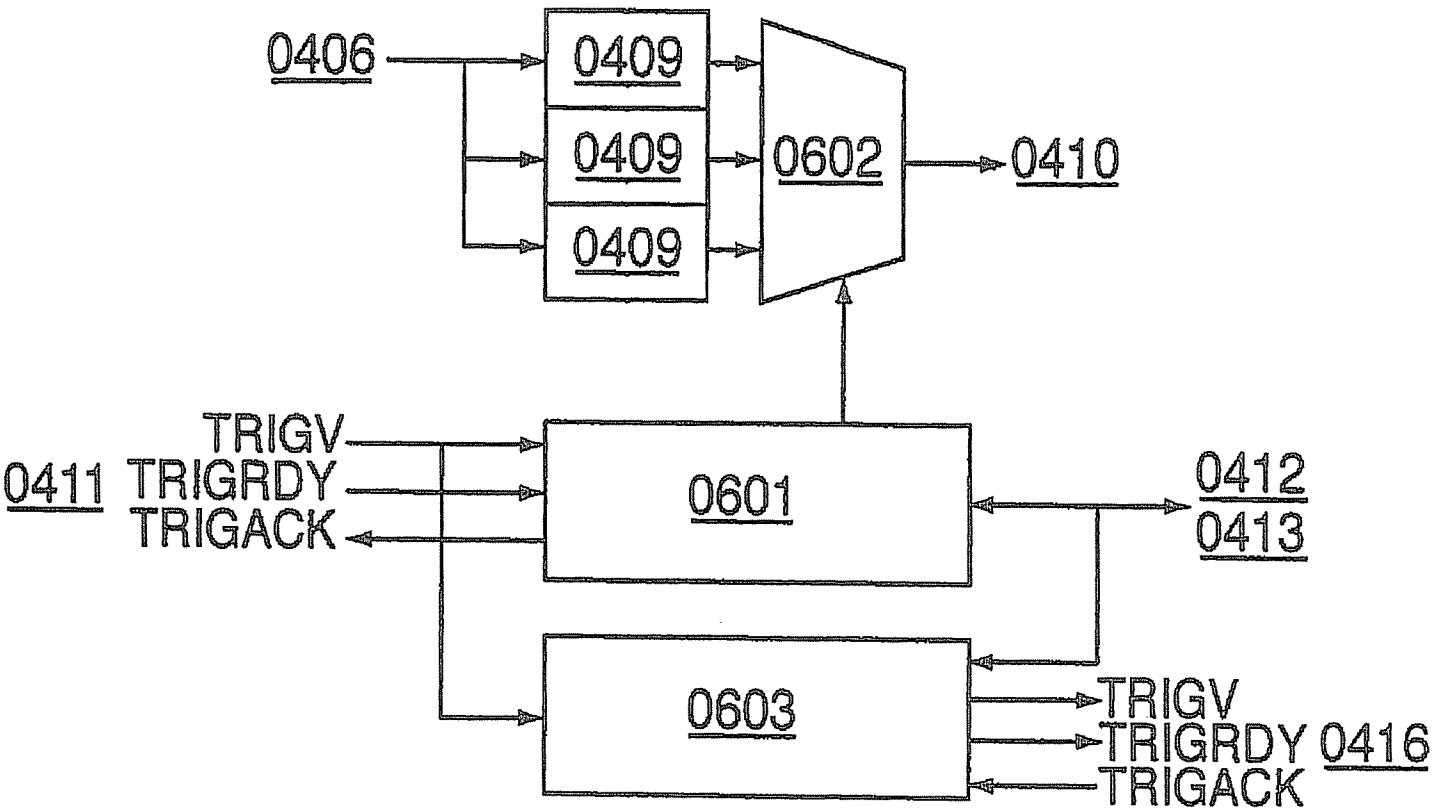
FIGS. 6 and 6a show an implementation of multiple configuration registers controlled by triggers for executing different functions, according to an example embodiment of the present invention.

FIG. 6 shows the integration of several configuration registers into one configurable element. In this embodiment there are three configuration registers 0409 according to FIG. 4. These are configured over bus 0406. A control unit 0601 (which may also be designed as a state machine) receives signals TRIGV and TRIGRDY over bus system 0411. Depending on TRIGV, the control unit switches one of the configuration registers over multiplexer 0602 to bus system 0401 leading to the control mechanisms of the configurable element. For synchronization of the trigger signals with the internal sequences of the configurable element, 0601 has a synchronization output leading to synchronization unit 0412 or to state machine 0413. For synchronization of the trigger sources, 0601 generates handshake signal TRIGACK after processing the incoming trigger. In this embodiment, each configuration register 0409 is assigned to one TRIGV of the type "equal," "greater," "less." If other operations are executed with each type of trigger, then each configuration register is occupied differently. For example, if a distinction is made only between "equal" and "not equal" then the configuration registers are occupied equally for the types "less" and "greater," namely with the configuration for "not equal." The configuration register for "equal" is occupied differently. This means that the comparison can be made more specific on the basis of the occupancy of the configuration registers, each configurable element being able to design this specification differently.

TRIGV is relayed together with the result over register 0603 to the downstream configurable elements to permit pipelining according to FIGS. 5a-d. The register and the handshake signals are controlled by 0412 or 0413. Trigger information together with the result from R-REGsft or with a time offset, i.e., before the result, can be sent over interface 0416 to downstream configurable elements.

Figure 6A:
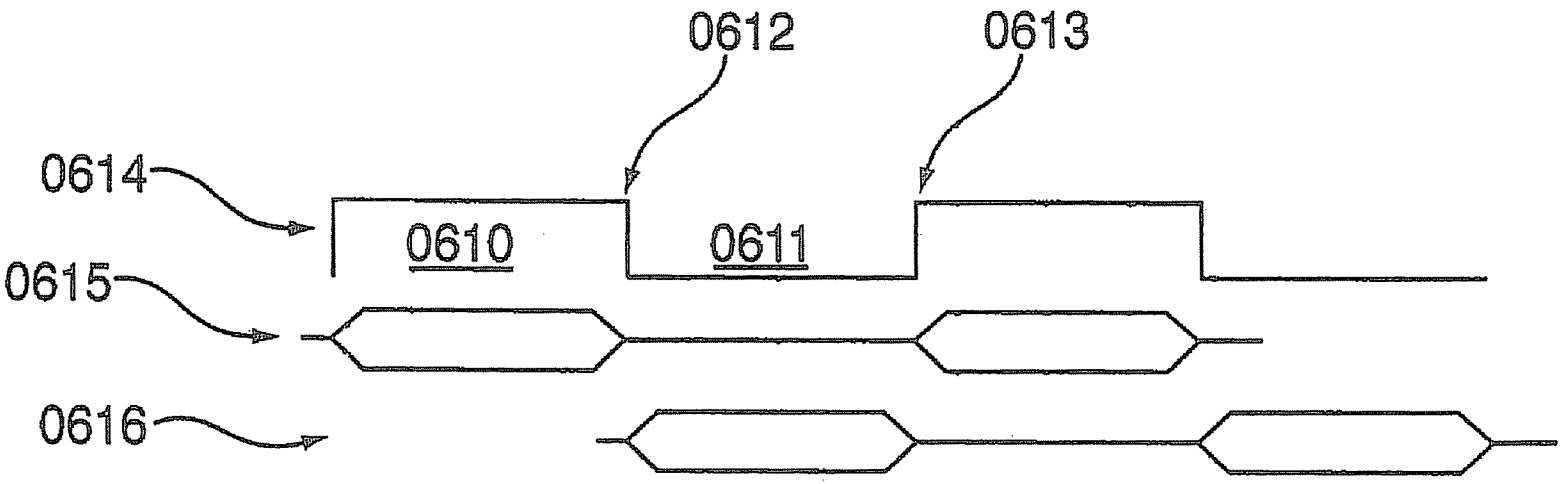

A time-offset transfer offers the advantage that no additional time is necessary for setting the configuration registers in the downstream configurable elements, because the setting is made before receiving the data (simultaneously with the release of the result). FIG. 6a shows a corresponding timing (based on sequences conventional for DFP). Trigger vectors 0615 are generated at rising edge 0613 of module clock 0614. Triggers are analyzed in the configurable elements at trailing edge 0612. Data is phase shifted, i.e., released at 0612 and entered at 0613. The trigger vectors are transferred over the bus and data is calculated during 0610. Data is transferred over the bus and triggers are calculated during 0611, or configuration registers of the configurable elements are selected according to data stored at 0613 and the configuration is set accordingly.

Figure 7B:
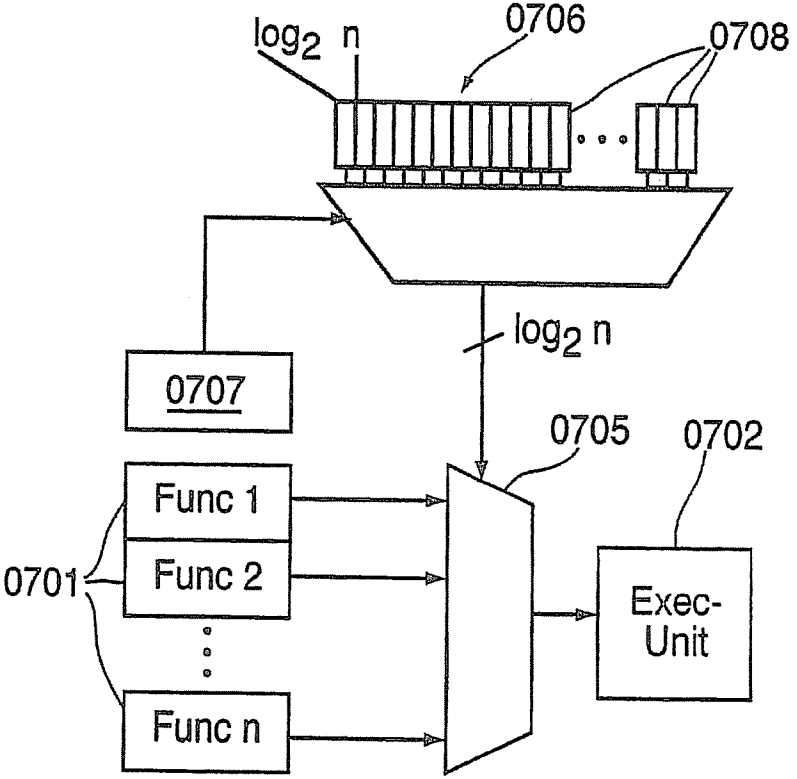
FIGS. 7a and 7b shows an implementation of the method from FIG. 6 in microprocessors, according to an example embodiment of the present invention.
Figure 7A:
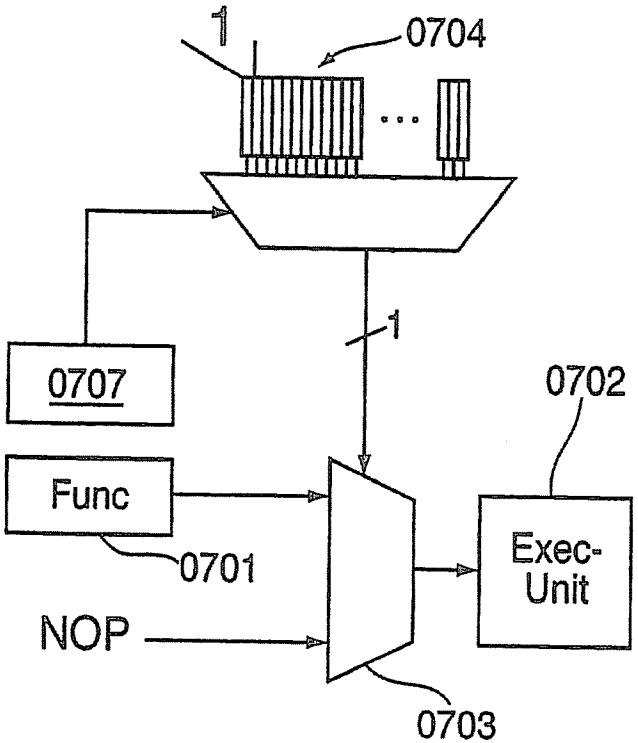
FIG. 7a PRIOR ART

FIG. 7a shows the management of jumps according to the predicate/NOP method of the related art. In execution of a comparison, an entry is made in predicate register 0704. This entry is queried during the execution of commands, determining whether a command is being executed (the command is inside the code sequence addressed by the conditional jump) or is replaced by an NOP (the command is in a different code sequence from that addressed by the conditional jump). The command is in command register 0701. The predicate register contains a plurality of entries allocated to a plurality of operations and/or a plurality of processors. This allocation is issued at the compile time of the program of the compiler. Allocation information 0707 is allocated to the command entered into the command register, so that a unique entry is referenced by the respective command.

0703 selects whether the command from 0701 or an NOP is to be executed. In execution of an NOP, one clock cycle is lost. 0703 has a symbolic character, because executing unit 0702 could also in principle be controlled directly by 0704.

In FIG. 7b there are n command registers (0701: Func 1 . . . Func n). In executing a comparison/conditional jump, the command register to be addressed, i.e., the result of the comparison, is deposited as an entry 0708 in predicate register 0706, where 0706 has a plurality of such entries. Respective entry 0708 in 0706 is so wide that all possible command registers of an executing unit 0702 can be addressed by it, which means that the width of an entry is $\log_2(n)$ with n command registers. The predicate register contains a plurality of entries allocated to a plurality of operations and/or a plurality of processors. This allocation is issued by the compiler at the compile time of the program. Allocation information 0707 is allocated to the quantity of commands entered into the command registers, so that an unambiguous entry is referenced by the respective commands.

The multiplexer selects which command register supplies the code for the instantaneous execution.

Due to this technology, a valid command is executed instead of an NOP even in the worst case with conditional jumps, so no clock cycle is wasted.

The following provides an explanation of various names, functions and terms described above.

Name Convention

| | |
|---|---|
| Assembly group | UNIT |
| Type of operation | MODE |
| Multiplexer | MUX |
| Negated signal | not |
| Register for PLU visible | PLUREG |
| Register internal | REG |
| Shift register | sft |

Function Convention

NOT Function!

| I | Q |
|---|---|
| 0 | 1 |
| 1 | 0 |

AND Function &

| A | B | Q |
|---|---|---|
| 0 | 0 | 0 |
| 0 | 1 | 0 |
| 1 | 0 | 0 |
| 1 | 1 | 1 |

OR Function #

| A | B | Q |
|---|---|---|
| 0 | 0 | 0 |
| 0 | 1 | 1 |
| 1 | 0 | 1 |
| 1 | 1 | 1 |

GATE Function G

| EN | B | Q |
|---|---|---|
| 0 | 0 | — |
| 0 | 1 | — |
| 1 | 0 | 0 |
| 1 | 1 | 1 |

DEFINITION OF TERMS

BM UNIT: Unit for switching data to the bus systems outside the PAE. Switching is done over multiplexers for the data inputs and gates for the data outputs. OACK lines are implemented as open collector drivers. The BM UNIT is controlled by the M-PLUREG.

Data receiver: The unit(s) that process(es) the results of the PAE further.

Data transmitter: The unit(s) that make(s) available the data for the PAE as operands.

Data word: A data word consists of a bit series of any desired length. This bit series represents a processing unit for a system. Commands for processors or similar modules as well as pure data can be coded in a data word.

DFP: Data flow processor according to German Patent/Unexamined Patent No. 44 16 881.

DPGA: Dynamically configurable FPGAs. Related art.

EALU: Expanded arithmetic logic unit. ALU which has been expanded by special functions which are needed or appropriate for operation of a data processing system according to German Patent No. 441 16 881 A1. These are counters in particular.

Elements: Collective term for all types of self-contained units which can be used as part of an electronic module.

Elements thus include:
configurable cells of all types
clusters
blocks of RAM
logic
processors
registers
multiplexers
I/O pins of a chip Event: An event can be analyzed by a hardware element of any type suitable for use and can prompt a conditional action as a reaction to this analysis. Events thus include, for example:
clock cycle of a computer
internal or external interrupt signal
trigger signal from other elements within the module
comparison of a data stream and/or a command stream with a value
input/output events
sequencing, carry-over, reset, etc. of a counter
analysis of a comparison FPGA: Programmable logic module. Related art.

F-PLUREG: Register in which the function of the PAE is set. Likewise, the one shot and sleep mode are also set. The register is written by the PLU.

H level: Logic 1 level, depending on the technology used.

Configurable element: A configurable element is a unit of a logic module which can be set for a special function by a configuration word. Configurable elements are thus all types of RAM cells, multiplexers, arithmetic logic units, registers and all types of internal and external network writing, etc.

Configurable cell: See logic cells.

Configure: Setting the function and interconnecting a logic unit, an (FPGA) cell or a PAE (see: Reconfigure).

Configuration data: Any quantity of configuration words.

Configuration memory: The configuration memory contains one or more configuration words.

Configuration word: A configuration word consists of a bit series of any desired length. This bit series represents a valid setting for the element to be configured, so that a functional unit is obtained.

Load logic: Unit for configuring and reconfiguring the PAE. Embodied by a microcontroller specifically adapted to its function.

Logic cells: Configurable cells used in DFPs, FPGAs, DPGAs, fulfilling simple logic or arithmetic functions according to their configuration.

L level: Logic 0 level, depending on the technology used.

M-PLUREG: Register in which the interconnection of the PAE is set. The register is written by the PLU.

O-REG: Operand register for storing the operands of the EALU. Permits independence of the PAE of the data transmitters in time and function. This simplifies the transfer of data because it can take place in an asynchronous or package-oriented manner. At the same time, the possibility of reconfiguring the data transmitters independently of the PAE or reconfiguring the PAE independently of the data transmitters is created.

PLU: Unit for configuring and reconfiguring the PAE. Embodied by a microcontroller specifically adapted to its function.

Propagate: Controlled relaying of a received signal.

RECONFIG: Reconfigurable state of a PAE.

RECONFIG trigger. Setting a PAE in the reconfigurable state.

SM UNIT: State machine UNIT. State machine controlling the EALU.

Switching table: A switching table is a ring memory which is addressed by a control. The entries in a switching table may accommodate any desired configuration words. The control can execute commands. The switching table reacts to trigger signals and reconfigures configurable elements on the basis of an entry in a ring memory.

Synchronization signals: Status signals generated by a configurable element or a processor and relayed to other configurable elements or processors to control and synchronize the data processing. It is also possible to return a synchronization signal with a time lag (stored) to one and the same configurable element or processor.

TRIGACK/TRIGRDY: Handshake of the triggers.

Trigger: Synonymous with synchronization signals.

Reconfigure: Configuring any desired quantity of PAEs again while any desired remaining quantity of PAEs continue their own function (see: Configure).

Processing cycle: A processing cycle describes the period of time needed by a unit to go from one defined and/or valid state into the next defined and/or valid state.

VLIW: Very large instruction word. Coding of microprocessors, prior art method.

Cells: Synonymous with configurable elements.

What is claimed is:

[1. A method for controlling data processing by an integrated circuit that includes a plurality of data processing elements that are arranged for at least one of arithmetically and logically processing data using a sequence of commands, the sequence including jumps, the method comprising:
for each of a plurality of the processing elements that each include at least one corresponding register:
predefining at least one corresponding configuration command; and
storing each of the at least one corresponding configuration command in one of the at least one register corresponding to the processing element;
processing data in at least one first processing element;
obtaining at least one of a comparison, a sign, a carry-over, and an error state during the processing of the data in the at least one first processing element;
in response to the at least one of the comparison, the sign, the carry-over, and the error state, generating for the at least one second processing element at least one first synchronization signal within a data stream during runtime;
processing data in at least one second processing element in a stream-like manner; and
in response to the at least one first synchronization signal, selecting at least one particular command from the stored configuration commands in order to control a jump in the sequence.]

*2. A runtime configurable processor comprising:*
*a plurality of configurable elements arranged in an array of more than one dimension, at least some of the plurality of configurable elements including an arithmetic logic unit, a configuration with respect to at least one of a function and an interconnection of at least one of the at least some configurable elements being reconfigurable at runtime in response to configuration data;*
*at least one multiplexer adapted to determine the at least one of the function and the interconnection in response to a state machine, which is adapted to control the at least one multiplexer; and*
*at least one storage component adapted for storing said configuration data;*
*wherein the at least one storage component:*
*is provided in the array; and*

*is selectively connectable to at least one of the at least some configurable elements via the at least one multiplexer so as to allow for the runtime reconfiguration.*

*3. The runtime configurable processor of claim 2, wherein the state machine is adapted to control the at least one multiplexer in response to received trigger signals.*

*4. The runtime configurable processor of claim 3, wherein the received trigger signals are generated in the array.*

*5. The runtime configurable processor of claim 3, wherein the received trigger signals are generated in the array by at least one of a counter and a comparator implemented in at least one of the configurable elements.*

*6. The runtime configurable processor of claim 4, wherein the received trigger signals are generated in the array by a counter implemented in at least one of the configurable elements.*

*7. The runtime configurable processor of claim 6, wherein the received trigger signals are multibit trigger signals generated by at least one of the configurable elements.*

*8. A runtime configurable processor comprising:*

*a plurality of configurable elements arranged in an array of more than one dimension, at least some of the plurality of configurable elements including an arithmetic logic unit, a configuration of at least one of a function and an interconnection of at least one of the at least some configurable elements being redeterminable at runtime in response to configuration select information;*

*a multiplexer arrangement adapted for determining said at least one of the function and the interconnection in response to said configuration select information;*

*at least one storage component adapted to store configuration data and provided in the array, wherein:*

*the at least one storage component is selectively connectable to at least one of the at least some configurable elements via at least one multiplexer of said multiplexer arrangement so as to allow for the runtime configuration redetermination, configuration select information being pipelined through said array; and*

*the at least one multiplexer receives configuration select information from said pipeline; and*

*a state machine being provided to control the at least one multiplexer.*

*9. The runtime configurable processor of claim 8, wherein the configuration select information is pipelined along with the data to be processed via a configurable interconnection system.*

*10. The runtime configurable processor of claim 9, wherein the pipeline is adapted to transfer trigger signals as configuration select information via the configurable interconnection system.*

*11. The runtime configurable processor of claim 9, wherein the pipeline is adapted to transfer one bit trigger signals as configuration select information via the configurable interconnection system.*

*12. The runtime configurable processor of any of claims 8 to 11, wherein the state machine is adapted to control the at least one multiplexer in response to received trigger signals.*

*13. The runtime configurable processor of claim 12, wherein the received trigger signals are generated in the array.*

*14. The runtime configurable processor of claim 12, wherein the received trigger signals are generated in the array by at least one of a counter and a comparator.*

*15. The runtime configurable processor of claim 12, wherein the received trigger signals are generated in the array by a counter.*

*16. The runtime configurable processor of claim 15, wherein the received trigger signals are multibit trigger signals.*

*17. A method for synchronizing data processing in a runtime configurable processor, the runtime reconfigurable processor comprising: a plurality of configurable elements arranged in an array of more than one dimension, at least some of the plurality of configurable elements including an arithmetic logic unit, a configuration of at least one of a function and an interconnection of at least one of the at least some configurable elements being redeterminable at runtime in response to configuration data; and at least one storage component for the configuration data, the at least one storage component being provided in the array, the method comprising the steps of:*

*processing data by the configurable elements;*

*propagating processed data through the array;*

*generating, by at least one of the configurble elements, at least one configuration select information signal in the array according to data being processed;*

*propagating the at least one configuration select information signal in a pipelined manner, the propagation of the configuration select information signal being synchronous to the propagation of the processed data; and*

*using the propagated configuration select information signal to one of trigger a certain action in data processing and put the at least one of the configurable elements in a certain state.*

*18. The method of claim 17, wherein the propagated configuration select information signal is used to determine that at least one of: data is to be processed in continuous manner; data is to be processed in a single step manner; data is not to be processed; and a configuration is to be changed.*

*19. The method of claim 17 or claim 18, wherein at least one configuration select information signal is pipelined downstream together with at least some of the data being processed.*

*20. The method of claim 17 or claim 18, wherein the propagated configuration select information signal is used to change a configuration during runtime of the processor and while at least another element of the configurable elements processes data.*

*21. The method of claim 17 or claim 18, wherein:*

*at least one configuration select information signal is pipelined downstream together with at least some of the data being processed; and*

*the propagated configuration select information signal is used to change a configuration during runtime of the processor and while at least another element of the configurable elements processes data.*

*22. The method of claim 17 or claim 18, wherein a configuration select information signal is generated in the array by a counter.*

*23. The method of claim 17 or claim 18, wherein:*

*at least one configuration select information signal is pipelined downstream together with at least some of the data being processed; and*

*a configuration select information signal is generated in the array by a counter.*

*24. The method of claim 17 or claim 18, wherein:*

*the propagated configuration select information signal is used to change a configuration during runtime of the processor and while at least another element of the configurable elements processes data; and*

*a configuration select information signal is generated in the array by a counter.*

*25. The method of claim 17 or claim 18, wherein:*

*at least one configuration select information signal is pipelined downstream together with at least some of the data being processed;*

*the propagated configuration select information signal is used to change a configuration during runtime of the processor and while at least another element of the configurable elements processes data; and*

*a configuration select information signal is generated in the array by a counter.*

*26. The method of claim 17 or claim 18, wherein a configuration select information signal is generated in the array by a comparator.*

*27. The method of claim 17 or claim 18, wherein:*

*at least one configuration select information signal is pipelined downstream together with at least some of the data being processed; and*

*a configuration select information signal is generated in the array by a comparator.*

*28. The method of claim 17 or claim 18, wherein:*

*the propagated configuration select information signal is used to change a configuration during runtime of the processor and while at least another element of the configurable elements processes data; and*

*a configuration select information signal is generated in the array by a comparator.*

*29. The method of claim 17 or claim 18, wherein:*

*at least one configuration select information signal is pipelined downstream together with at least some of the data being processed;*

*the propagated configuration select information signal is used to change a configuration during runtime of the processor and while at least another element of the configurable elements processes data; and*

*a configuration select information signal is generated in the array by a comparator.*

*30. The method of claim 17 or claim 18, wherein a configuration select information signal is generated in the array by a counter and a configuration select information signal is generated in the array by a comparator.*

*31. The method of claim 17 or claim 18, wherein:*

*at least one configuration select information signal is pipelined downstream together with at least some of the data being processed; and*

*a configuration select information signal is generated in the array by a counter and a configuration select information signal is generated in the array by a comparator.*

*32. The method of claim 17 or claim 18, wherein:*

*the propagated configuration select information signal is used to change a configuration during runtime of the processor and while at least another element of the configurable elements processes data; and*

*a configuration select information signal is generated in the array by a counter and a configuration select information signal is generated in the array by a comparator.*

*33. The method of claim 17 or claim 18, wherein:*

*at least one configuration select information signal is pipelined downstream together with at least some of the data being processed;*

*the propagated configuration select information signal is used to change a configuration during runtime of the processor and while at least another element of the configurable elements processes data; and*

*a configuration select information signal is generated in the array by a counter and a configuration select information signal is generated in the array by a comparator.*

*34. The method of claim 17 or claim 18, wherein:*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals.*

*35. The method of claim 17 or claim 18, wherein:*

*at least one configuration select information signal is pipelined downstream together with at least some of the data being processed;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals.*

*36. The method of claim 17 or claim 18, wherein:*

*the propagated configuration select information signal is used to change a configuration during runtime of the processor and while at least another element of the configurable elements processes data;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals.*

*37. The method of claim 17 or claim 18, wherein:*

*at least one configuration select information signal is pipelined downstream together with at least some of the data being processed;*

*the propagated configuration select information signal is used to change a configuration during runtime of the processor and while at least another element of the configurable elements processes data;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals.*

*38. The method of claim 17 or claim 18, wherein:*

*a configuration select information signal is generated in the array by a counter;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals.*

*39. The method of claim 17 or claim 18, wherein:*

*at least one configuration select information signal is pipelined downstream together with at least some of the data being processed;*

*a configuration select information signal is generated in the array by a counter;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals.*

*40. The method of claim 17 or claim 18, wherein:*

*the propagated configuration select information signal is used to change a configuration during runtime of the processor and while at least another element of the configurable elements processes data;*

*a configuration select information signal is generated in the array by a counter;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals.*

*41. The method of claim 17 or claim 18, wherein:*

*at least one configuration select information signal is pipelined downstream together with at least some of the data being processed;*

*the propagated configuration select information signal is used to change a configuration during runtime of the processor and while at least another element of the configurable elements processes data;*

*a configuration select information signal is generated in the array by a counter;*

*the at least one storage component stores configuration data is are selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals.*

*42. The method of claim 17 or claim 18, wherein:*

*a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals.*

*43. The method of claim 17 or claim 18, wherein:*

*at least one configuration select information signal is pipelined downstream together with at least some of the data being processed;*

*a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals.*

*44. The method of claim 17 or claim 18, wherein:*

*the propagated configuration select information signal is used to change a configuration during runtime of the processor and while at least another element of the configurable elements processes data;*

*a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals.*

*45. The method of claim 17 or claim 18, wherein:*

*at least one configuration select information signal is pipelined downstream together with at least some of the data being processed;*

*the propagated configuration select information signal is used to change a configuration during runtime of the processor and while at least another element of the configurable elements processes data;*

*a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals.*

*46. The method of claim 17 or claim 18, wherein:*

*a configuration select information signal is generated in the array by a counter and a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals.*

*47. The method of claim 17 or claim 18, wherein:*

*at least one configuration select information signal is pipelined downstream together with at least some of the data being processed;*

*a configuration select information signal is generated in the array by a counter and a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals.*

*48. The method of claim 17 or claim 18, wherein:*

*the propagated configuration select information signal is used to change a configuration during runtime of the processor and while at least another element of the configurable elements processes data;*

*a configuration select information signal is generated in the array by a counter and a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals.*

*49. The method of claim 17 or claim 18, wherein:*

*at least one configuration select information signal is pipelined downstream together with at least some of the data being processed;*

*the propagated configuration select information signal is used to change a configuration during runtime of the processor and while at least another element of the configurable elements processes data;*

*a configuration select information signal is generated in the array by a counter and a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals.*

*50. The method of claim 17 or claim 18, wherein:*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals which were generated in the array.*

*51. The method of claim 17 or claim 18, wherein:*

*at least one configuration select information signal is pipelined downstream together with at least some of the data being processed;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals which were generated in the array.*

*52. The method of claim 17 or claim 18, wherein:*

*the propagated configuration select information signal is used to change a configuration during runtime of the processor and while at least another element of the configurable elements processes data;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals which were generated in the array.*

*53. The method of claim 17 or claim 18, wherein:*

*at least one configuration select information signal is pipelined downstream together with at least some of the data being processed;*

*the propagated configuration select information signal is used to change a configuration during runtime of the processor and while at least another element of the configurable elements processes data;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals which were generated in the array.*

*54. The method of claim 17 or claim 18, wherein:*

*a configuration select information signal is generated in the array by a counter;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals which were generated in the array.*

*55. The method of claim 17 or claim 18, wherein:*

*at least one configuration select information signal is pipelined downstream together with at least some of the data being processed;*

*a configuration select information signal is generated in the array by a counter;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals which were generated in the array.*

*56. The method of claim 17 or claim 18, wherein:*

*the propagated configuration select information signal is used to change a configuration during runtime of the processor and while at least another element of the configurable elements processes data;*

*a configuration select information signal is generated in the array by a counter;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals which were generated in the array.*

*57. The method of claim 17 or claim 18, wherein:*

*at least one configuration select information signal is pipelined downstream together with at least some of the data being processed;*

*the propagated configuration select information signal is used to change a configuration during runtime of the processor and while at least another element of the configurable elements processes data;*

*a configuration select information signal is generated in the array by a counter;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals which were generated in the array.*

*58. The method of claim 17 or claim 18, wherein:*

*a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals which were generated in the array.*

*59. The method of claim 17 or claim 18, wherein:*

*at least one configuration select information signal is pipelined downstream together with at least some of the data being processed;*

*a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals which were generated in the array.*

*60. The method of claim 17 or claim 18, wherein:*

*the propagated configuration select information signal is used to change a configuration during runtime of the processor and while at least another element of the configurable elements processes data;*

*a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals which were generated in the array.*

*61. The method of claim 17 or claim 18, wherein:*

*at least one configuration select information signal is pipelined downstream together with at least some of the data being processed;*

*the propagated configuration select information signal is used to change a configuration during runtime of the processor and while at least another element of the configurable elements processes data;*

*a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals which were generated in the array.*

*62. The method of claim 17 or claim 18, wherein:*

*a configuration select information signal is generated in the array by a counter and a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals which were generated in the array.*

*63. The method of claim 17 or claim 18, wherein:*

*at least one configuration select information signal is pipelined downstream together with at least some of the data being processed;*

*a configuration select information signal is generated in the array by a counter and a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration*

*redetermination, the control being in response to received trigger signals which were generated in the array.*

*64. The method of claim 17 or claim 18, wherein:*

*the propagated configuration select information signal is used to change a configuration during runtime of the processor and while at least another element of the configurable elements processes data;*

*a configuration select information signal is generated in the array by a counter and a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals which were generated in the array.*

*65. The method of claim 17 or claim 18, wherein:*

*at least one configuration select information signal is pipelined downstream together with at least some of the data being processed;*

*the propagated configuration select information signal is used to change a configuration during runtime of the processor and while at least another element of the configurable elements processes data;*

*a configuration select information signal is generated in the array by a counter and a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received trigger signals which were generated in the array.*

*66. The method of claim 17 or claim 18, wherein:*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received multibit trigger signals which were generated in the array.*

*67. The method of claim 17 or claim 18, wherein:*

*at least one configuration select information signal is pipelined downstream together with at least some of the data being processed;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received multibit trigger signals which were generated in the array.*

*68. The method of claim 17 or claim 18, wherein:*

*the propagated configuration select information signal is used to change a configuration during runtime of the processor and while at least another element of the configurable elements processes data;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received multibit trigger signals which were generated in the array.*

*69. The method of claim 17 or claim 18, wherein:*

*at least one configuration select information signal is pipelined downstream together with at least some of the data being processed;*

*the propagated configuration select information signal is used to change a configuration during runtime of the processor and while at least another element of the configurable elements processes data;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received multibit trigger signals which were generated in the array.*

*70. The method of claim 17 or claim 18, wherein:*

*a configuration select information signal is generated in the array by a counter;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received multibit trigger signals which were generated in the array.*

*71. The method of claim 17 or claim 18, wherein:*

*at least one configuration select information signal is pipelined downstream together with at least some of the data being processed;*

*a configuration select information signal is generated in the array by a counter;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received multibit trigger signals which were generated in the array.*

*72. The method of claim 17 or claim 18, wherein:*

*the propagated configuration select information signal is used to change a configuration during runtime of the processor and while at least another element of the configurable elements processes data;*

*a configuration select information signal is generated in the array by a counter;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received multibit trigger signals which were generated in the array.*

*73. The method of claim 17 or claim 18, wherein:*

*at least one configuration select information signal is pipelined downstream together with at least some of the data being processed;*

*the propagated configuration select information signal is used to change a configuration during runtime of the processor and while at least another element of the configurable elements processes data;*

*a configuration select information signal is generated in the array by a counter;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received multibit trigger signals which were generated in the array.*

*74. The method of claim 17 or claim 18, wherein:*

*a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received multibit trigger signals which were generated in the array.*

*75. The method of claim 17 or claim 18, wherein:*

*at least one configuration select information signal is pipelined downstream together with at least some of the data being processed;*

*a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received multibit trigger signals which were generated in the array.*

*76. The method of claim 17 or claim 18, wherein:*

*the propagated configuration select information signal is used to change a configuration during runtime of the processor and while at least another element of the configurable elements processes data;*

*a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received multibit trigger signals which were generated in the array.*

*77. The method of claim 17 or claim 18, wherein:*

*at least one configuration select information signal is pipelined downstream together with at least some of the data being processed;*

*the propagated configuration select information signal is used to change a configuration during runtime of the processor and while at least another element of the configurable elements processes data;*

*a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received multibit trigger signals which were generated in the array.*

*78. The method of claim 17 or claim 18, wherein:*

*a configuration select information signal is generated in the array by a counter and a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received multibit trigger signals which were generated in the array.*

*79. The method of claim 17 or claim 18, wherein:*

*at least one configuration select information signal is pipelined downstream together with at least some of the data being processed;*

*a configuration select information signal is generated in the array by a counter and a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received multibit trigger signals which were generated in the array.*

*80. The method of claim 17 or claim 18, wherein:*

*the propagated configuration select information signal is used to change a configuration during runtime of the*

*processor and while at least another element of the configurable elements processes data;*

*a configuration select information signal is generated in the array by a counter and a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received multibit trigger signals which were generated in the array.*

*81. The method of claim 17 or claim 18, wherein:*

*at least one configuration select information signal is pipelined downstream together with at least some of the data being processed;*

*the propagated configuration select information signal is used to change a configuration during runtime of the processor and while at least another element of the configurable elements processes data;*

*a configuration select information signal is generated in the array by a counter and a configuration select information signal is generated in the array by a comparator;*

*the at least one storage component stores configuration data and is selectively connected to at least one of the at least some configurable elements via at least one multiplexer in a manner to allow for the runtime configuration redetermination; and*

*a state machine is provided to control the at least one multiplexer used to allow for the runtime configuration redetermination, the control being in response to received multibit trigger signals which were generated in the array.*

* * * * *